(12) United States Patent
Kumar et al.

(10) Patent No.: US 11,373,134 B2
(45) Date of Patent: Jun. 28, 2022

(54) SYSTEMS AND METHODS FOR DYNAMIC PROCESSING OF OBJECTS WITH DATA VERIFICATION

(71) Applicant: Berkshire Grey Operating Company, Inc., Bedford, MA (US)

(72) Inventors: Lakshman Kumar, Burlington, MA (US); Abraham Schneider, Andover, MA (US); Thomas Koletschka, Cambridge, MA (US); Christopher Geyer, Arlington, MA (US); Joseph Romano, Arlington, MA (US); John Richard Amend, Jr., Belmont, MA (US); Benjamin Cohen, Somerville, MA (US); William Chu-Hyon McMahan, Cambridge, MA (US); Kyle Maroney, North Attleboro, MA (US); Thomas Wagner, Concord, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 215 days.

(21) Appl. No.: 16/661,820

(22) Filed: Oct. 23, 2019

(65) Prior Publication Data
US 2020/0126025 A1     Apr. 23, 2020

Related U.S. Application Data

(60) Provisional application No. 62/749,509, filed on Oct. 23, 2018, provisional application No. 62/884,351, filed on Aug. 8, 2019.

(51) Int. Cl.
*G06F 7/00* (2006.01)
*G06Q 10/08* (2012.01)
(Continued)

(52) U.S. Cl.
CPC ......... *G06Q 10/083* (2013.01); *B65G 1/1371* (2013.01); *B65G 1/1373* (2013.01);
(Continued)

(58) Field of Classification Search
CPC .. G06Q 10/083; G06Q 10/08; G06Q 10/0833; G06Q 10/08345; G06Q 50/28;
(Continued)

(56) References Cited

U.S. PATENT DOCUMENTS 3,592,326 A    7/1971   Zimmerle et al.
3,595,407 A    7/1971   Muller-Kuhn et al.
(Continued)

FOREIGN PATENT DOCUMENTS

AU    2006204622 A1    3/2007
CN       1033604 A     7/1989
(Continued)

OTHER PUBLICATIONS

International Preliminary Report on Patentability issued by the International Bureau of WIPO in related International Application No. PCT/US2019/057710 dated Apr. 27, 2021, 8 pages.
(Continued)

*Primary Examiner* — Yolanda R Cumbess
(74) *Attorney, Agent, or Firm* — Gesmer Updegrove LLP

(57) ABSTRACT

A processing system for processing objects is disclosed that includes a plurality of receiving stations for receiving a plurality of objects, each object being associated with pre-recorded data, and a plurality of processing stations, each of which is in communication with at least one processing station. Each processing station includes perception means for perceiving data regarding an identity of any of an object or a bin of objects, and capture means for capturing characteristic data regarding an object to provide captured data. Each processing station further includes comparison means
(Continued)

for comparing the captured data with the prerecorded data to provide comparison data, and a plurality of distribution stations, each of which is in communication with at least one processing station for receiving objects from the at least one processing station responsive to the comparison data.

27 Claims, 45 Drawing Sheets

(51) Int. Cl.
    *B65G 1/137*     (2006.01)
    *G01G 19/414*     (2006.01)
    *G06K 7/10*     (2006.01)
    *G06K 7/14*     (2006.01)

(52) U.S. Cl.
    CPC ....... *G01G 19/414* (2013.01); *G06K 7/10366* (2013.01); *G06K 7/1413* (2013.01)

(58) Field of Classification Search
    CPC ...... G06Q 50/30; G06Q 10/00; B65G 1/1371; B65G 1/1373; G01G 19/414; G06K 7/10366; G06K 7/1413
    USPC ................................ 700/213–216, 223, 228
    See application file for complete search history.

(56) References Cited

U.S. PATENT DOCUMENTS

| | | | |
|---|---|---|---|
| 3,734,286 A | 5/1973 | Simjian | |
| 4,136,780 A | 1/1979 | Hunter et al. | |
| 4,186,836 A | 2/1980 | Wassmer et al. | |
| 4,360,098 A | 11/1982 | Nordstrom | |
| 4,622,875 A | 11/1986 | Emery et al. | |
| 4,722,653 A | 2/1988 | Williams et al. | |
| 4,759,439 A | 7/1988 | Hartlepp | |
| 4,819,784 A | 4/1989 | Sticht | |
| 4,846,335 A | 7/1989 | Hartlepp | |
| 4,895,242 A | 1/1990 | Michel | |
| 5,190,162 A | 3/1993 | Hartlepp | |
| 5,419,457 A | 5/1995 | Ross et al. | |
| 5,460,271 A | 10/1995 | Kenny et al. | |
| 5,672,039 A | 9/1997 | Perry et al. | |
| 5,713,473 A | 2/1998 | Satake | |
| 5,794,788 A | 8/1998 | Massen | |
| 5,794,789 A | 8/1998 | Payson et al. | |
| 5,839,566 A | 11/1998 | Bonnet | |
| 5,875,434 A | 2/1999 | Matsuoka et al. | |
| 5,990,437 A | 11/1999 | Coutant et al. | |
| 6,060,677 A | 5/2000 | Ulrichsen et al. | |
| 6,124,560 A | 9/2000 | Roos et al. | |
| 6,246,023 B1 | 6/2001 | Kugle | |
| 6,323,452 B1 | 11/2001 | Bonnet | |
| 6,401,936 B1 | 6/2002 | Isaacs et al. | |
| 6,688,459 B1 | 2/2004 | Bonham et al. | |
| 6,762,382 B1 | 7/2004 | Danelski | |
| 6,897,395 B2 | 5/2005 | Shibashi et al. | |
| 8,560,406 B1 * | 10/2013 | Antony ................. | G06Q 10/08 705/28 |
| 8,776,694 B2 | 7/2014 | Rosenwinkel et al. | |
| 8,997,438 B1 | 4/2015 | Fallas | |
| 9,020,632 B2 | 4/2015 | Naylor | |
| 9,102,336 B2 | 8/2015 | Rosenwinkel | |
| 9,364,865 B2 | 6/2016 | Kim | |
| 9,650,214 B2 | 5/2017 | Hoganson | |
| 9,751,693 B1 | 9/2017 | Battles et al. | |
| 9,878,349 B2 | 1/2018 | Crest et al. | |
| 9,926,138 B1 | 3/2018 | Brazeau et al. | |
| 9,931,673 B2 | 4/2018 | Nice et al. | |
| 9,962,743 B2 | 5/2018 | Bombaugh et al. | |
| 9,975,148 B2 | 5/2018 | Zhu et al. | |
| 10,029,865 B1 | 7/2018 | McCalib, Jr. et al. | |
| 10,198,710 B1 * | 2/2019 | Hahn ................. | G01G 19/4144 |
| 10,206,519 B1 * | 2/2019 | Gyori .................... | A47F 5/0018 |
| 10,438,034 B2 | 10/2019 | Wagner et al. | |
| 10,538,394 B2 | 1/2020 | Wagner et al. | |
| 10,576,621 B2 | 3/2020 | Wagner et al. | |
| 10,577,180 B1 * | 3/2020 | Mehta ...................... | B25J 9/162 |
| 10,611,021 B2 | 4/2020 | Wagner et al. | |
| 10,809,122 B1 * | 10/2020 | Danenberg ............. | G01G 21/08 |
| 10,810,715 B2 * | 10/2020 | Chamberlin ......... | G05B 19/402 |
| 11,055,504 B2 | 7/2021 | Wagner et al. | |
| 11,080,496 B2 | 8/2021 | Wagner et al. | |
| 2002/0092801 A1 | 7/2002 | Dominguez | |
| 2002/0134056 A1 | 9/2002 | Dimario et al. | |
| 2002/0157919 A1 | 10/2002 | Sherwin | |
| 2002/0170850 A1 | 11/2002 | Bonham et al. | |
| 2002/0179502 A1 | 12/2002 | Cerutti et al. | |
| 2003/0034281 A1 | 2/2003 | Kumar | |
| 2003/0038065 A1 | 2/2003 | Pippin et al. | |
| 2003/0075051 A1 | 4/2003 | Watanabe et al. | |
| 2004/0065597 A1 | 4/2004 | Hanson | |
| 2004/0194428 A1 | 10/2004 | Close et al. | |
| 2004/0195320 A1 | 10/2004 | Ramsager | |
| 2004/0215480 A1 * | 10/2004 | Kadaba .................... | B07C 3/00 705/333 |
| 2004/0261366 A1 | 12/2004 | Gillet et al. | |
| 2005/0002772 A1 | 1/2005 | Stone | |
| 2005/0149226 A1 | 7/2005 | Stevens et al. | |
| 2005/0220600 A1 | 10/2005 | Baker et al. | |
| 2006/0021858 A1 | 2/2006 | Sherwood | |
| 2006/0070929 A1 | 4/2006 | Fry et al. | |
| 2007/0209976 A1 | 9/2007 | Worth et al. | |
| 2008/0046116 A1 | 2/2008 | Khan et al. | |
| 2008/0181753 A1 | 7/2008 | Bastian et al. | |
| 2009/0026017 A1 | 1/2009 | Freudelsperger | |
| 2010/0122942 A1 | 5/2010 | Harres et al. | |
| 2010/0318216 A1 | 12/2010 | Faivre et al. | |
| 2011/0130868 A1 | 6/2011 | Baumann | |
| 2011/0144798 A1 | 6/2011 | Freudelsperger | |
| 2011/0238207 A1 | 9/2011 | Bastian, II et al. | |
| 2011/0243707 A1 | 10/2011 | Dumas et al. | |
| 2011/0320036 A1 | 12/2011 | Freudelsperger | |
| 2012/0118699 A1 | 5/2012 | Buchman et al. | |
| 2013/0051696 A1 | 2/2013 | Garrett et al. | |
| 2013/0110280 A1 | 5/2013 | Folk | |
| 2013/0202195 A1 | 8/2013 | Perez Cortes et al. | |
| 2014/0244026 A1 | 8/2014 | Neiser | |
| 2014/0249666 A1 | 9/2014 | Radwallner et al. | |
| 2014/0277693 A1 | 9/2014 | Naylor | |
| 2014/0291112 A1 | 10/2014 | Lyon et al. | |
| 2015/0098775 A1 | 4/2015 | Razumov | |
| 2015/0114799 A1 | 4/2015 | Hansl et al. | |
| 2016/0083196 A1 | 3/2016 | Dugat | |
| 2016/0221762 A1 | 8/2016 | Schroader | |
| 2016/0221766 A1 | 8/2016 | Schroader et al. | |
| 2016/0228921 A1 | 8/2016 | Doublet et al. | |
| 2017/0057756 A1 | 3/2017 | Dugat et al. | |
| 2017/0197233 A1 | 7/2017 | Bombaugh et al. | |
| 2017/0225330 A1 | 8/2017 | Wagner et al. | |
| 2017/0312789 A1 | 11/2017 | Schroader | |
| 2017/0330135 A1 | 11/2017 | Taylor et al. | |
| 2017/0349385 A1 | 12/2017 | Moroni et al. | |
| 2017/0369244 A1 | 12/2017 | Battles et al. | |
| 2018/0044120 A1 | 2/2018 | Mäder | |
| 2018/0085788 A1 | 3/2018 | Engel et al. | |
| 2018/0105363 A1 | 4/2018 | Lisso et al. | |
| 2018/0127219 A1 | 5/2018 | Wagner et al. | |
| 2018/0186572 A1 | 7/2018 | Issing | |
| 2018/0224837 A1 * | 8/2018 | Enssle ................ | G06Q 10/0875 |
| 2018/0265291 A1 | 9/2018 | Wagner et al. | |
| 2018/0265298 A1 | 9/2018 | Wagner et al. | |
| 2018/0265311 A1 | 9/2018 | Wagner et al. | |
| 2018/0273295 A1 | 9/2018 | Wagner et al. | |
| 2018/0273296 A1 | 9/2018 | Wagner et al. | |
| 2018/0273297 A1 | 9/2018 | Wagner et al. | |
| 2018/0273298 A1 | 9/2018 | Wagner et al. | |
| 2018/0282065 A1 | 10/2018 | Wagner et al. | |
| 2018/0282066 A1 | 10/2018 | Wagner et al. | |
| 2018/0312336 A1 | 11/2018 | Wagner et al. | |
| 2018/0327198 A1 | 11/2018 | Wagner et al. | |
| 2018/0330134 A1 | 11/2018 | Wagner et al. | |

(56) References Cited

U.S. PATENT DOCUMENTS

| | | | |
|---|---|---|---|
| 2019/0022702 | A1 | 1/2019 | Vegh et al. |
| 2019/0091730 | A1 | 3/2019 | Torang |
| 2019/0337723 | A1 | 11/2019 | Wagner et al. |
| 2020/0023410 | A1 | 1/2020 | Tamura et al. |
| 2020/0143127 | A1 | 5/2020 | Wagner et al. |

FOREIGN PATENT DOCUMENTS

| | | |
|---|---|---|
| CN | 1671489 A | 9/2005 |
| CN | 1809428 A | 7/2006 |
| CN | 103129783 A | 6/2013 |
| CN | 103842270 A | 6/2014 |
| CN | 104507814 A | 4/2015 |
| CN | 104858150 A | 8/2015 |
| CN | 105383906 A | 3/2016 |
| CN | 105668255 A | 6/2016 |
| CN | 105873838 A | 8/2016 |
| CN | 205500186 U | 8/2016 |
| CN | 108602630 A | 9/2018 |
| DE | 19510392 A1 | 9/1996 |
| DE | 102004001181 A1 | 8/2005 |
| DE | 102007023909 A1 | 11/2008 |
| DE | 102007038834 A1 | 2/2009 |
| DE | 102008039764 A1 | 5/2010 |
| EP | 0235488 A1 | 9/1987 |
| EP | 0613841 A1 | 9/1994 |
| EP | 0648695 A2 | 4/1995 |
| EP | 1695927 A2 | 8/2006 |
| EP | 1995192 A2 | 11/2008 |
| EP | 2233400 A1 | 9/2010 |
| EP | 2477914 B1 | 4/2013 |
| EP | 3112295 A1 | 1/2017 |
| FR | 2832654 A1 | 5/2003 |
| GB | 2084531 A | 4/1982 |
| JP | 200228577 A | 1/2002 |
| JP | 2007182286 A | 7/2007 |
| JP | 2008037567 A | 2/2008 |
| JP | 2010202291 A | 9/2010 |
| WO | 9731843 A1 | 9/1997 |
| WO | 03095339 A1 | 11/2003 |
| WO | 2005118436 A1 | 12/2005 |
| WO | 2007009136 A1 | 1/2007 |
| WO | 2008091733 A2 | 7/2008 |
| WO | 2010017872 A1 | 2/2010 |
| WO | 2011038442 A2 | 4/2011 |
| WO | 2014130937 A1 | 8/2014 |
| WO | 2015118171 A1 | 8/2015 |
| WO | 2017036780 A1 | 3/2017 |
| WO | 2017044747 A1 | 3/2017 |
| WO | 2018175466 A1 | 9/2018 |
| WO | 2018176033 A1 | 9/2018 |

OTHER PUBLICATIONS

Non-Final Office Action issued by the U.S. Patent and Trademark Office in related U.S. Appl. No. 16/737,213 dated Feb. 24, 2021, 8 pages.
Non-Final Office Action issued by the U.S. Patent and Trademark Office in related U.S. Appl. No. 16/737,211 dated Nov. 23, 2020, 11 pages.
Notice on the Second Office Action and Second Office Action, along with its English Translation, issued by the China National Intellectual Property Administration in related Chinese Patent Application No. 201880038892.0 dated Apr. 14, 2021, 8 pages.
Final Office Action issued by the U.S. Patent and Trademark Office in related U.S. Appl. No. 16/737,213 dated Jul. 23, 2021, 10 pages.
International Preliminary Report on Patentability issued by the International Bureau of WIPO in related International Application No. PCT/US2020/012744 dated Jun. 16, 2021, 8 pages.
International Preliminary Report on Patentability issued by the International Bureau of WIPO in related International Application No. PCT/US2020/012720 dated Jun. 16, 2021, 8 pages.
International Preliminary Report on Patentability issued by the International Bureau of WIPO in related International Application No. PCT/US2020/012695 dated Jun. 16, 2021, 8 pages.
International Preliminary Report on Patentability issued by the International Bureau of WIPO in related International Application No. PCT/US2020/012713 dated Jun. 16, 2021, 8 pages.
International Preliminary Report on Patentability issued by the International Bureau of WIPO in related International Application No. PCT/US2020/012754 dated Jun. 16, 2021, 8 pages.
International Preliminary Report on Patentability issued by the International Bureau of WIPO in related International Application No. PCT/US2020/012704 dated Jun. 16, 2021, 9 pages.
Non-Final Office Action issued by the U.S. Patent and Trademark Office in related U.S. Appl. No. 16/737,213 dated Jun. 4, 2020, 6 pages.
Notice on the First Office Action and First Office Action, along with its English Translation, issued by the China National Intellectual Property Administration in related Chinese Patent Application No. 201880038892.0 dated Sep. 2, 2020, 23 pages.
Communication pursuant to Rules 161(1) and 162EPC issued by the European Patent Office in related European Patent Application No. 20704961.0 dated Aug. 17, 2021, 3 pages.
Communication pursuant to Rules 161(1) and 162EPC issued by the European Patent Office in related European Patent Application No. 20703621.1 dated Aug. 17, 2021, 3 pages.
Communication pursuant to Rules 161(1) and 162EPC issued by the European Patent Office in related European Patent Application No. 20704119.5 dated Aug. 17, 2021, 3 pages.
Communication pursuant to Rules 161(1) and 162EPC issued by the European Patent Office in related European Patent Application No. 20704962.8 dated Aug. 17, 2021, 3 pages.
Communication pursuant to Rules 161(1) and 162EPC issued by the European Patent Office in related European Patent Application No. 20704645.9 dated Aug. 17, 2021, 3 pages.
Communication pursuant to Rules 161(1) and 162EPC issued by the European Patent Office in related European Patent Application No. 20703866.2 dated Aug. 17, 2021, 3 pages.
Non-Final Office Action issued by the U.S. Patent and Trademark Office in related U.S. Appl. No. 16/737,218 dated Mar. 26, 2021, 13 pages.
Non-Final Office Action issued by the U.S. Patent and Trademark Office in related U.S. Appl. No. 16/737,215 dated Mar. 26, 2021, 13 pages.
International Preliminary Report on Patentability issued by the International Bureau of WIPO dated Oct. 22, 2019, in related International Application No. PCT/US2018/028164, 11 pages.
International Search Report and Written Opinion issued by the International Searching Authority dated Aug. 9, 2018, in related International Application No. PCT/US2018/028164, 15 pages.
Non-Final Office Action issued by the U.S. Patent and Trademark Office in related U.S. Appl. No. 15/956,442 dated Mar. 15, 2019, 8 pages.
Communication pursuant to Rules 161(1) and 162 EPC issued by the European Patent Office in related European Patent Application No. 18723144.4 dated Nov. 26, 2019, 3 pages.
International Search Report and Written Opinion issued by the International Searching Authority dated Mar. 25, 2020, in related International Application No. PCT/US2020/012695, 14 pages.
International Search Report and Written Opinion issued by the International Searching Authority dated Mar. 25, 2020, in related International Application No. PCT/US2020/012704, 15 pages.
International Search Report and Written Opinion issued by the International Searching Authority dated Mar. 25, 2020, in related International Application No. PCT/US2020/012713, 14 pages.
International Search Report and Written Opinion issued by the International Searching Authority dated Mar. 25, 2020, in related International Application No. PCT/US2020/012720, 14 pages.
International Search Report and Written Opinion issued by the International Searching Authority dated Mar. 25, 2020, in related International Application No. PCT/US2020/012744, 14 pages.
International Search Report and Written Opinion issued by the International Searching Authority dated Mar. 25, 2020, in related International Application No. PCT/US2020/012754, 14 pages.

(56) References Cited

OTHER PUBLICATIONS

Examiner's Report issued by the Innovation, Science and Economic Development Canada in related Canadian Patent Application No. 3,060,257 dated Dec. 9, 2020, 3 pages.
Communication pursuant to Rules 161(1) and 162 EPC issued by the European Patent Office in related European Application No. 19805436.3 dated Jun. 1, 2021, 3 pages.
Non-Final Office Action issued by the U.S. Patent and Trademark Office in related U.S. Appl. No. 16/737,202 dated Apr. 13, 2021, 9 pages.
International Search Report and Written Opinion issued by the International Searching Authority dated Feb. 6, 2020 in related International Application No. PCT/US2019/057710, 12 pages.
Examiner's Report issued by the Innovation, Science and Economic Development Canada (Canadian Intellectual Property Office) in related Canadian Patent Application No. 3,060,257 dated Oct. 28, 2021, 6 pages.
Non-Final Office Action issued by the United States Patent and Trademark Office in related U.S. Appl. No. 17/324,588 dated Feb. 7, 2022, 10 pages.
Non-Final Office Action issued by the United States Patent and Trademark Office in related U.S. Appl. No. 17/349,064 dated Mar. 8, 2022, 14 pages.

\* cited by examiner

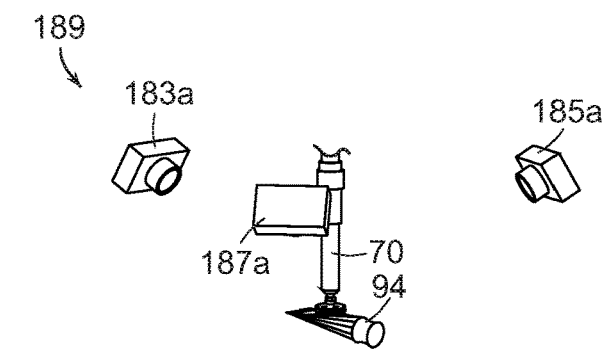
FIG. 17B
FIG. 17C
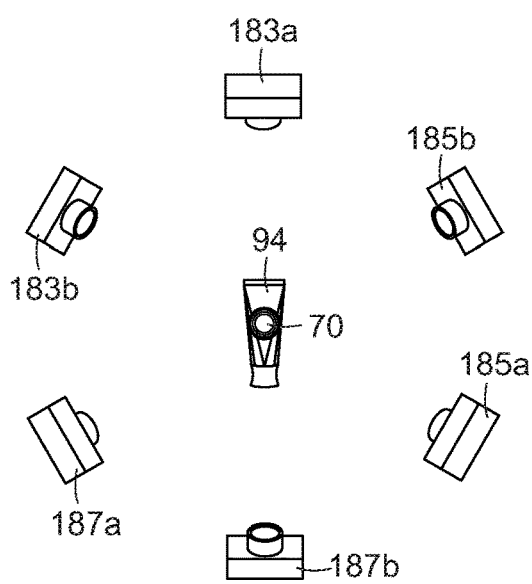
FIG. 17D
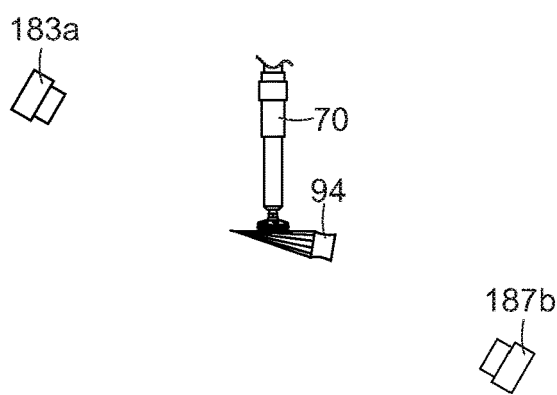

SYSTEMS AND METHODS FOR DYNAMIC PROCESSING OF OBJECTS WITH DATA VERIFICATION

PRIORITY

The present application claims priority to U.S. Provisional Patent Application Ser. No. 62/749,509 filed Oct. 23, 2018, as well as U.S. Provisional Patent Application Ser. No. 62/884,351 filed Aug. 8, 2019, the disclosures of which are hereby incorporated by reference in their entireties.

BACKGROUND

The invention generally relates to object processing systems, and relates in particular to shipping systems that accommodate orders from sending entities, and provide distribution and shipping services to destination entities.

Current object processing systems generally involve the processing of a large number of objects, where the objects are received in either organized or disorganized batches, and must be routed to desired destinations in accordance with a manifest or specific addresses on the objects (e.g., in a mailing system).

Current distribution center sorting systems, for example, generally assume an inflexible sequence of operations whereby a disorganized stream of input objects is first singulated into a single stream of isolated objects presented one at a time to a scanner that identifies the object. An induction element (e.g., a conveyor, a tilt tray, or manually movable bins) transport the objects to the desired destination or further processing station, which may be a bin, a chute, a bag or a conveyor etc.

In typical parcel sortation systems, human workers or automated systems typically retrieve parcels in an arrival order, and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full or the controlling software system determines that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Adding to these challenges are the conditions that some objects may have information about the object entered into the manifest or a shipping label incorrectly. For example, if a manifest in a distribution center includes a size or weight for an object that is not correct (e.g., because it was entered manually incorrectly), or if a shipping sender enters an incorrect size or weight on a shipping label, the processing system may reject the object as being unknown. Additionally, and with regard to incorrect information on a shipping label, the sender may have been undercharged due to the erroneous information, for example, if the size or weight was entered incorrectly by the sender.

There remains a need for a more efficient and more cost effective object processing systems that process objects of a variety of sizes and weights into appropriate collection bins or boxes, yet is efficient in handling objects of such varying sizes and weights.

SUMMARY

In accordance with an embodiment, the invention provides a processing system for processing objects. The processing system includes a plurality of receiving stations for receiving a plurality of objects, each object being associated with prerecorded data, and a plurality of processing stations, each of which is in communication with at least one processing station. Each processing station includes perception means for perceiving data regarding an identity of any of an object or a bin of objects, and capture means for capturing characteristic data regarding an object to provide captured data. Each processing station further includes comparison means for comparing the captured data with the prerecorded data to provide comparison data, and a plurality of distribution stations, each of which is in communication with at least one processing station for receiving objects from the at least one processing station responsive to the comparison data.

In accordance with another embodiment, the invention provides a method of processing objects. The method includes the steps of receiving a plurality of objects, each object being associated with prerecorded data, providing a plurality of processing stations, each of which is in communication with at least one processing station, including perceiving data regarding an identity of any of an object or a bin of objects, and capturing characteristic data regarding an object to provide captured data, comparing the captured data with the prerecorded data to provide comparison data, and providing a plurality of distribution stations, each of which is in communication with at least one processing station for receiving objects from the at least one processing station responsive to the comparison data.

In accordance with a further embodiment, the invention provides an object processing verification system that includes a data repository for storing information about objects including: identifying information, object weight, object volume, and destination information, a first detection system that detects identifying information associated with the object, a second detection system that detects a volume associated with the object, a third detection system that detects a weight associated with the object, a computer processing system for comparing the detected identifying information, volume and weight with the volume and weight of the identified object that is stored in the data repository, and an object transportation system that routes an object to an advancement destination if the object's detected volume and weight match the stored volume and weight, and to an examination destination if the detected volume and weight do not closely enough match the stored volume and weight.

BRIEF DESCRIPTION OF THE DRAWINGS

The following description may be further understood with reference to the accompanying drawings in which:

FIGS. 17A-17D show illustrative diagrammatic views of a system in accordance with an embodiment of the present invention that includes three 3D scanners at a common elevation (FIG. 17A) and at multiple elevations as an isometric view (FIG. 17B), a top view (FIG. 17C), and a side view (FIG. 17D);

Figure 1:
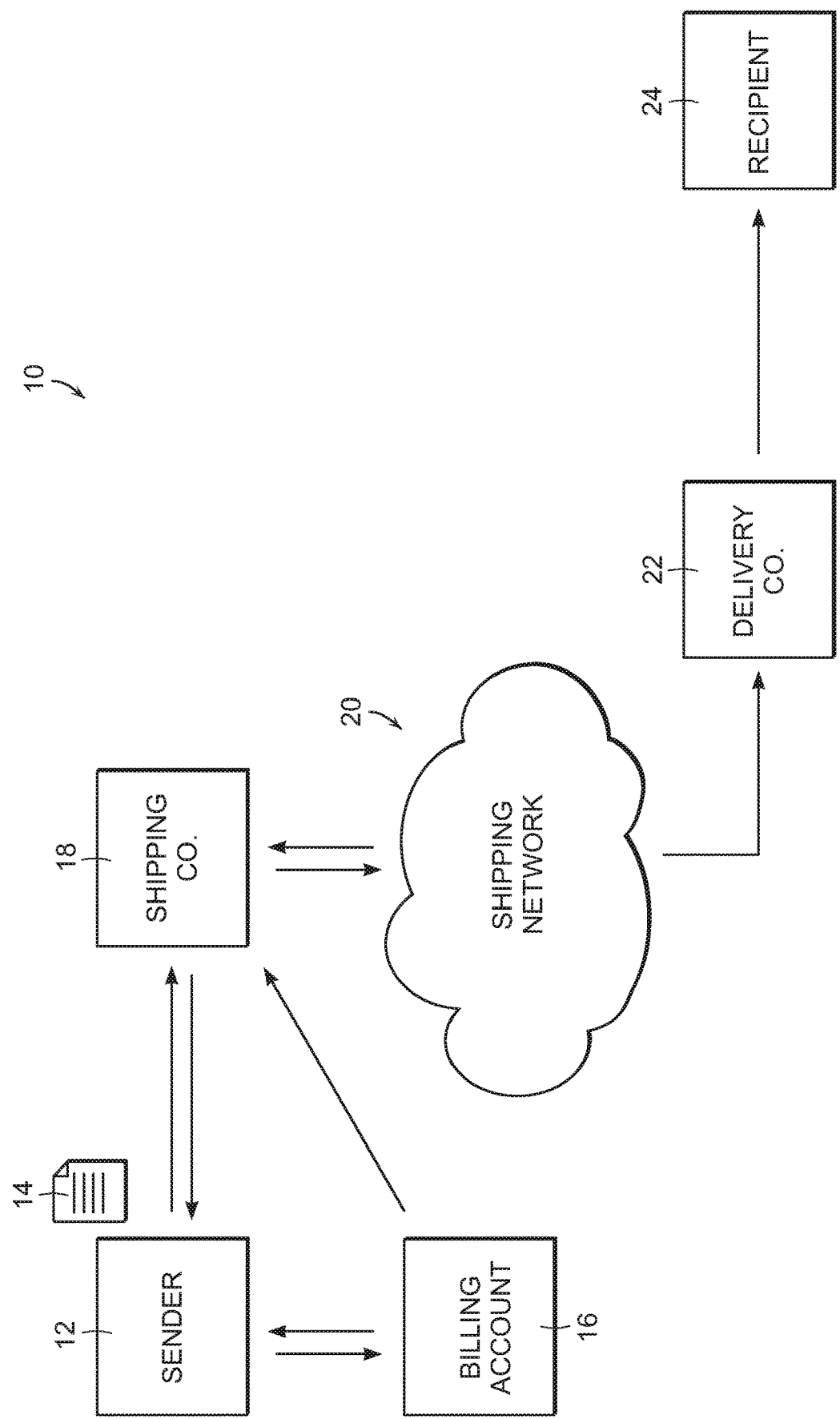
FIG. 1 shows an illustrative diagrammatic view of an object shipping system including an object processing system in accordance with an embodiment of the present invention.

The drawings are shown for illustrative purposes only.

DETAILED DESCRIPTION

In accordance with an embodiment, the invention provides an object processing system that not only tracks objects (e.g., packages, envelopes, boxes etc.), but also detects data regarding the objects at numerous points during processing, e.g., for pick validation and placement validation. The detected data is checked against a reference set of prerecorded data as provided by a manifest (manually or automatically generated) or a shipping label, etc. While the detected data may represent estimated mass, weight, size or volume, if significant discrepancies are found, the object may be held until the discrepancy is resolved, or the object is re-routed to be returned to its original sender.

More specifically, the system may determine an object's identity, and access the previously recorded data regarding the object. The previously recorded data may be provided by a manifest that provides for each object, unique identity data, its mass or weight and its size or volume or density, as well as its distribution information, such as a delivery address or a destination location. Identifying indicia that is representative of the identity data, such as a barcode, QR code or RFID label, is applied to the object. The previously recorded data may also be provided by the sender, for example, if the sender (or shipping company personnel) provides data regarding the object's mass or weight or sized or volume, density, etc. The shipping company personnel may then assign unique identity data to the object, and apply identifying indicia such as a bar code, QR code or RFID label, that is representative of the identity data. The destination information such as an address or destination location, is then associated with the object's identity data.

During processing, the system will determine an object's identity data, and will then determine the object's mass, weight, size, volume, density, etc. The system will then compare the determined data (e.g., mass, weight, size or volume) with the previously recorded data associated with the object's identity. If a discrepancy (e.g., of more than e.g., 2%-5%, or 10%) is found, the object is internally re-routed to a holding station until the discrepancy is resolved. The discrepancy may be resolved by having the shipping network contact the sender via the shipping company to have the sender's billing account information either credited or debited the correct amount to accommodate the discrepancy. If the discrepancy is not resolved, the object may be returned to the sender, for example, by assigning the sender's address as the destination address associated with the object's identity data. In this case, the system may override the prerecorded data, and assign the sender's address to be the destination address for the object. This will provide that the object is then returned to the sender, and may further include an explanation of the reason for the return, for example, by including a stamp or adhesive label that reports the determined mass, weight, size or volume.

In accordance with certain embodiments, the system may update the manifest if it is determined that the captured data more accurately reflects characteristics of the object. For example, the system may record known sizes and weights of common objects, and after multiple encounters with an object, the system may know that the perceived data is more accurate than the original data in the manifest. For example, the system may employ learning, in the sense of improving over time. The performance of picking as a function of object, pick station and handling parameters may not be known a priori. Furthermore, objects that have not been picked before will periodically be encountered. It is likely, however, that new objects that are similar to previously picked objects will have similar performance characteristics. For example, object X may be a kind of shampoo in a 20 ounce bottle, and object Y may be conditioner in a 20 ounce bottle. If distributed by the same company, then the shape of the bottles may be the same. The system includes processes that use observations of past performance on similar objects to predict future performance, and learns what characteristics of the objects available to the system are reliable predictors of future performance. The learning is in particular a learning process that (a) extrapolates the performance of newly seen objects, and (b) is continually updating the data with which it learns to extrapolate so as to continually improve performance.

FIG. 1 shows a system 10 in accordance with an embodiment of the invention in which a sender 12 of a package, box or flat object fills out information regarding the package on a shipping form 14, and pays for the shipping via a sender's billing account 16. The information that is supplied may include the object's mass and/or weight and/or size and/or volume etc., as well as the object's shipping address or destination location. The package is then delivered to a shipping company 18, where it is received and labeled with identifying indicia that is associated with the identity data of the object, which is in turn associated with the information supplied by the sender (the previously recorded data). The object is then provided to a shipping network 20 for processing and distribution.

During this processing, data regarding the package is obtained and recorded. If the data is incorrect (e.g., the package weighs much more than was initially recorded or has a greater volume than was initially recorded), the sender is notified (via the shipping company) and a further charge is applied to the sender's billing account 16. The package is not initially returned in an embodiment, but is only provided to a delivery company 22 when the account 16 is paid in full (or credited if overpaid) and the discrepancy is remedied. The package is then provided by the delivery company 22 to a recipient 24. If the discrepancy is not remedied (e.g., within 24 hours), the object is returned to the sender's address (e.g., by having the sender's address be assigned to the shipping address).

Figure 2:
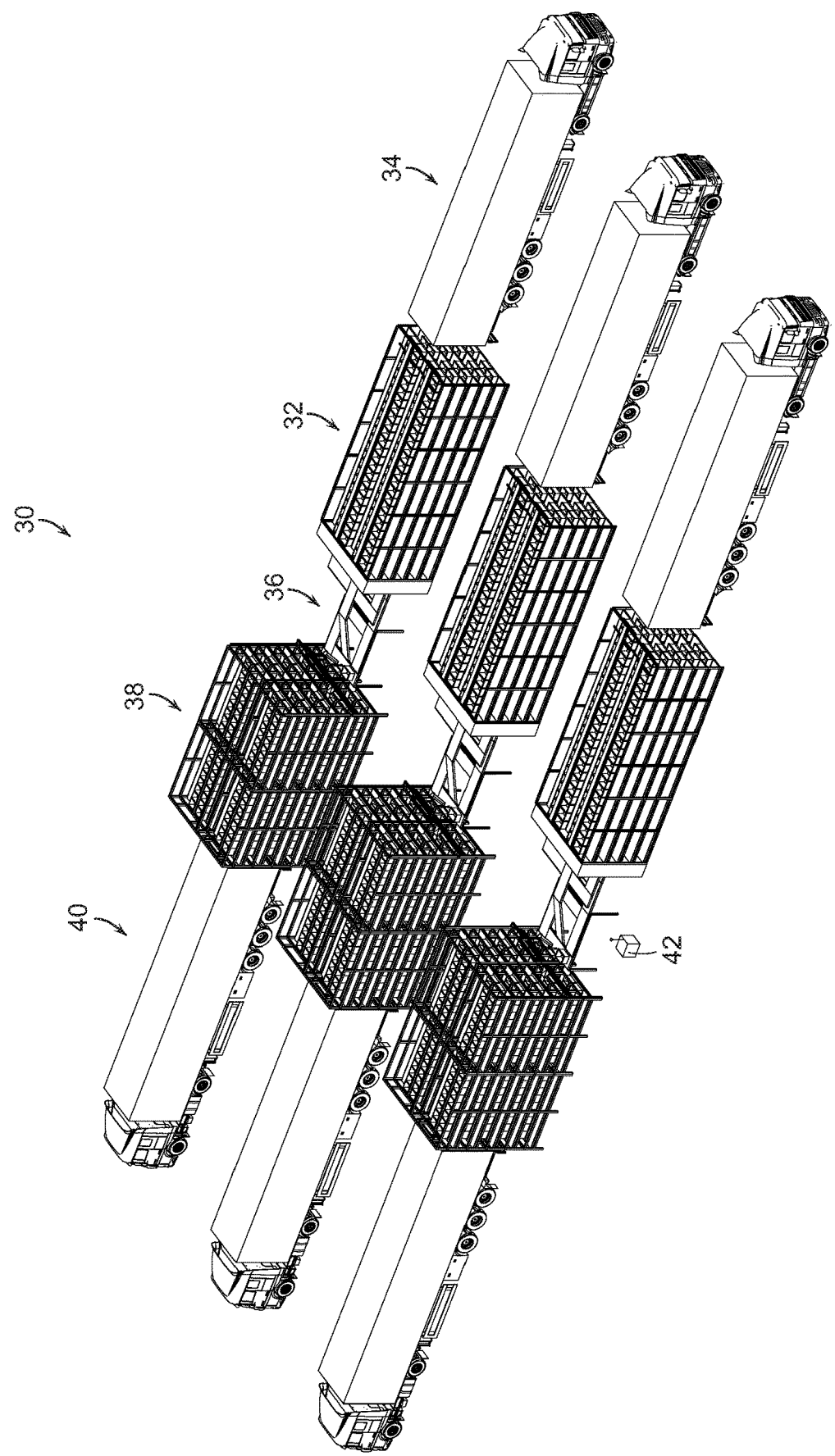
FIG. 2 shows an illustrative diagrammatic view of an object processing system in accordance with an embodiment of the present invention involving vehicle-to-vehicle processing.

The shipping network may include a variety of distribution systems such as the distribution system 30 shown in FIG. 2. The distribution system 30 includes a plurality of receiving stations 32 for receiving, for example, bins of objects from vehicles 34, a plurality of processing stations 36 that may process objects from the bins of objects from the receiving station 32, and a plurality of distribution stations 38 that may then provide processed objects in boxes to vehicles 40. The system may be controlled by one or more computer processing systems 42. The bins and boxes may be loaded into and out of the vehicles by providing racks in the vehicles (e.g., five levels of sets of three racks with rollers) and ramps from the vehicles to the receiving stations and from the distribution stations 38 to the vehicles. The receiving stations 32 and the distribution stations 38 also include racks for receiving and supporting the bins and boxes, as well as conveyors for moving the bins and boxes.

Figure 3:
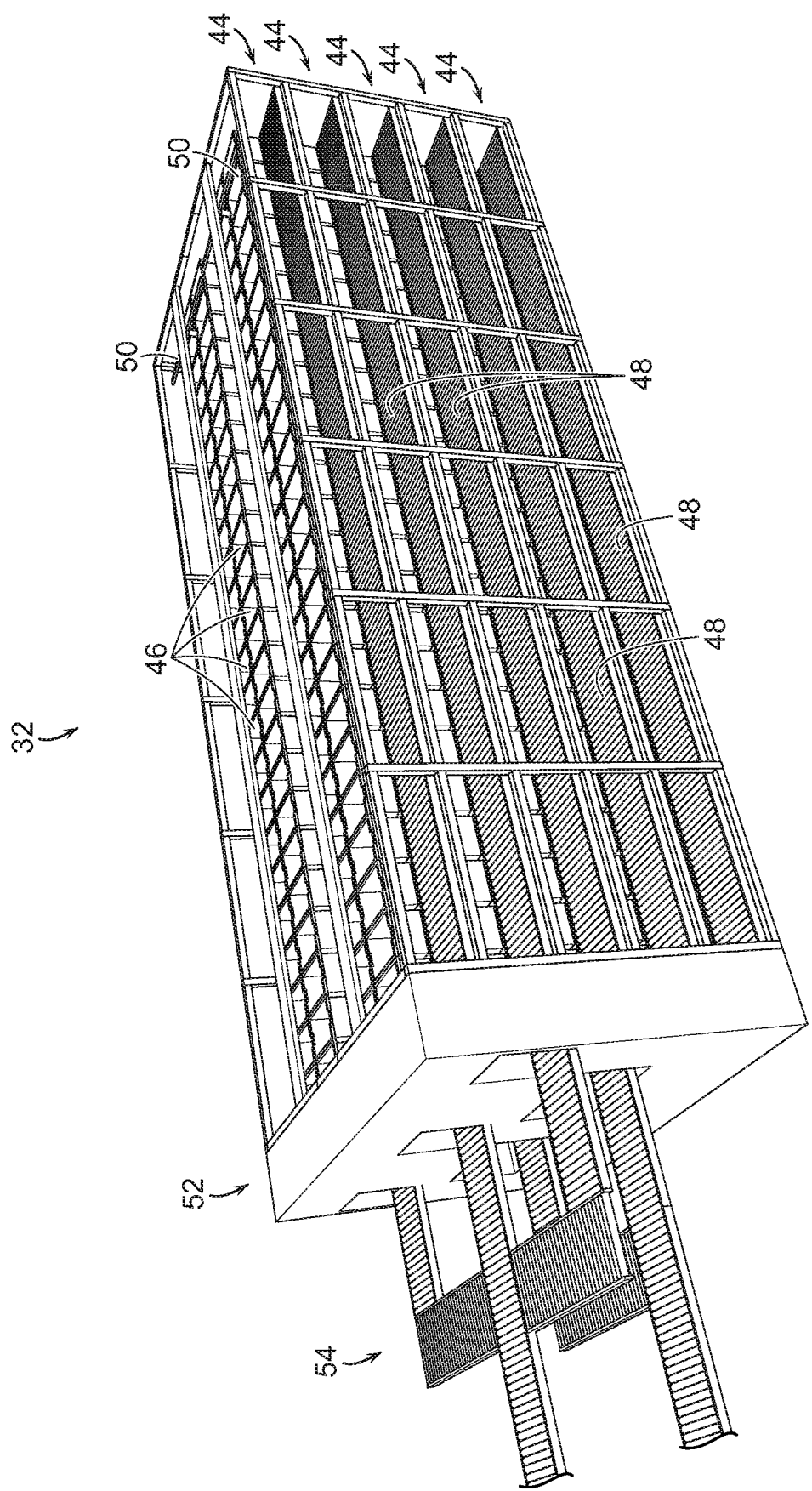
FIG. 3 shows an illustrative diagrammatic view of the receiving station of the object processing system of FIG. 2.

FIG. 3, for example, shows a receiving station 32 that includes a plurality of storage racks 44 (which may be provided as conveyors) for receiving a plurality of bins 46 that contain objects to be processed. In accordance with an embodiment, the order of the bins on each conveyor may be known, and the contents of each bin may be known. The receiving station 32 also includes a plurality of source conveyors 48 that provide selected bins to the processing station 34 via a directional routing station 52 that routes bins between the levels of the receiving station 36 (e.g., by lifts or ramps) so that the bins may be provided to processing conveyors 54. The source conveyors 48 may therefore each serve more than one row of bins. FIG. 3, for example, shows three source conveyors 48 that serve two sets of two rows of bins 46. Each set of the rows of bins also includes a bin displacement mechanism 50 that is adapted to travel along a set of two rows of bins and is adapted to selectively displace a bin onto the adjacent source conveyor 48. In this way, selected bins are provided to the source conveyors 48 and to processing conveyors 54 via the directional routing station 52.

Figure 4:
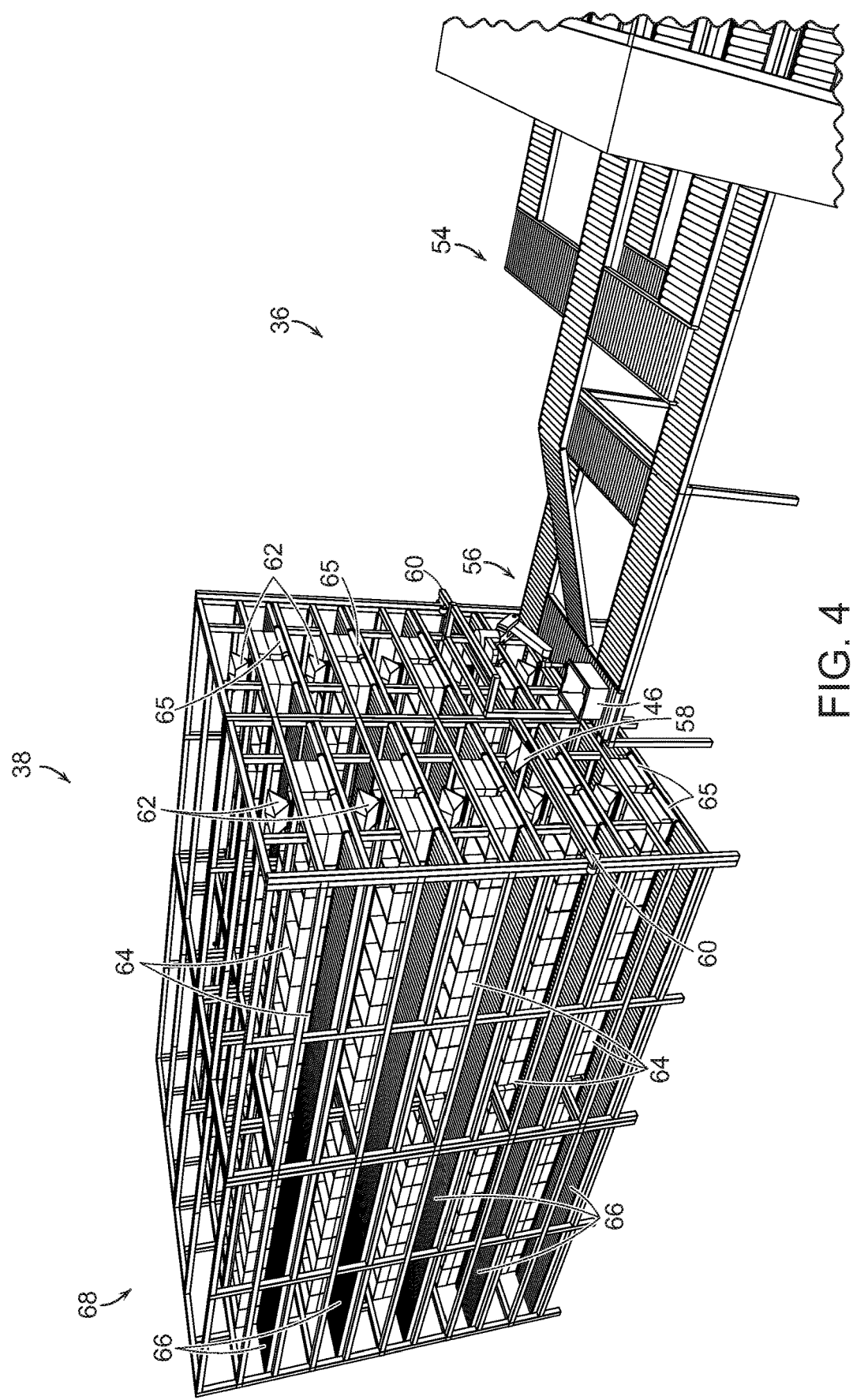
FIG. 4 shows an illustrative diagrammatic view of the distribution station of the object processing system of FIG. 2.

With reference to FIG. 4, the processing station 36 includes the processing conveyors 54 as well as a programmable motion device 56. Bins from the receiving station 32 are provided to the programmable motion device 56, and the programmable motion device 56 picks an object from a bin 46 and places it into a first carriage 58 that is mounted on an X-Y movable stage 60 of the distribution station 38. The order of each of the boxes 64 on the racks or conveyors 65 is known. The first carriage 58 then moves to a selected floor level and a second carriage 62 at a processing end of a set of rows of boxes 64 (which are provided on conveyors 65 as shown). The destination station 38 also includes a plurality of output conveyors 66 for providing boxes from the sets of two rows of boxes to a distribution end 68 of the destination station 38, again by using a displacement mechanism (e.g., as discussed above with reference to FIG. 3) for selectively displacing a box onto an adjacent output conveyor 66.

Figure 5:
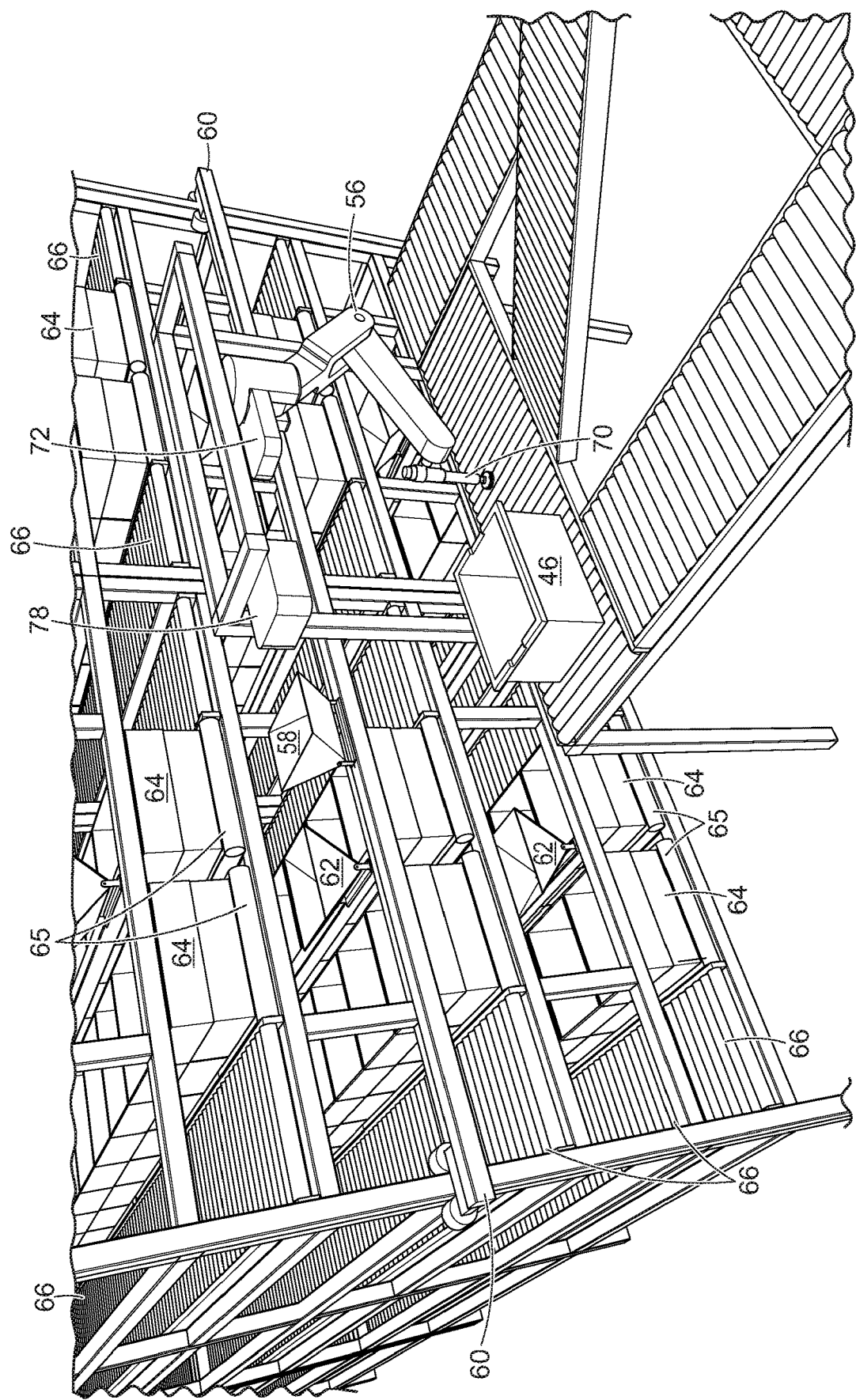
FIG. 5 shows an illustrative diagrammatic view of the processing station of the object processing system of FIG. 2.
Figure 6:
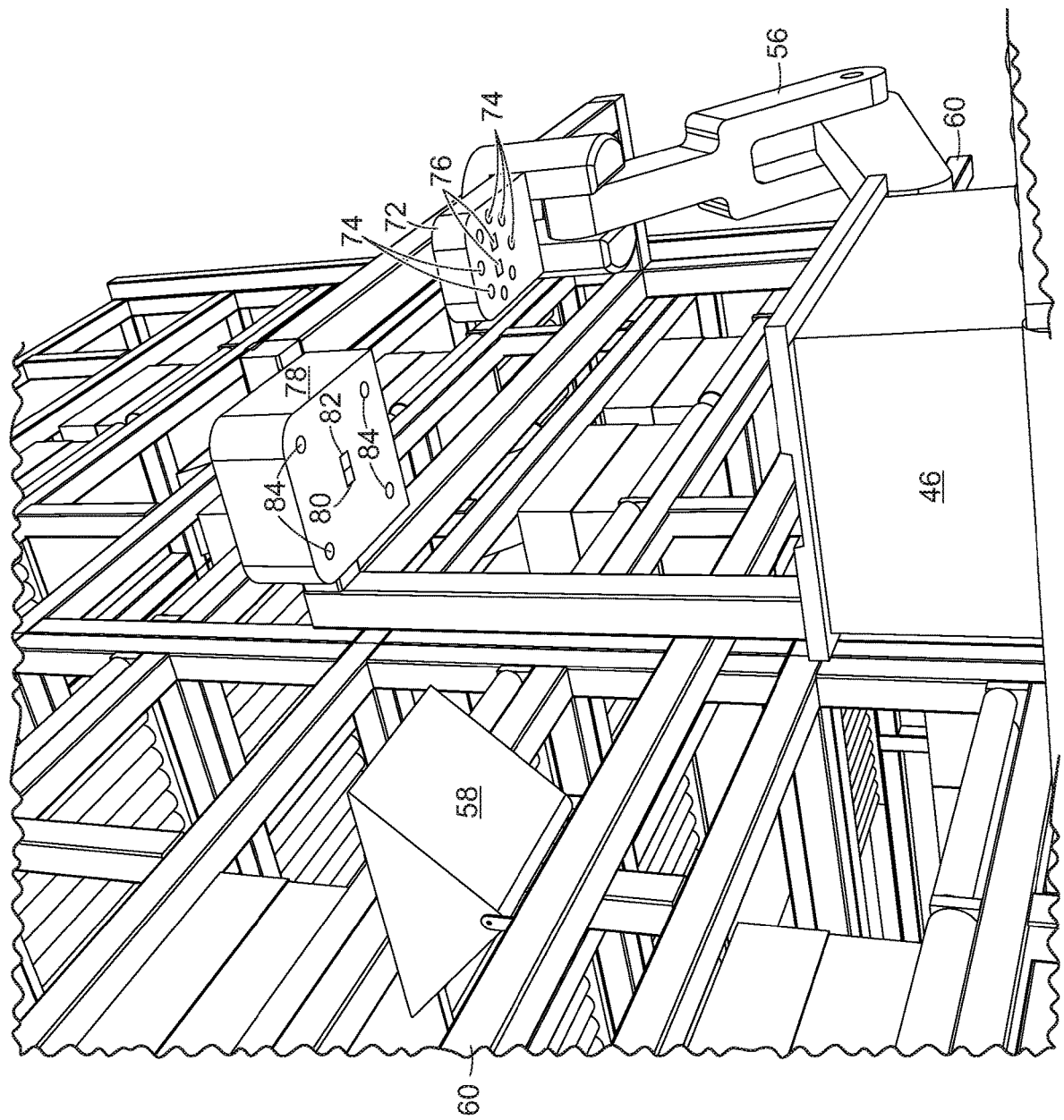
FIG. 6 shows an illustrative diagrammatic underside view of the detection system and capture system of the processing station of FIG. 5.

The programmable motion device 56 (e.g., a robotic articulated arm) of the processing station 36 includes an end effector 70 (e.g., a vacuum cup, grasping gripper, or other retention device) as well as a detection system 72 as shown in FIG. 5. As further shown in FIG. 6, the detection system may include lights 74 as well as one or more perception units 76 (e.g., scanners or cameras) for detecting any identifying indicia (e.g., barcode, QR code, RFID, labels etc.) on objects within the bin 46 and for guiding the programmable motion device 56 to grasp the object within the bin with the end effector 70 (shown in FIG. 5). By this system, selected objects are acquired from the bin, and transported via the carrier 58 and then a carrier 62 to a desired box 64.

Such robotic pickers are used in many different types of applications in material handling. In one case a robotic picker may be employed to pick a single object from a collection of the same types of objects, and then transfer the picked object to a container or conveyor or other destination location. In some cases the robotic picking technology uses cameras and 3D scanners to sense and analyze the pick face before it, automatically choosing the best place to pick an object based on a variety of criteria. Under certain circumstances, the robotic picking system can mistakenly pick two or more objects. This is an undesirable behavior, as this impacts the accounting of goods at the receiver, and results in a miscount of goods in the tracking of the number of remaining objects in inventory. What is desired are methods to sense whether the robot has picked more than one object, either before it is placed into the outgoing container or conveyor, so as to prevent the transfer of multiple objects, or after it has been placed, so that inventory counts can be updated. In certain further embodiments, again such as where the robotic picker is picking from a tote of homogenous objects, the system may, upon detecting a double-pick, route the double-pick to an output destination that is scheduled to receive two such objects.

Figure 7A:
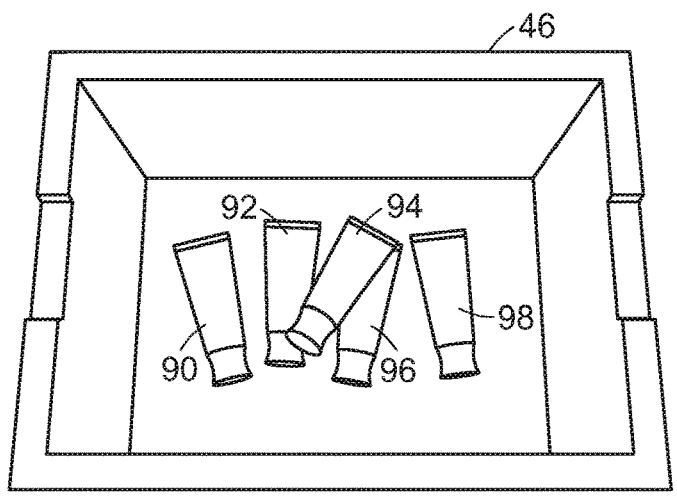
FIGS. 7A-7D show illustrative diagrammatic plan views of a bin undergoing volumetric and/or density analyses of homogenous objects, prior to analyses (FIG. 7A), prior to picking an object (FIG. 7B), following the pick of an object (FIG. 7C), and isolating the volume of the picked object from the bin volume (FIG. 7D)
Figure 7B:
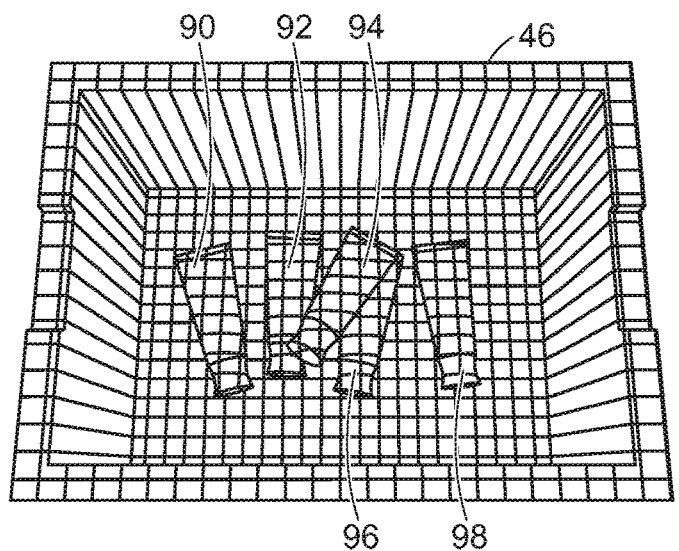
Figure 7C:
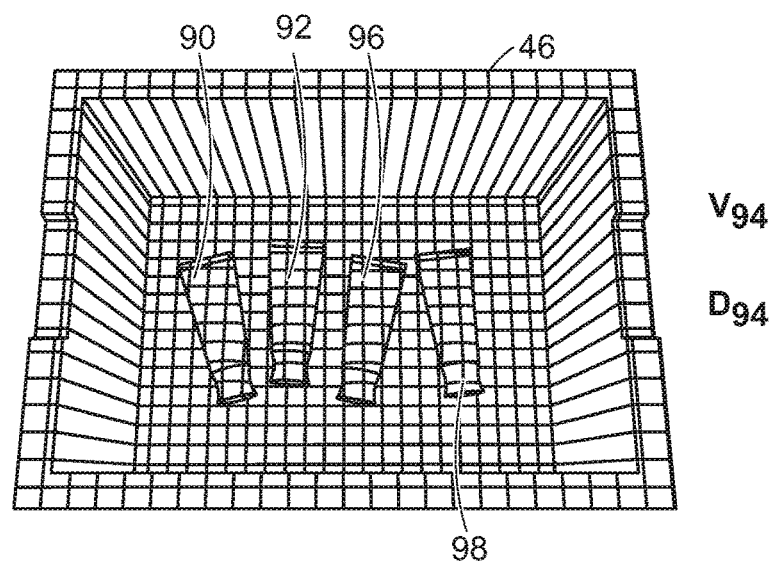

The processing station 36 also includes a capture system 78 that includes scanning and receiving units 80, 82, as well as edge detection units 84 for capturing a variety of characteristics of a selected object of the whole bin. FIG. 7A shows a view from the capture system 78, which in accordance with an embodiment, may include a set of similar or dis-similar objects 90, 92, 94, 96, 98. The difference in volume between the scans shown in FIGS. 7B and 7C is the estimated volume of the removed object 94, $V_{94}$. This volume is compared with recorded data regarding the object that is identified by the identifying indicia as provided by the detection system 72 or the recorded object data.

In particular, the contents of the bin are volumetrically scanned as shown in FIG. 7B prior to removing an object from the bin 46, and are volumetrically scanned after removing an object 94 from the bin 46 as shown in FIG. 7C. The volumetric scanning may be done using scanning and receiving units 80, 82 together with the processing system 42, that send and receive signals, e.g., infrared signals. In accordance with an embodiment, the volume captured in FIG. 7C is subtracted from the volume captured in FIG. 7B, and the difference is assessed as the estimated volume of the object 94 (1794) that is removed. In accordance with other embodiments, the system, knowing that it will be acquiring object 94, may capture volumetric data regarding the object 94 while the object 94 is still in the bin (as shown in FIG. 7B). This may be done in place of or in addition to the volumetric subtraction (between FIGS. 7B and 7C) discussed above. In accordance with further embodiments, the scanning and receiving units 80, 82 may also be employed to determine an object's density, $D_{94}$, from knowing the object's mass and volume. The volumetric data may be obtained for example, using any of light detection and ranging (LIDAR) scanners, pulsed time of flight cameras, continuous wave time of flight cameras, structured light cameras, or passive stereo cameras.

Figure 7D:
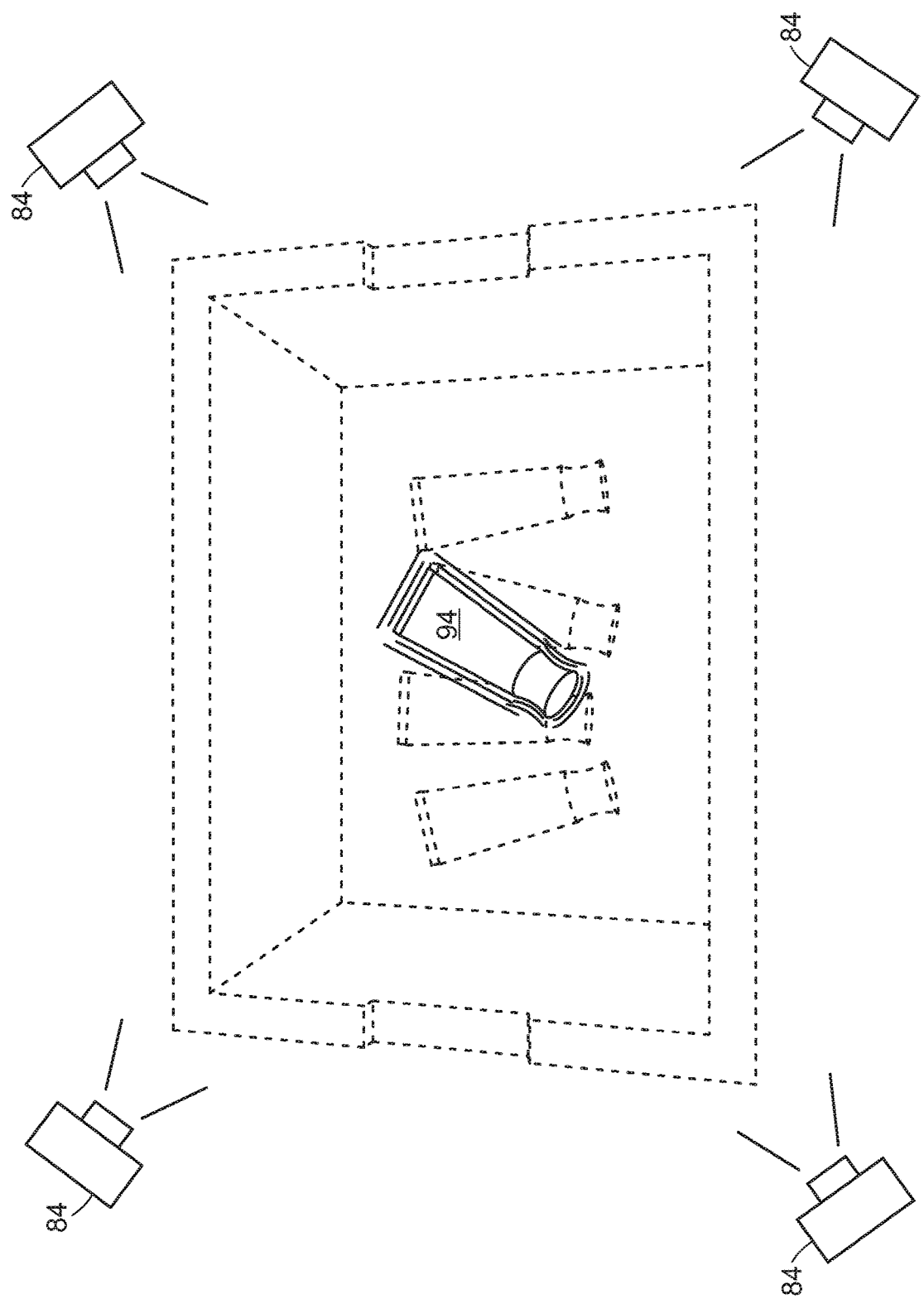

In accordance with further embodiments, the system may additionally employ edge detection sensors 84 that are employed (again together with the processing system 42), to detect edges of any objects in a bin, for example using data regarding any of intensity, shadow detection, or echo detection etc., and may be employed for example, to determine any of size, shape and/or contours as shown in FIG. 7D. The system may also alter illumination source locations to aid in edge detection by, for example, cycling through lights 74 on detection system 72 to highlight different edges, or measure depth or surface discontinuities using volumetric or surface scanning.

If the captured data (e.g., volume, density, size etc.), is confirmed therefore within a reliable tolerance, then the object continues to be processed in accordance with a manifest or a shipping label. If not, however, the object may be directed to a holding location (e.g., a box that is assigned as a holding location), where it may remain until the discrepancy is resolved. For example, in certain embodiments, weight measuring may be provided by certified postal weights, which would have a high reliability value, and could be trusted for rerouting decisions for measurements near the tolerance threshold. On the other hand, for similar measurements near a tolerance threshold using less reliable weight measuring, such as measurements made with machines that may not be certified postal calibrated, objects would have to be re-routed for manual verification of weight (and appropriate further expense charging).

With reference again to FIG. 5, objects are placed into the carriage 58 and delivered to any of the carriages 62 by moving the carriage 58 along the X-Y movable stage 60 and then tipping the carriage 58 to drop the object into the carriage 62.

In accordance with further embodiments, the system may estimate a volume of an object while the object is being held by the end effector. Although with certain types of object processing systems (e.g., package sortation for shipping/mailing) volume may not be as helpful (for example when handling deformable plastic bags), in other systems such as store replenishment or e-commerce applications, volumetric scanning would be very valuable. In particular, the system may estimate a volume of picked object (or objects) while being held by the end effector, and compare the estimated volume with a known volume. To capture the estimated volume, one or more perception units (e.g. cameras or 3D scanners) are placed around a scanning volume in an embodiment to capture volume data.

Figure 8:
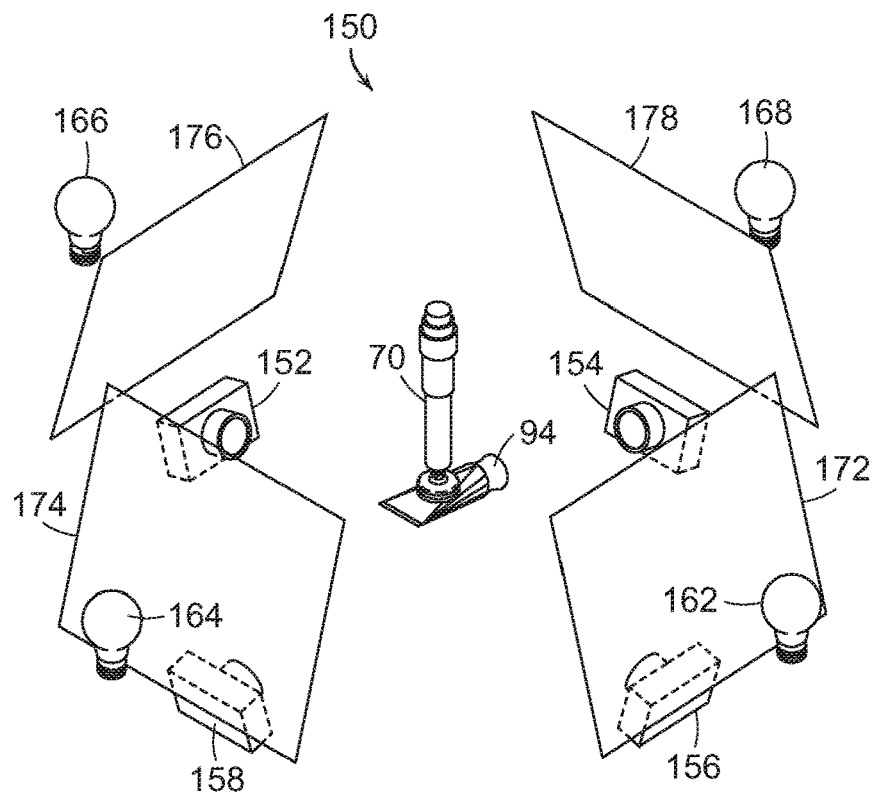
FIG. 8 shows an illustrative diagrammatic view of a plurality of perception units positioned around a scanning volume.
Figure 9:
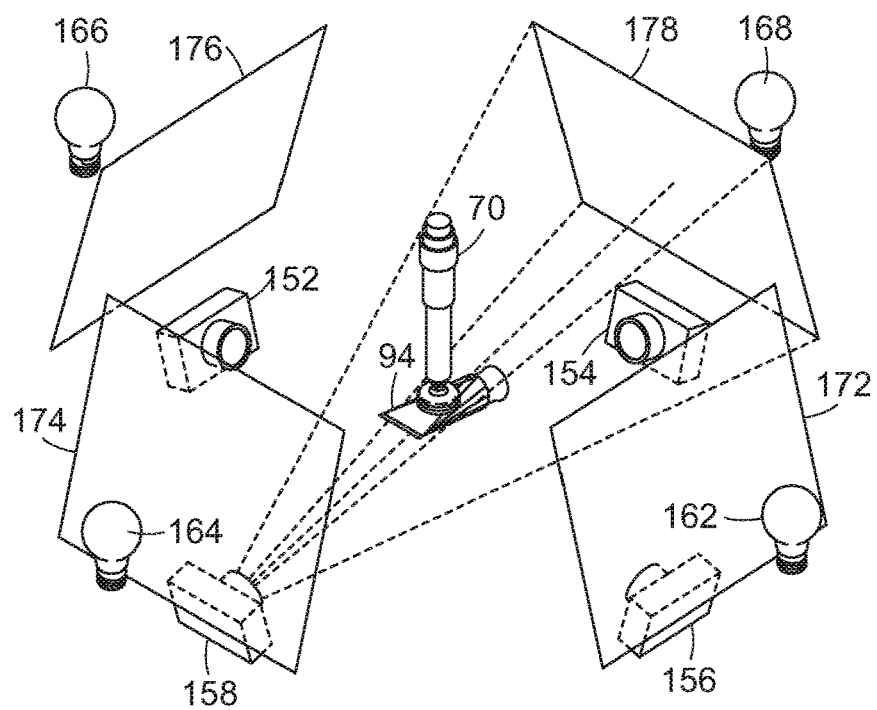
FIG. 9 shows an illustrative diagrammatic view of the plurality of perception units of FIG. 8 positioned around a scanning volume with a perception unit and illumination source pair being engaged.
Figure 10:
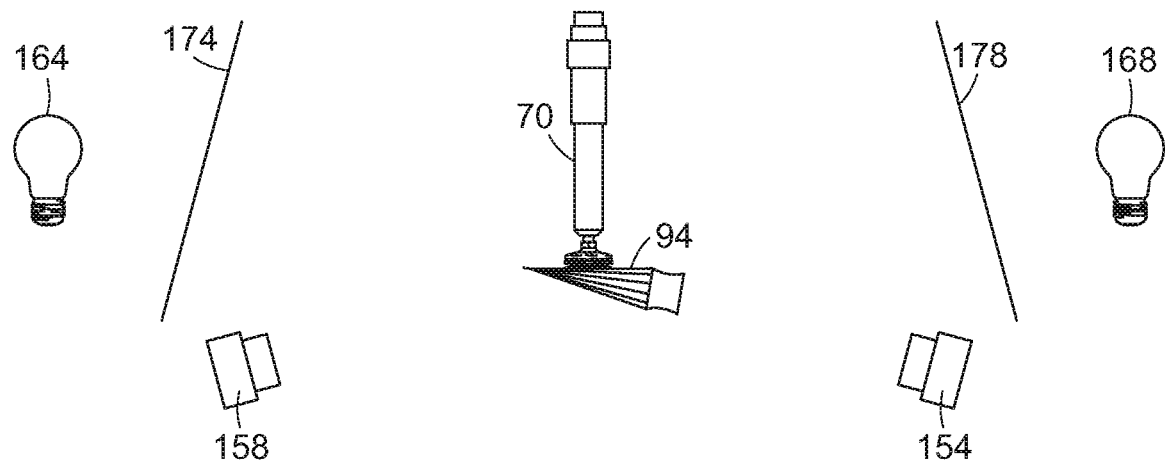
FIG. 10 shows an illustrative diagrammatic side view of the a pair of a perception unit and illumination source of FIG. 8.
Figure 11:
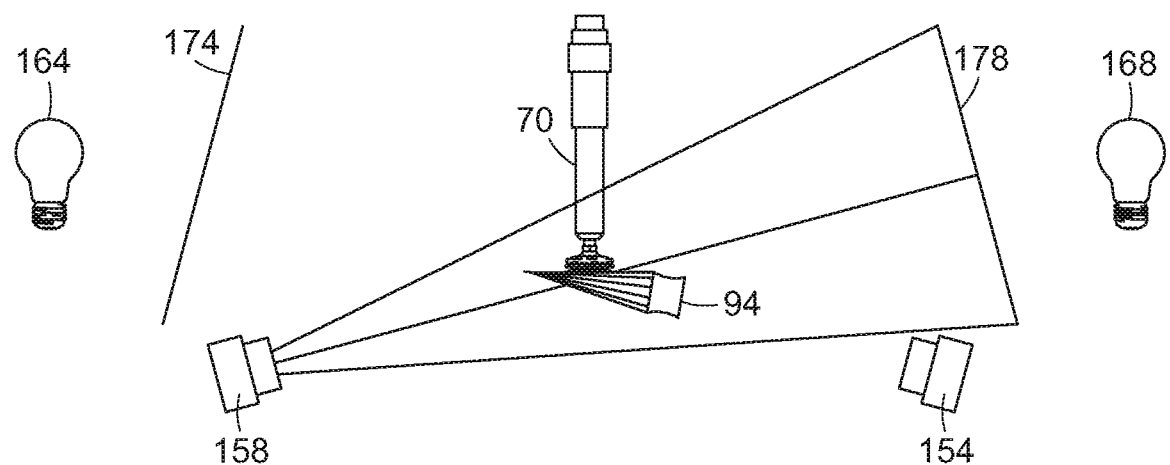
FIG. 11 shows an illustrative diagrammatic side view of FIG. 10 with the pair of the perception unit and the illumination source pair being engaged.

With reference to FIGS. 8 and 9, one or more perception units 152, 154, 156, 158 (e.g., cameras or 3D scanners) are placed around a scanning volume (including an end effector 70 and object 94), each being positioned opposite an illumination source 162, 164, 166, 168 and optionally including a diffusing screen 172, 174, 176, 178. As shown in FIG. 9, an illumination source and perception unit pair (e.g., 158, 168 and 178) may be engaged at the same time. With further reference to FIGS. 10 and 11, opposite each perception unit is the illumination source 162, 164, 166, 168 as well as the optional diffusing screen 172, 174, 176, 178 in front of the respective illumination source.

Figure 12:
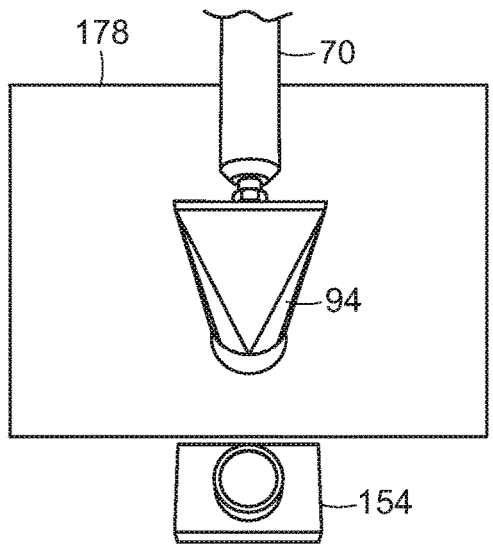
FIG. 12 shows an illustrative diagrammatic view of an object from a first perception unit.
Figure 13:
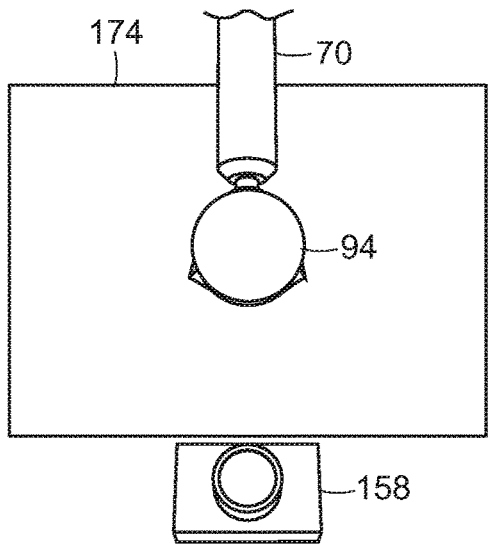
FIG. 13 shows an illustrative diagrammatic view of the object of FIG. 12 from a second perception unit.
Figure 14:
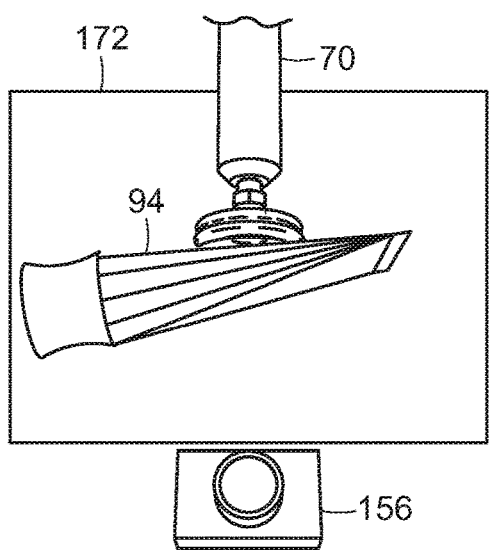
FIG. 14 shows an illustrative diagrammatic view of the object of FIG. 12 from a third perception unit.
Figure 15:
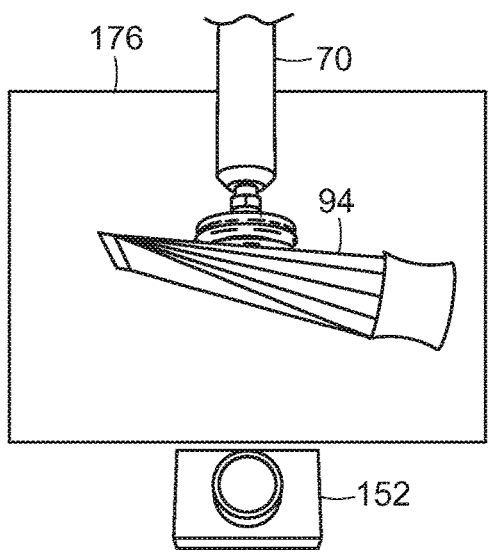
FIG. 15 shows an illustrative diagrammatic view of the object of FIG. 12 from a third perception unit.

As shown in FIG. 11, perception data regarding the object 94 as backlit by the illumination source (e.g., 168) and diffuser (e.g., 178) will be captured by each perception unit (e.g., 158). FIG. 12 shows the view of the object 94 from camera 158 showing the lower back end, FIG. 13 shows the view of the object from camera 154 showing the lower front end, FIG. 14 shows the view of the object from camera 152 showing the lower left side, and FIG. 15 shows the view of the object from camera 156 showing the lower right side. In accordance with various embodiments, three perception units may be used, spaced apart by 120 degrees, and in accordance with further embodiments, fewer perception units may be used (e.g., one or two), and the object may be rotated between data acquisition captures.

The scanning volume may be the volume above the area where the objects are picked from; or the scanning volume may be strategically placed in between the picking location and the placing location to minimize travel time. Within the scanning volume, the system takes a snapshot of the volume of objects held by the gripper. The volume could be estimated in a variety of ways depending on the sensor type as discussed above.

For example, if the sensors are cameras, then two or more cameras may be placed in a ring around the volume, directed slightly upward towards a backlighting screen (as discussed above) that may be in the shape of sections of a torus, where the gripped volume is held in between all the cameras and the brightly lit white screen. The brightly lit screen backlights the one or more held objects, so that the interior volume appears black. Each perception unit and associated illumination source may be activated in a sequence so that no two illumination sources are on at the same time. This allows easy segmentation of the held volume in the image.

The object may be illuminated with ambient lighting, may be provided as a particular wavelength that is not present in the room, may be modulated and detectors may demodulate the received perception data so that only illumination from the associated source is provided. The black region once projected back into space, becomes a frustum and the objects are known to lie within a solid frustum. Each camera generates a separate frustum, with the property that the volume of the objects is a subset of all of the frustums. The intersection of all the frustums yields an upper bound on the volume of the object(s). The addition of a camera improves the accuracy of the volume estimate. The gripper may be visible within the cameras, and because its position and size are known, its volume can be subtracted out of the frustum or volume estimate.

If instead, 3D scanners that obtain 3D images of the scanning volume are obtained, then the volume estimates are obtained in a similar way by fusing together the point clouds received from each sensor, but without the need for segmenting the images from the background using backlighting. Each 3D scanner returns a 3D image, which for each pixel in the image returns a depth.

In accordance with other embodiments, 3D scanners may be used that obtain 3D images of the scanning volume, then the volume estimates are obtained in a similar way by fusing together the point clouds received from each sensor, but without the need for segmenting the images from the background using backlighting. Each 3D scanner returns a 3D image, which for each pixel in the image returns a depth, and again, may use any of light detection and ranging (LIDAR) scanners, pulsed time of flight cameras, continuous wave time of flight cameras, structured light cameras, or passive stereo cameras, etc.

The system may therefore compare the object volume to the difference in volumes of the picking area before and after pick. Another approach is to analyze either or both of the picking or placing volumes using a 3D scanner, and then to estimate the amount of additional or subtracted volume observed in the perceived areas. For example, first, the picking area is scanned with a 3D scanner that recovers a 3D point cloud of the area. Second, the robot picker picks an object with the aim of picking a single object. Third, the picking area is re-scanned, and an estimate is formed of how much volume was taken away from the picking area. Fourth, using that volume estimate, as above, a decision is made in accordance with one or more defined thresholds as to whether that volume difference is believed to exceed the volume of a single quantity of the object by a predetermined threshold.

In accordance with further embodiments, the system may scan the picking volume before and after picking, and compare estimated volumes. In this case, the volume of the picking or placing area might be estimated in the following way. The 3D scanner is assumed to be looking approximately down at the picking area, or at a slight angle. The 3D scanner provides an image of the area and for every pixel in the image it provides a range to the geometry in the direction of the pixel. With this array of range measurements a point cloud may be formed. This point cloud represents points in three dimensional space that are estimated to be on the top surface of the pick face, where the pick face is the topmost surface of the objects to be picked. The area of the pick face can be discretized into a grid of vertical columns, and for each vertical column, an estimate of the height of the geometry within the vertical column can be obtained by taking the maximum, mean, median, minimum, or some other robust statistic of the heights of the points that lie within the column. Then, the volume of the picking area is the sum of the values of the height values estimated for each vertical column.

For various reasons, such as resolution, reflections, or transparency, some vertical columns may not have any point cloud points, in which case the resolution may be changed adaptively so that vertical columns are wide enough that none are empty of point cloud points. Statistics of various kinds may be obtained to determine a bound for the volume, such as employing the variance of the heights of the points within the columns to obtain an overall variance for the pick area volume. In this way, an estimate of the differential volume can be obtained in either the picking area, where the volume of the area would decrease by a single pick if a single object were indeed picked; or, where the volume of the area would increase by a single pick if a single object were indeed placed; or, both a differential volume of picking and placing may be estimated and combined to combat noise and errors in estimation.

Figure 16:
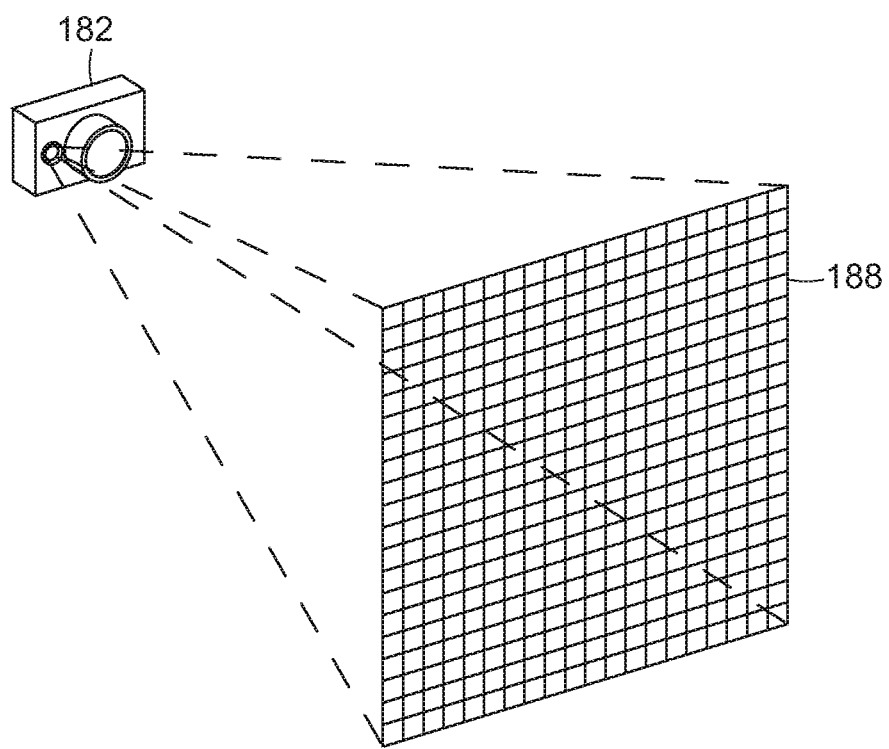
FIG. 16 shows an illustrative diagrammatic view of a 3D scanner and scan field for use in a system in accordance with an embodiment of the present invention.
Figure 17A:
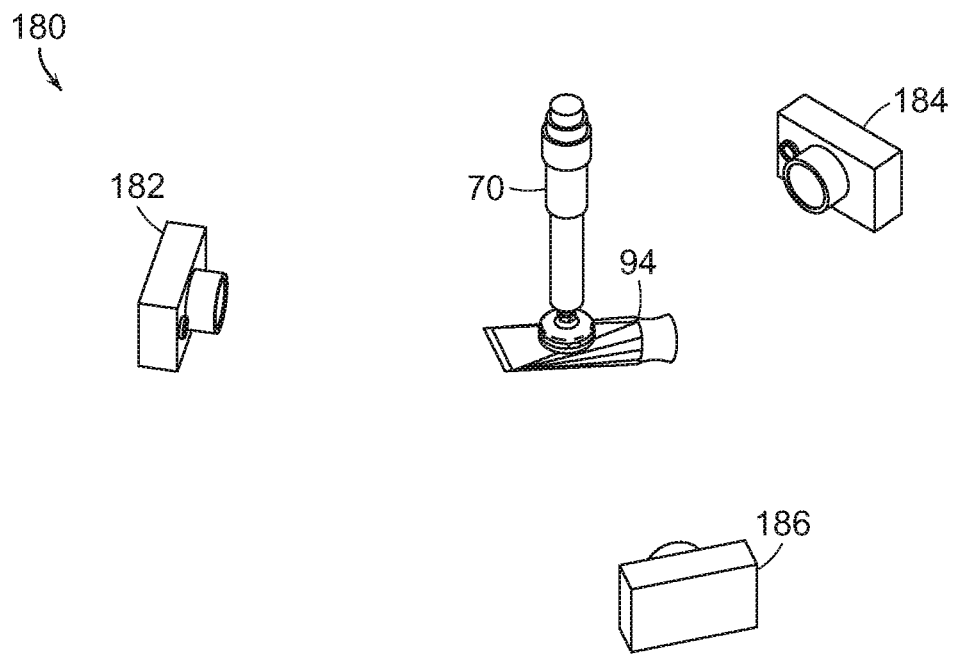

FIG. 16, for example, shows a structured-light 3D scanner 182 that projects a grid 188 onto a field of view. The 3D scanner 182 may be used in a system 180 as shown in FIG. 17A together with one, two, or three other 3D scanners (two others are shown at 184, 186). The 3D scanners are directed toward a common volume in which the object 94 is positioned while attached to the end effector 70. With three such 3D scanners, the scanners may be positioned one hundred twenty degrees apart (ninety degrees apart if four are used, and opposing each other if only two are used). FIGS. 17B-17D show a system 189 having upper perception units 183a, 185a, 187a above and lower perception units 183b, 185b, 187b below an object 94 held by end effector 70 to provide further perspective and greater reliability of volume estimates provided to the system. As shown in FIG. 17C, the upper perception units and lower perception units are provided at different angles to capture more data points with respect to the held items. FIG. 17D illustrates the vertical separation and different perspectives of upper perception unit 183a and lower perception unit 187b. While the system 189 is shown with 6 perception units, a single perception unit, or a single upper and single lower perception unit, can be used if rotated around the object to see all sides.

Figure 18:
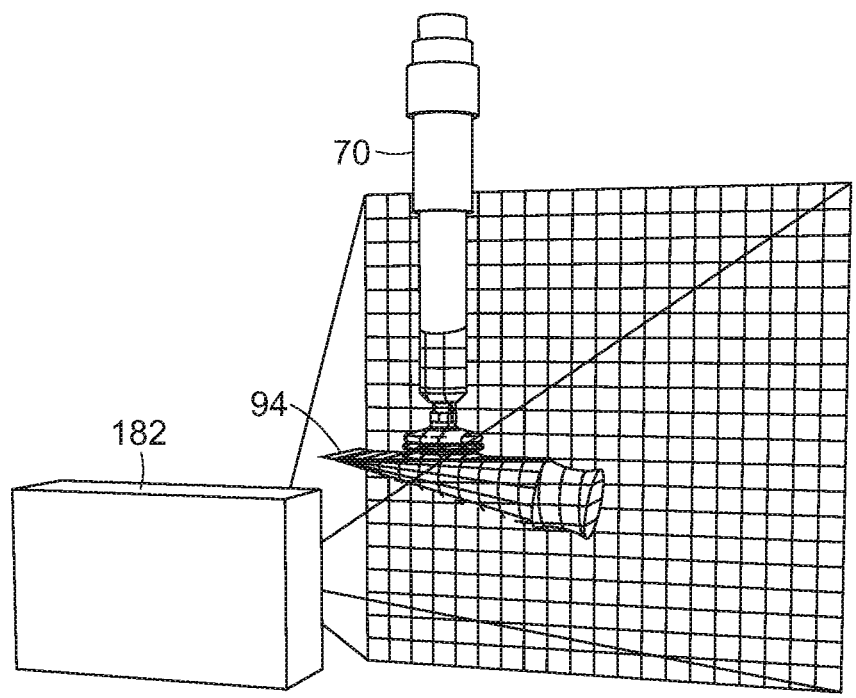
FIG. 18 shows an illustrative diagrammatic view of a 3D scanning system for use in accordance with embodiment of the present invention scanning an object and a portion of an end effector grasping the object.
Figure 19:
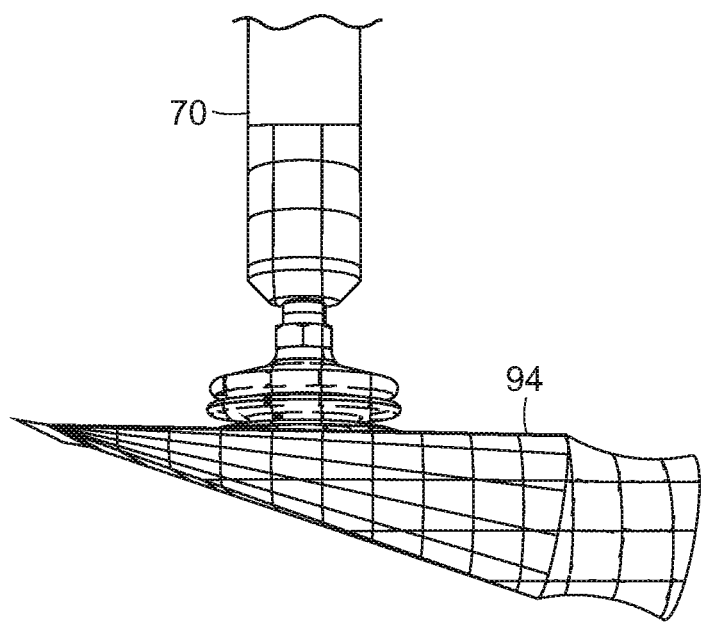
FIG. 19 shows an illustrative diagrammatic side view of the scanned object and scanned portion of the end effector to be subtracted from the full scanned volume.

With reference to FIGS. 18 and 19, each 3D scanner (e.g., 182) captures 3D data regarding the object. As the grid is displayed over the object, the lines become distorted when viewed from various perspectives. The distorted views can then be used for geometric reconstruction to determine the surface profile of the object. The volume of the end effector may be removed from the captured data once it is identified during reconstruction. The displayed grid or other line pattern can be provided as coherent laser light or incoherent light, and with stationary or dynamic patterning.

In either or any approach to obtaining a volume estimate, the volume estimate is then compared to the known volume of the object. Because the sensor data may be noisy, and because the various algorithms for estimating volume may result in small errors, the thresholds for deciding whether more than one pick has occurred are tuned to balance the number of false positives (picks estimated to contain more than one object, but in actuality only one is held) and false negatives (picks estimated to contain a single object, but in actuality contain more than one), depending on the application. The tuned threshold may also depend on the object in question, and each object may have its own threshold. If it is determined that the threshold has been exceeded, the objects may be placed back into the area from which they were picked so that the robot may try again to pick a single object.

Figure 20:
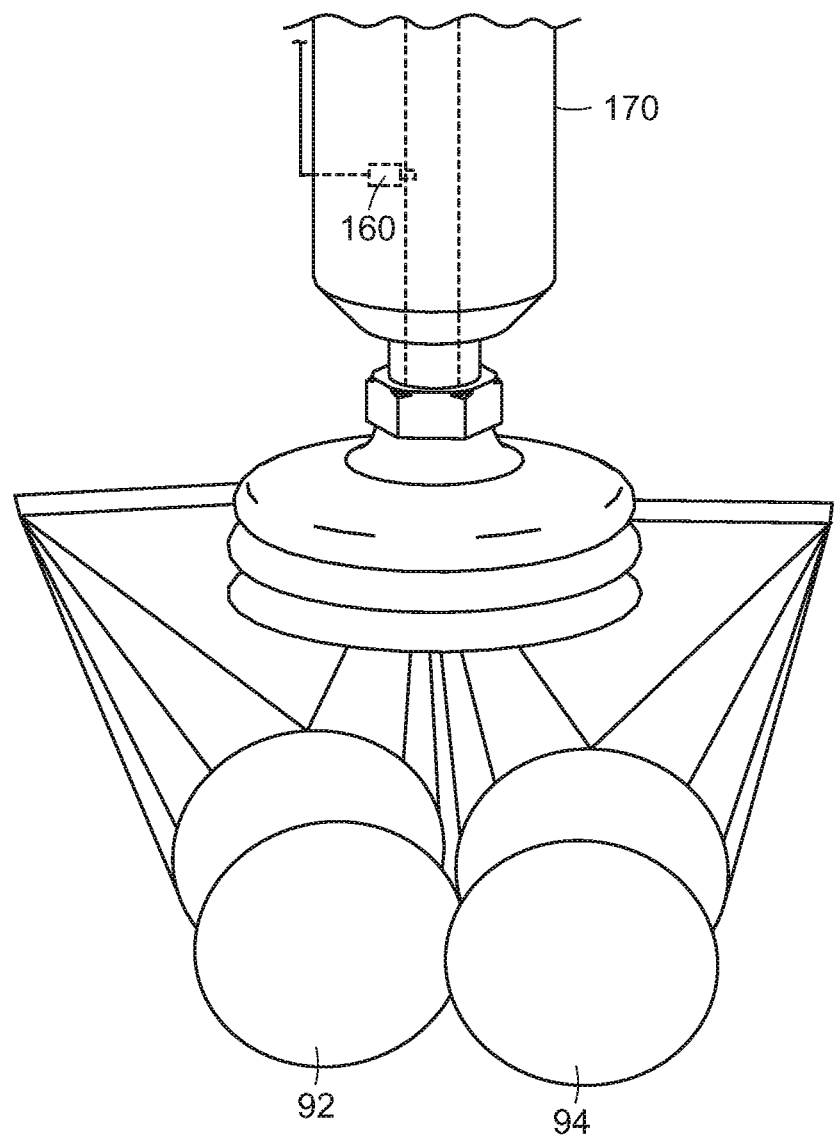
FIG. 20 shows an illustrative diagrammatic view of an end effector system for use in accordance with an embodiment of the present invention that includes a sensor for detecting potential errors in grasps such as, for example, a multi-pick.

In accordance with further embodiments, the system may detect multiple picks by automatically perceiving leaks from flow or pressure data. With reference to FIG. 20, the system may use an end effector 170 that includes a sensor 160 such as a flow sensor or pressure sensor. For example, the system may detect a much greater flow (or an increase in vacuum pressure) than anticipated for an object 94, which may be because two objects (92, 94) were grasped, causing a substantial amount of air to be drawn into the end effector 170 from between the two objects.

The system may therefore detect multiple picks by automatically perceiving leaks from flow or pressure data. Another approach is to compute from observations of flow and pressure while holding an object statistics with which to compare to statistics collected when the same object was collected before. In further embodiments, the system may compute from time series data of flow and/or pressure, while holding the object, the variance and other statistics with which to compare statistics from when the same object or similar object was previously gripped. In further embodiments, the system may compare the obtained values, and if the difference lies above a certain threshold, then rule it as an instance of picking more than one of the object. In further embodiments, the system may employ a linear classifier, support vector machine, or other machine learning-based classifier to discriminate between single or multiple picks using flow or pressure data. Additionally, the system may combine any subsets of the above approaches. The system may also use performance models of any of the above, where the system knows the probability of a single or multiple pick given the output of a detection, and may then combine any or all of the approaches above.

In certain applications, such as when picking from a homogenous tote of objects, the system may identify active orders (e.g., from a manifest) that require two such objects (and do not yet have the total number of such objects, requiring at least two more). The system may then route an identified double pick to the identified location, noting that two such objects have been delivered to the identified location. Such a system however, must maintain active monitoring of the grasp, and may learn over time which types of objects may be more likely to result in a multi-pick and which such multi-picks may be reliably delivered by the end effector, and further may be processed together further in the processing system. In particular, if a shuttle carriage is used, the system must know that two such objects will fit into the carriage at the same time. The presence of the two such object pick will be confirmed if the shuttle carriage includes weight sensing as discussed here with reference to FIGS. 21-32. As the system may learn not only the types of objects that may be processed as a multi-pick, the system may also learn the types of grasps that may be reliably processed as multi-picks (e.g., double-picks).

In accordance with further embodiments, the system may compare held or transferred weight with known object weight. In such a system, the approach is to measure the weight of the picked objects, and compare the measured weight to the a priori known weight of the object. The weighing of the object might be implemented in any of a number of ways, including at the gripper, by force or load sensing mechanisms in the gripper, at the pick or place area, or where the underlying pick area container or conveyor is continually weighed by a scale to measure the change in weight before and after picking or placing, or on a supplemental transfer mechanism such as a shuttle that transports singulated and picked objects to other locations, or on a temporary weighing mechanism within the workspace of the robot pick cell, where the robot places the one or more objects on a holding tray, where they are then weighed and the robot re-picks them.

Figure 21:
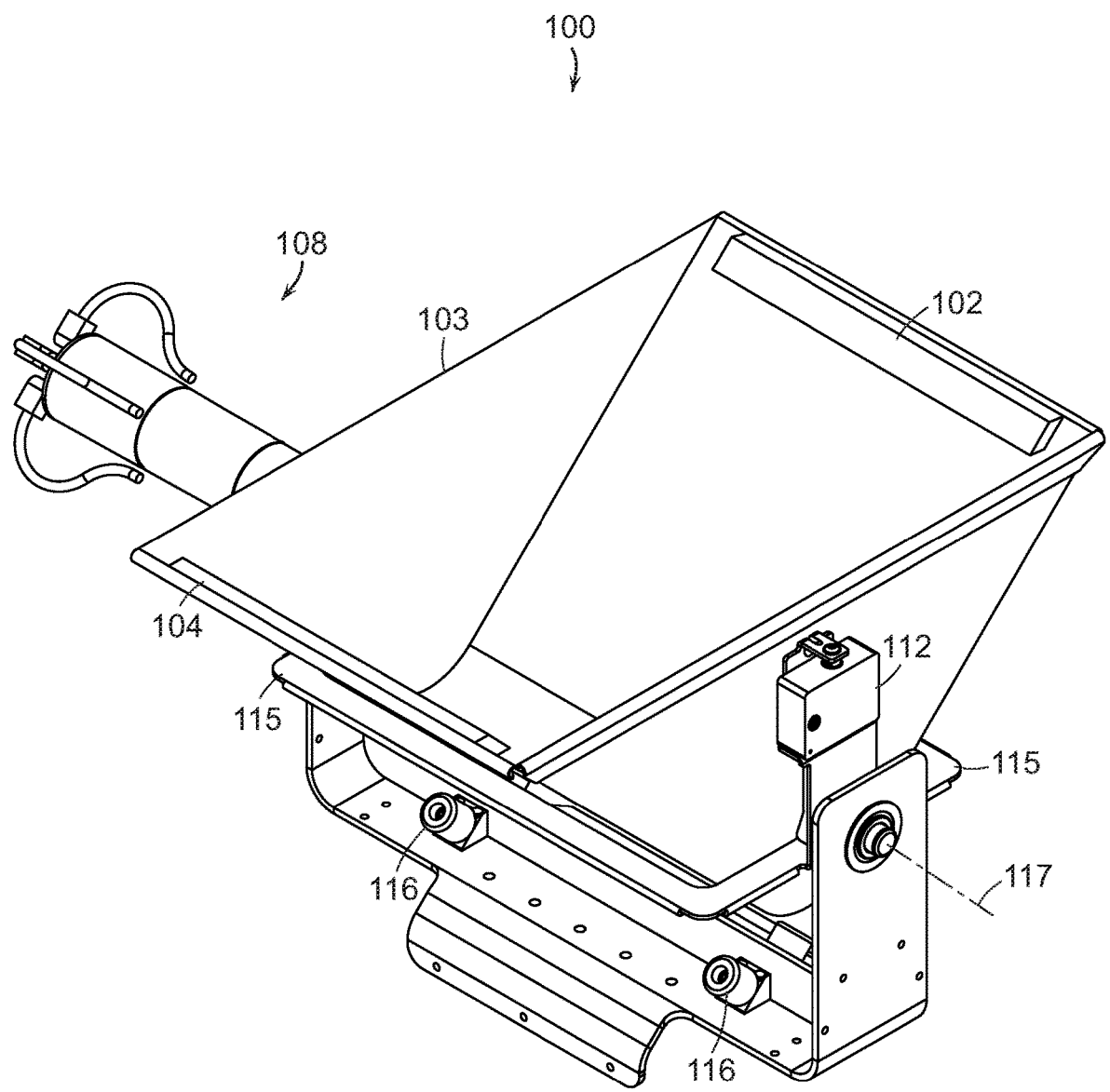
FIG. 21 shows an illustrative diagrammatic view of a weight sensing carriage for use in a system in accordance with an embodiment of the present invention.
Figure 22:
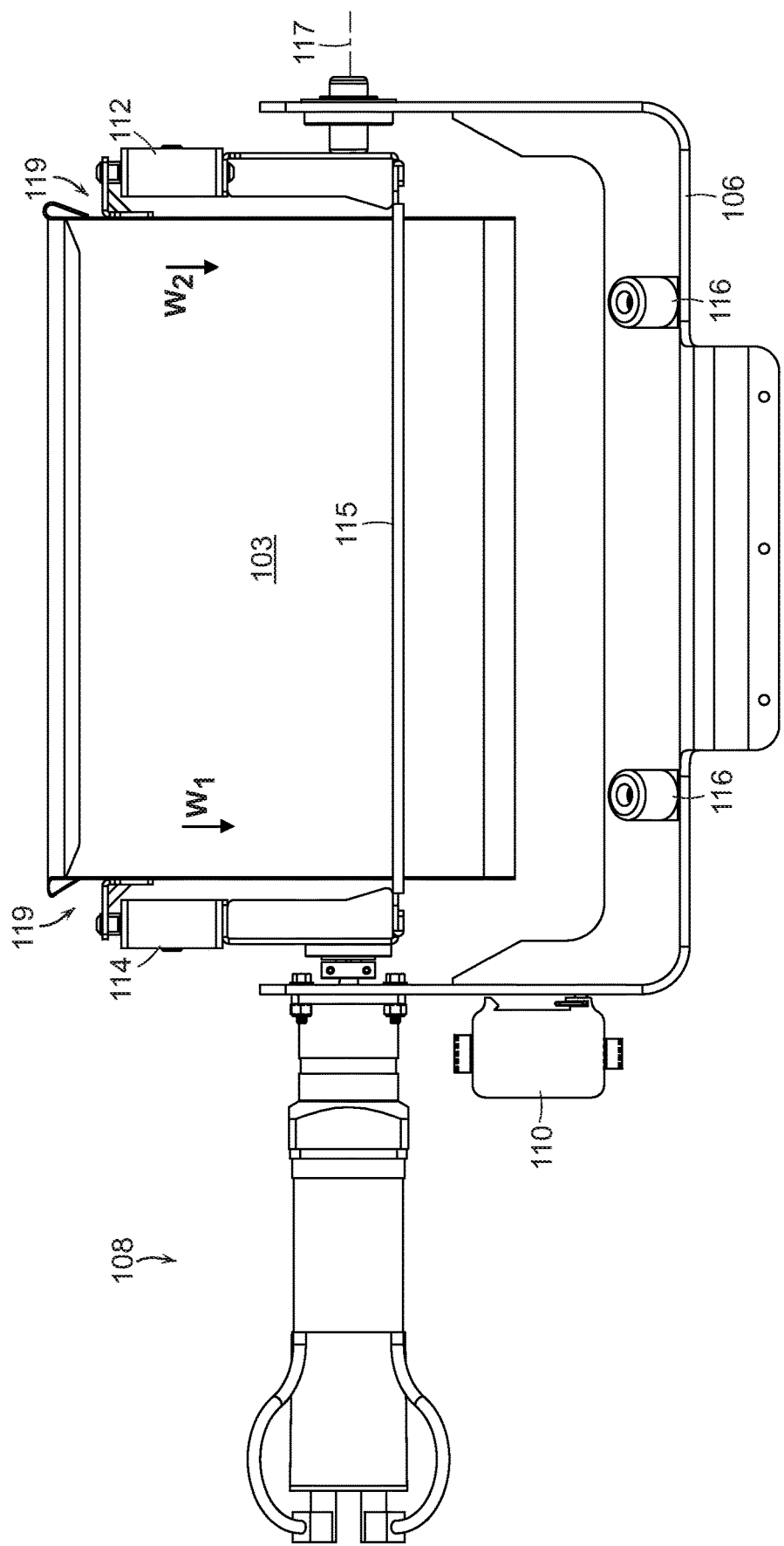
FIG. 22 shows an illustrative diagrammatic side view of the weight sensing carriage of FIG. 21.

FIGS. 21-25 show a carriage 100 (e.g., any of carriages 58, 62) in accordance with an embodiment of the present invention that include a generally V-shaped body 103 for containing an object, as well as beam break transmitter and receiver pairs 102, 104 (e.g., infrared transmitters and receivers) for detecting when an object enters or leaves the body 103. With reference to FIG. 21, the carriage also includes a support frame 106 for supporting the body 103, as well as actuation means for moving the carriage along a rail and for selectively causing the carriage to be tipped to drop the contents of the carriage into another carriage, a box, or other container. The actuation may be any of a pneumatic or electric control system 108, and communication to and from the carriage may be by wireless communication from an electronic processing system 110 (shown in FIG. 22).

The carriage also includes a pair of load cells 112, 114 that are coupled to the frame 106, and the carriage body 103 is mounted to (and is suspended by) the load cells. By locating the load cells on the body of the carriage close to object(s) held therein, a highly reliable weight measurements may be obtained. Once an object is detected, for example by the beam-break transmitter and receiver pair 102, 104, the system will determine the weight of the object. In accordance with an embodiment, the system will add the weight value of the two load cells ($W_1$, $W_2$) together, and subtract the weight of the body 100. In this way, weight of objects may also be obtained and checked (within a tolerance range of, for example 2% to 5%) with a manifest or shipping information. In accordance with other embodiments, the load cells themselves may register a change, indicating that the carriage has received or expelled an object.

Figure 23:
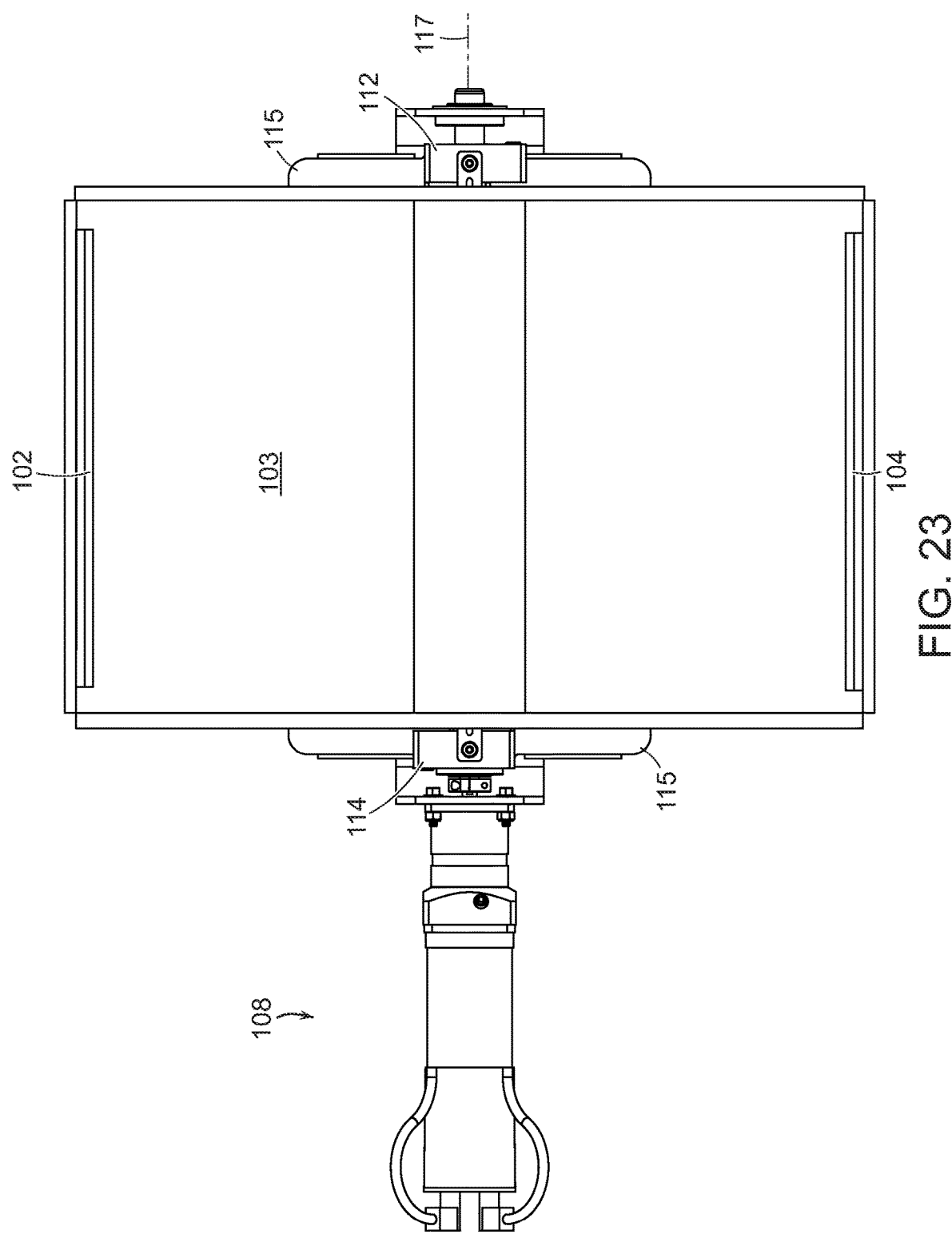
FIG. 23 shows an illustrative diagrammatic top view of the weight sensing carriage of FIG. 21.
Figure 24:
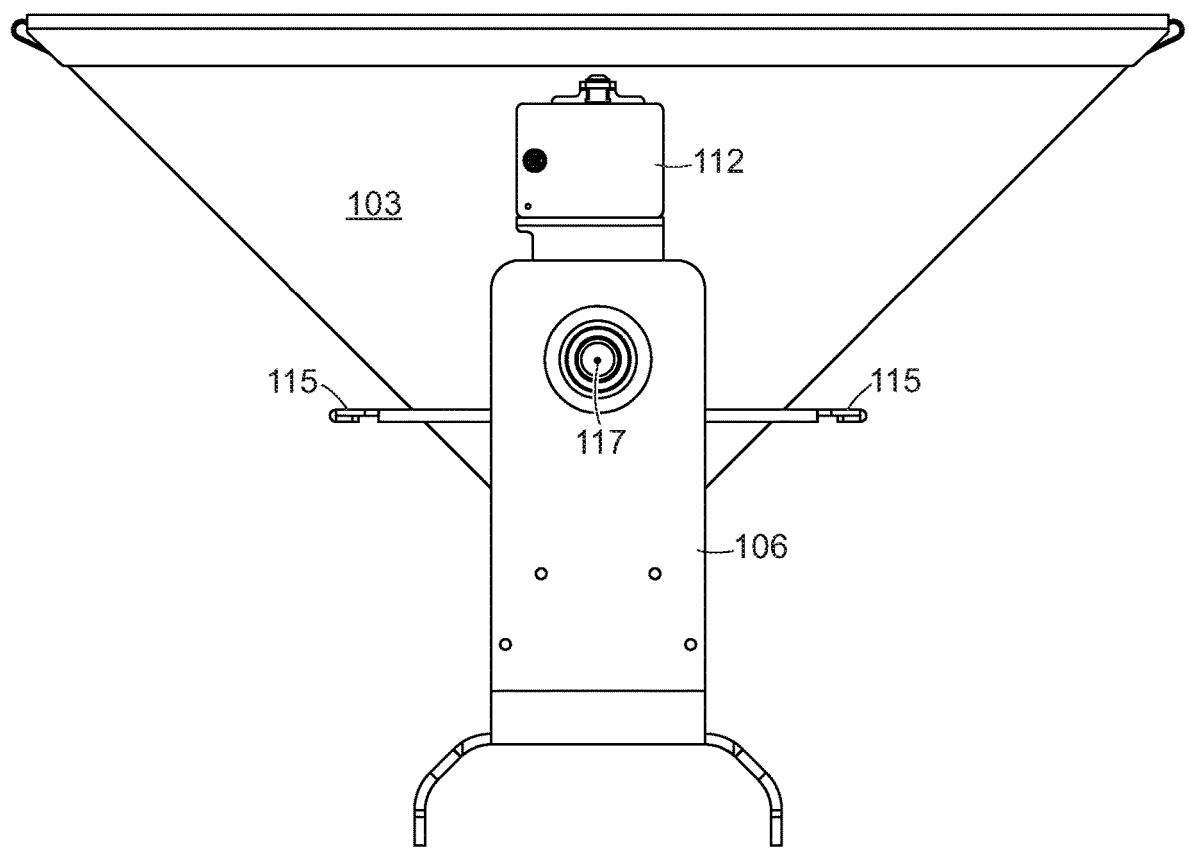
FIG. 24 shows an illustrative diagrammatic end view of the weight sensing carriage of FIG. 21.
Figure 25:
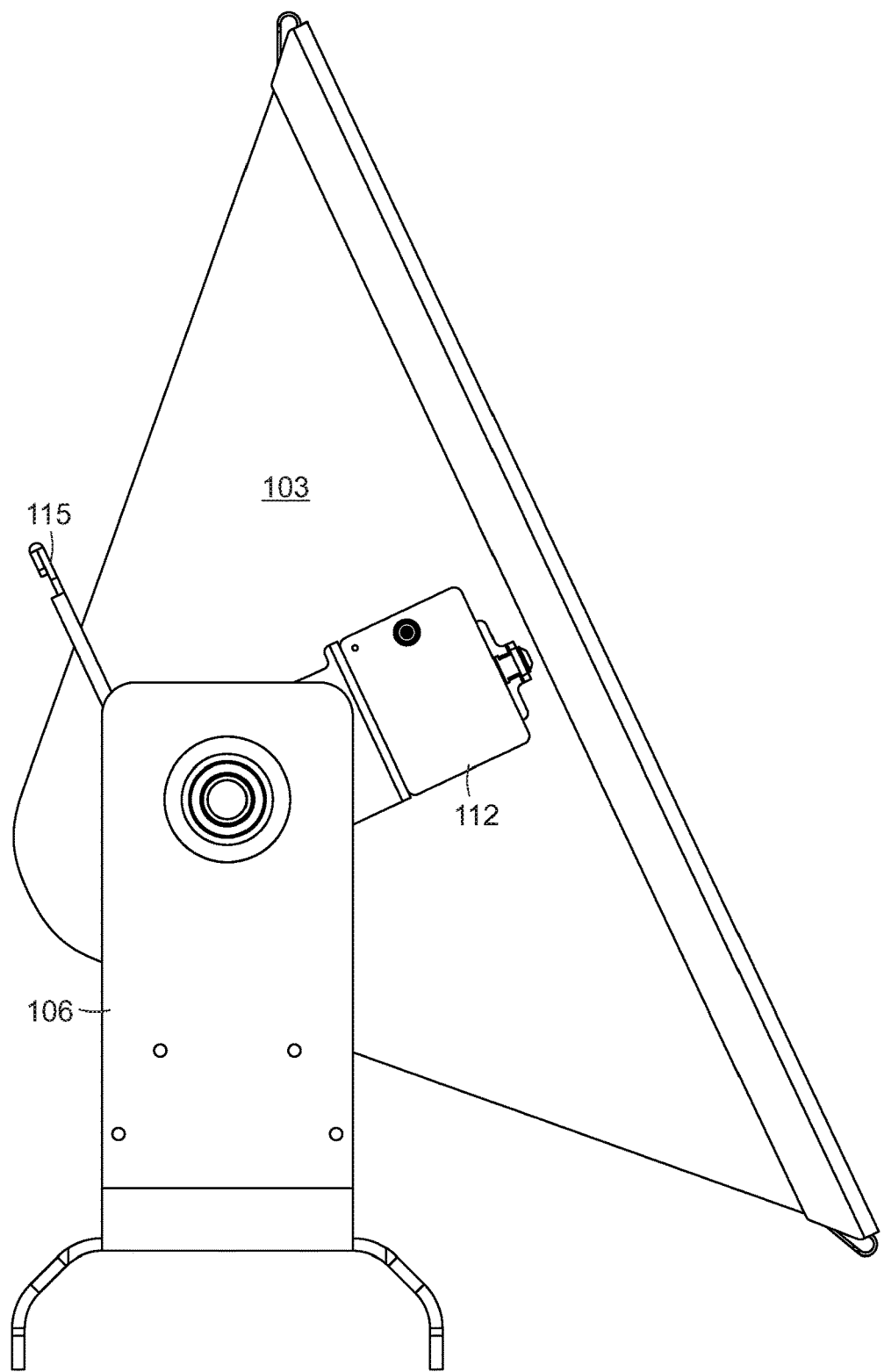
FIG. 25 shows an illustrative diagrammatic end view of the weight sensing carriage of FIG. 24 tipped to empty the contents of the carriage.

The carriage body 103 is adapted to be rotatable about an axis 117 (to empty its contents), and the carriage body 103 is attached to a top portion 119 of the load cells 112, 114 above the axis of rotation 117. FIG. 23 shows a top view of the carriage and FIG. 24 shows an end view of the carriage opposite the side with the actuation system 108. FIG. 25 shows the carriage being tipped (rotated about axis 117) to empty its contents, which motion may continue until a stop plate 115 contacts stops 116 (shown in FIG. 21).

The detection of weight is important for many industrial tasks. If an object in the carriage has a weight significantly different than that in a manifest or shipping label, the object may be held as discussed above until resolved (e.g., additional charges are processed). In accordance with other embodiments, a carriage may be used to transport multiple objects uniform weight objects. The uniform weight is known, the quantity of objects in the carriage may be determined by dividing the measured total weight by the known object weight.

Figure 26:
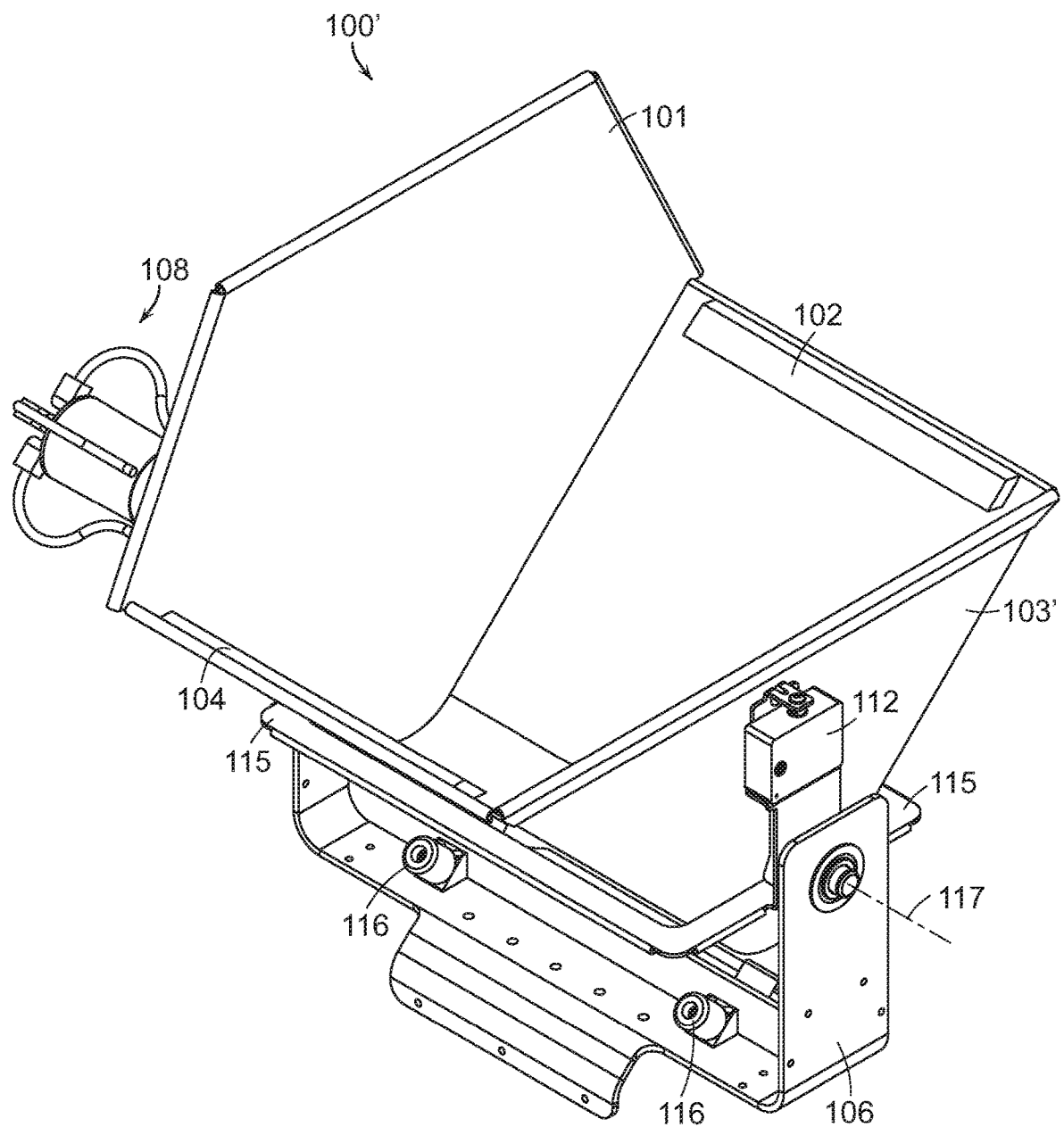
FIG. 26 shows an illustrative diagrammatic view of another weight sensing carriage for use in a system in accordance with another embodiment of the present invention.
Figure 27:
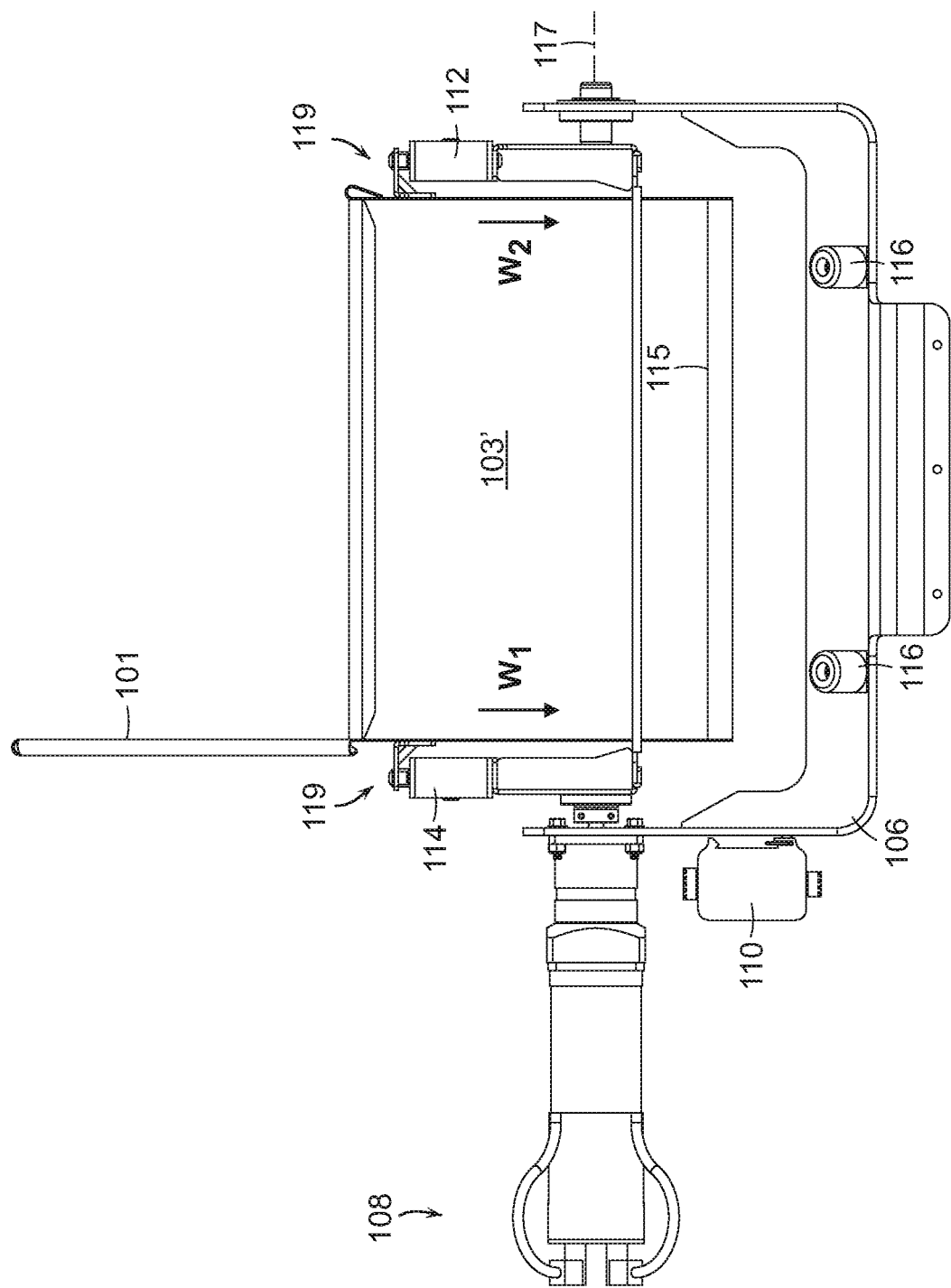
FIG. 27 shows an illustrative diagrammatic side view of the weight sensing carriage of FIG. 26.

FIGS. 26 and 27 show a carriage 100' in accordance with another embodiment of the invention similar to that shown in FIGS. 21-25 (with similar views to FIGS. 21 and 22) having a body 103' that includes a taller back wall 101 against which objects may be re-directed into the generally V-shaped body of the carriage. In particular, and with regard to carriages 62 in particular, the first carriage 58 may drop objects into the carriage having the body 100' such that the first carriage 58 is located on the side of the carriage 100' of FIGS. 26 and 27 opposite the side with the taller back wall 101.

The carriage 100' is similarly mounted via load cells 112, 114 on a frame 106, and its motion along a rail and in tipping, is controlled by actuation system 108. Communication and electronic controls are provided by electronic processing and communication system 110 (shown in FIG. 27). Again, the load cells 112, 114 may be used to determine the weight of the contents of the carriage as discussed above with reference to FIGS. 21-25. For example, once an object is detected by the beam-break transmitter and receiver pair 102, 104, the system in accordance with an embodiment, will add the weight value of the two load cells ($W_1$, $W_2$) together and subtract the weight of the body 103'. In accordance with other embodiments, the load cells themselves may register a change, indicating that the carriage as received or expelled an object.

Figure 28:
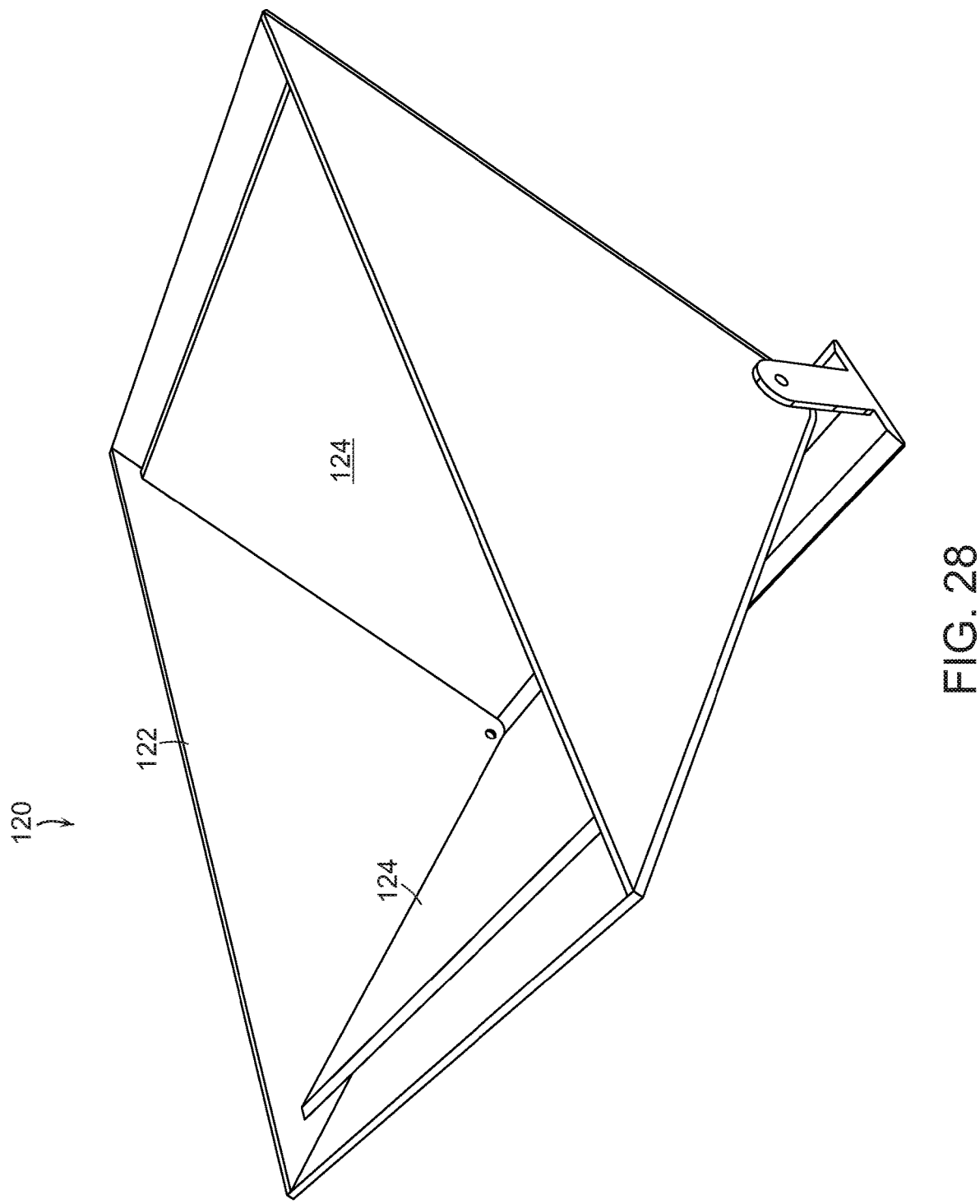
FIG. 28 shows an illustrative diagrammatic view of a further weight sensing carriage for use in a system in accordance with a further embodiment of the present invention.
Figure 29:
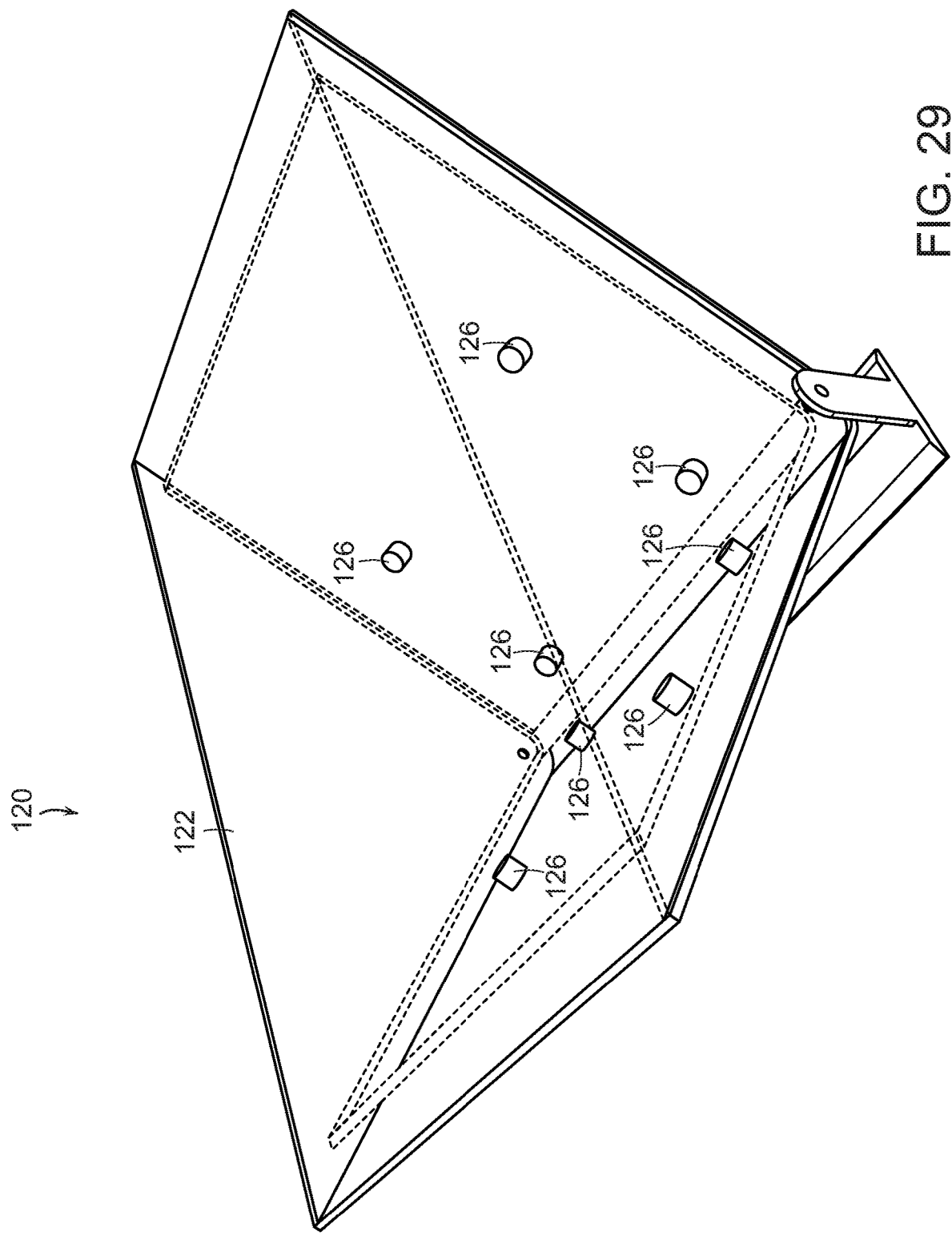
FIG. 29 shows an illustrative diagrammatic view of the weight sensing carriage of FIG. 28 with the V-shaped plate removed for illustrative purposes.
Figure 30:
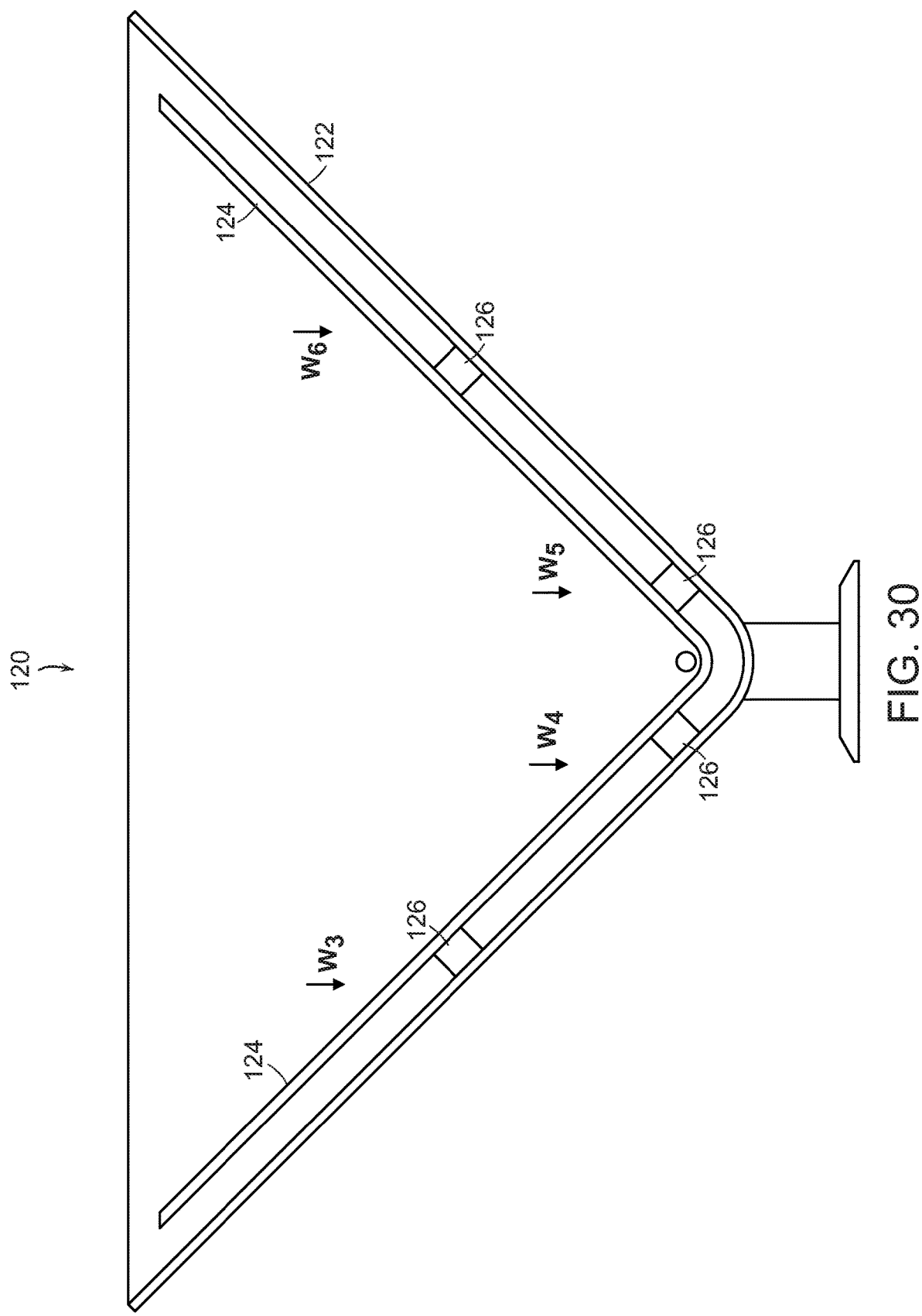
FIG. 30 shows an illustrative diagrammatic end view of the weight sensing carriage of FIG. 28 with an end wall removed for illustrative purposes.

FIGS. 28-30 show a carriage 120 in accordance with another embodiment of the present invention that includes a body 122 as well as a V-shaped plate 124 that is mounted on the body 122 by load cells 126 (shown in FIG. 29 with the V-shaped plate removed). The load cells 126 may each obtain weight data, e.g., $W_3$, $W_4$, $W_5$, $W_6$ as shown in FIG. 26, and $W_7$, $W_8$, $W_9$, $W_{10}$ by the other four load cells. FIG. 30 shows the carriage 120 with the body wall that is not shown in FIG. 29 also removed from FIG. 28. The remaining portions of the carriage 120 are as discussed above, including the support frame for moving along a rail, as well as the actuation systems and electronic processing and communication system. Again, the load cells 126 may be used to determine the weight of the contents of the carriage as discussed above. For example, once an object is detected as having entered the carriage 120 (e.g., by a beam-break transmitter and receiver pair as discussed above), the system in accordance with an embodiment, will add the weight value of the eight load cells ($W_3$, $-W_{10}$) together and subtract the weight of the V-shaped plate 124.

Figure 31:
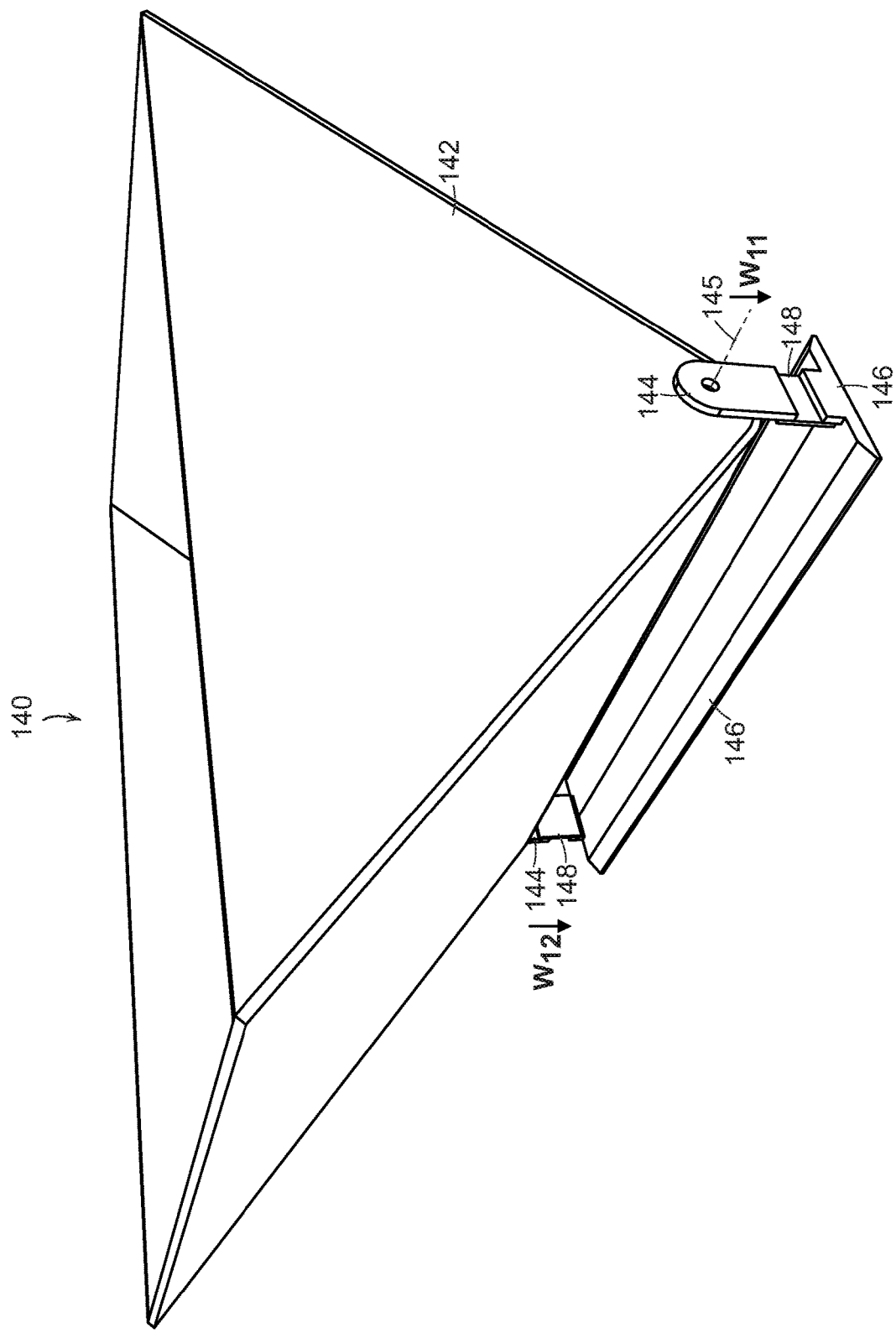
FIG. 31 shows an illustrative diagrammatic view of yet a further weight sensing carriage system for use in a system in accordance with a further embodiment of the present invention.
Figure 32:
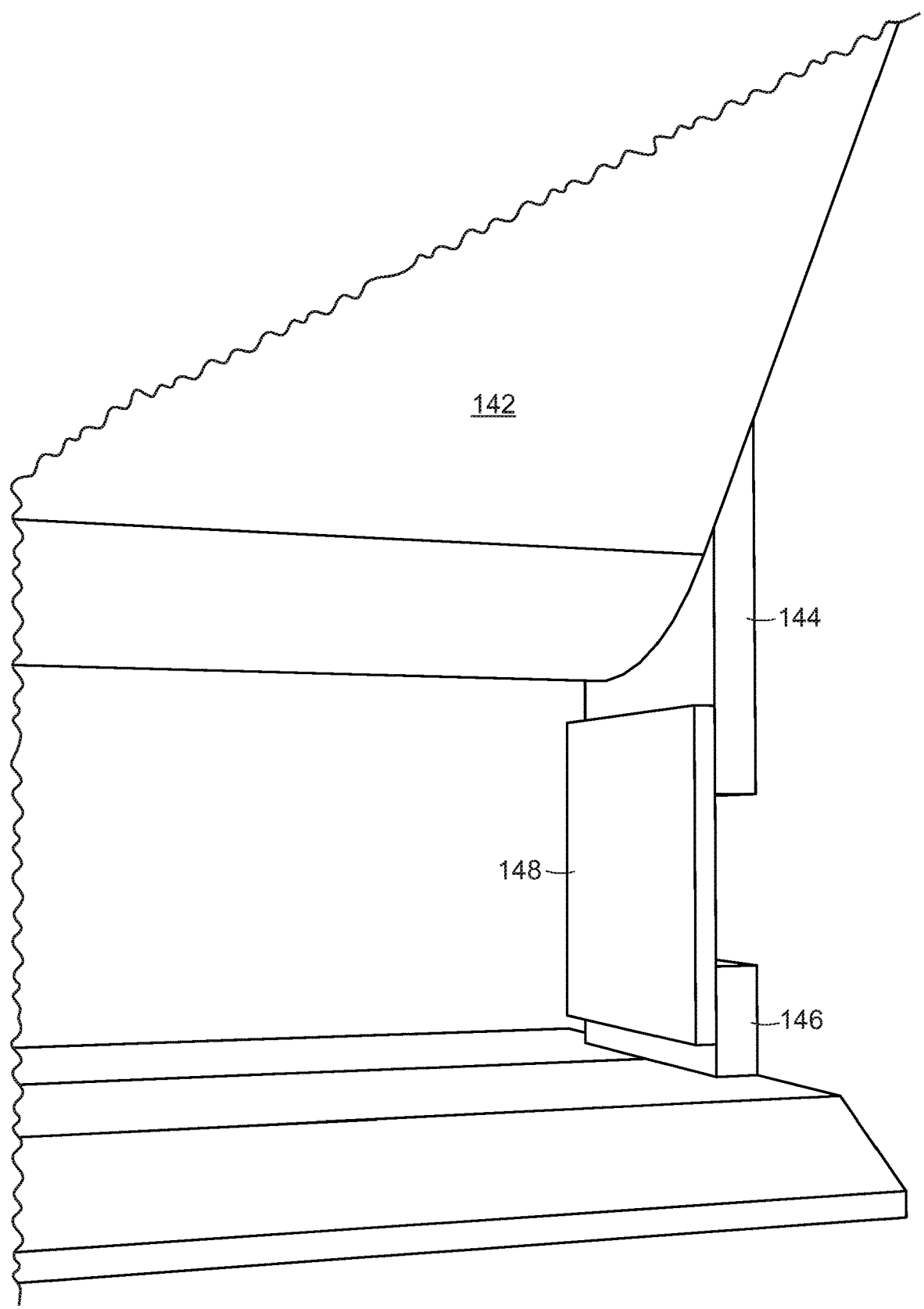
FIG. 32 shows an illustrative diagrammatic view of a portion of the weight sensing carriage system of FIG. 31.

FIGS. 31 and 32 show a carriage 140 in accordance with another embodiment of the present invention that includes a body 142 as well as a mounting bracket 144 that is mounted to support frame 146 by load cells 148. The load cells 148 may each obtain weight data, e.g., $W_{11}$, $W_{12}$ as shown in FIG. 31. FIG. 32 shows an enlarged view of the load cell 148 coupled between the carriage mounting bracket 144 and the support frame 146. The remaining portions of the carriage 120 are as discussed above, including the remaining portions of the support frame for moving along a rail, as well as the actuation systems and electronic processing and communication system for selectively rotating the carriage body about an axis 145. Again, the load cells 148 may be used to determine the weight of the contents of the carriage as discussed above. For example, once an object is detected as having entered the carriage 140 (e.g., by a beam-break transmitter and receiver pair as discussed above), the system in accordance with an embodiment, will add the weight value of the two load cells ($W_{11}$, $-W_{12}$) together, and subtract the combined weight of the body 142 and the two carriage mounting brackets 144.

Figure 33:
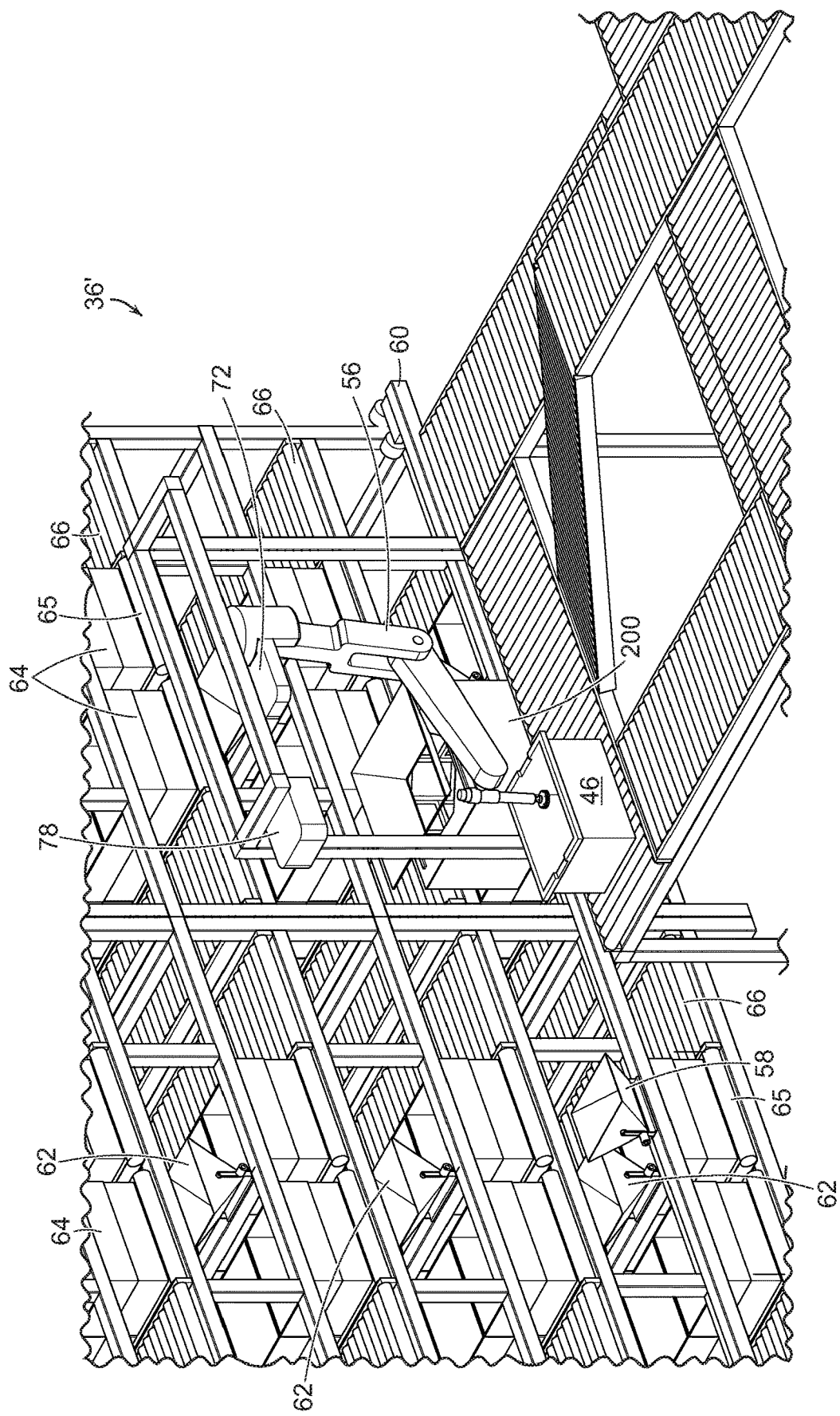
FIG. 33 shows an illustrative diagrammatic view of another processing station for use in a system in accordance with another embodiment of the present invention.
Figure 34:
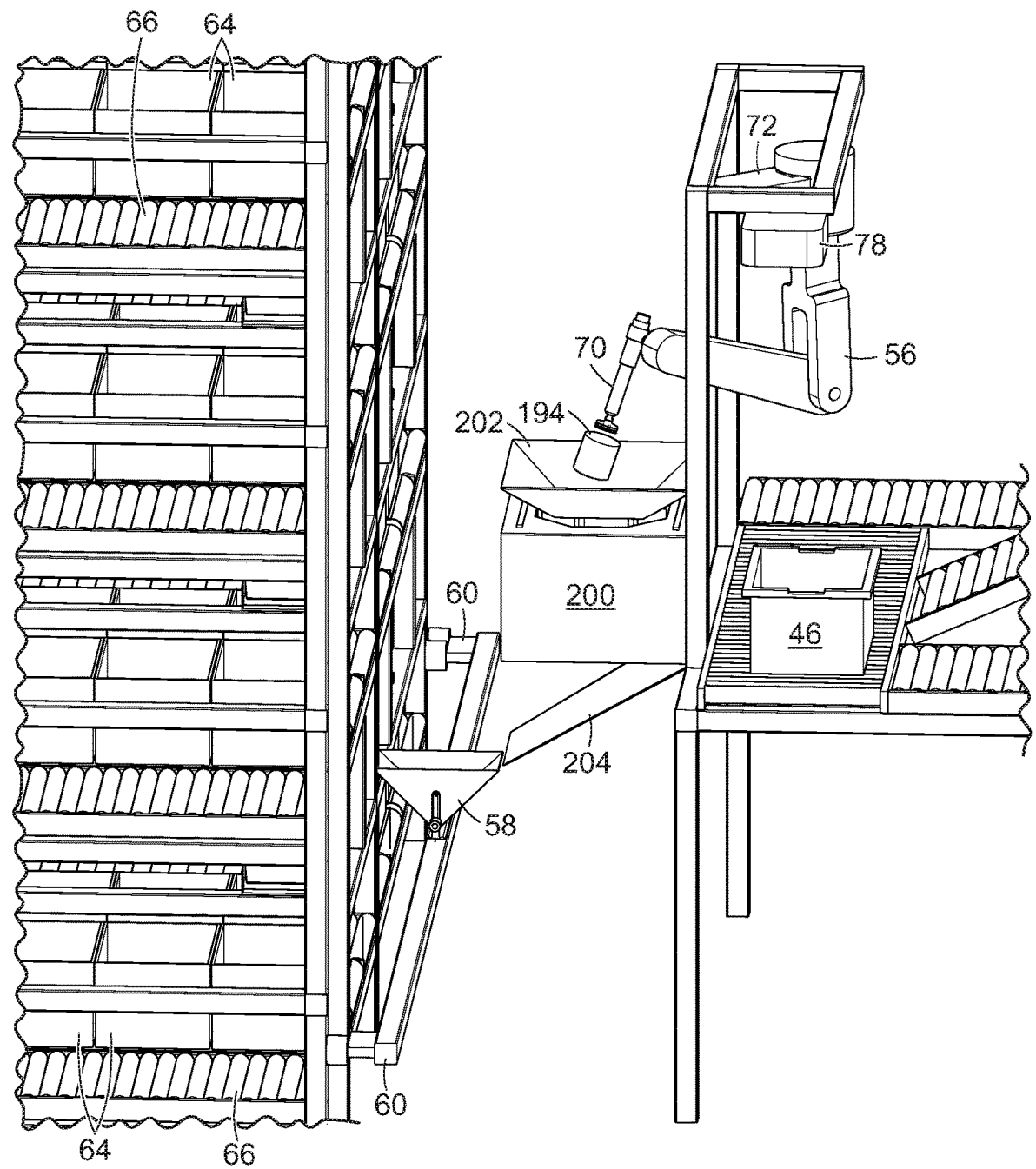
FIG. 34 shows an illustrative diagrammatic view of an objecting being dropped through a drop scanner of the processing station of FIG. 33.

FIG. 33 shows a processing station 36' in accordance with another embodiment of the present invention that includes a drop perception system 200 through which objects (e.g., 194) may be dropped into the first carriage 58 that is mounted on the X-Y movable stage 60. The object (194) is identified by perception devices (e.g., cameras or scanners) that detect any identifying indicia (e.g., barcode, QR code, RFID etc.) on the object. With further reference to FIG. 34, the object then falls through the drop scanner 200 via guide 202, and via a chute 204 lands in the first carriage 58. As discussed above, the carriage 58 includes an object detection system such as load cells or a beam break detection system that detects when the object has been received by the carriage 58, and the carriage 58 then moves to the appropriate row and carriage 62 based on the detected indicia.

Figure 35A:
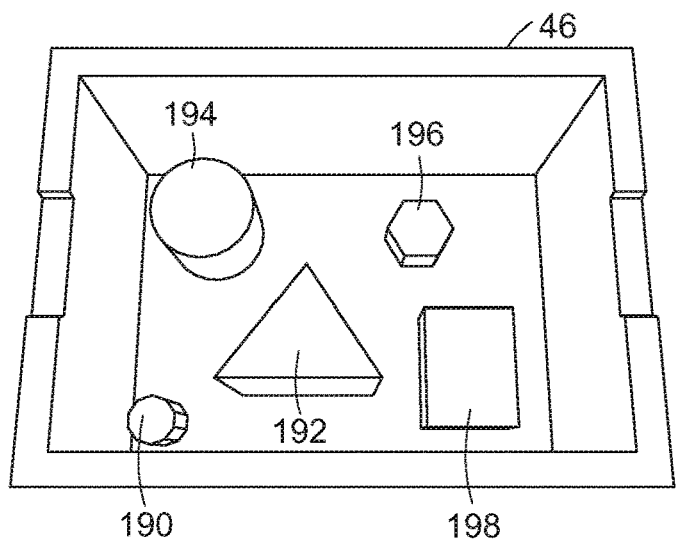
FIGS. 35A-35D show illustrative diagrammatic plan views of a bin undergoing volumetric and/or density analyses of dissimilar objects, prior to analyses (FIG. 35A), prior to picking an object (FIG. 35B), following the pick of an object (FIG. 35C), and isolating the volume of the picked object from the bin volume (FIG. 35D)

The processing station 36' also includes the capture system 78 that include scanning and receiving units 80, 82, as well as edge detection units 84 (as discussed above in reference to FIG. 6) for capturing a variety of characteristics of a selected object or the whole bin. FIG. 35A shows a view from the volumetric detection system 78, which in accordance with an embodiment, may include a set of similar or dis-similar objects 190, 192, 194, 196, 198. The contents of the bin are volumetrically scanned scanning and receiving units 80, 82 as shown in FIG. 35B prior to removing an object from the bin 46, and are volumetrically scanned after removing an object 194 from the bin 46 as shown in FIG. 35C.

Figure 35B:
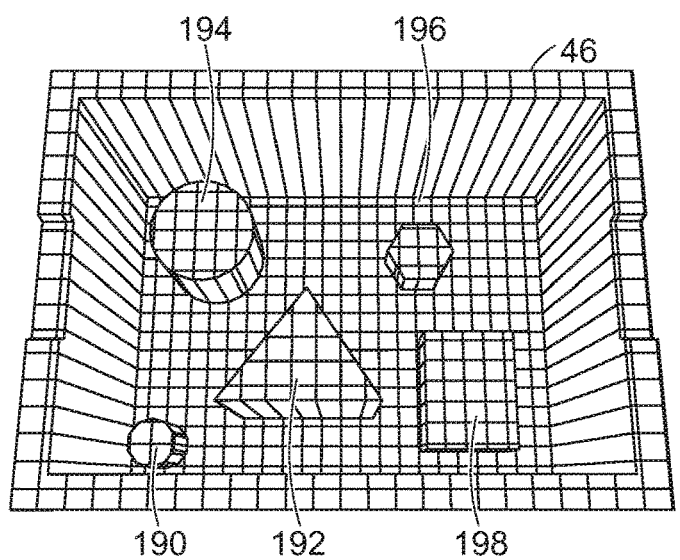
Figure 35C:
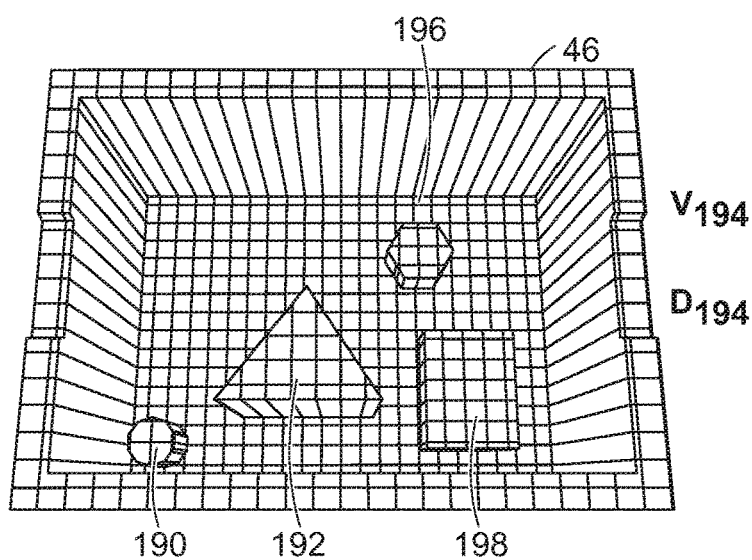

In accordance with an embodiment, the volume captured in FIG. 35C is subtracted from the volume captured in FIG. 35B, and the difference is assessed as the volume of the object 194 ($V_{194}$) that is removed. In accordance with other embodiments, the system, knowing that it will be acquiring object 194, may capture volumetric data regarding the object 194 while the object 194 is still in the bin (as shown in FIG. 35B). This may be done in place of or in addition to the volumetric subtraction (between FIGS. 35B and 35C) discussed above. In accordance with further embodiments, the scanning and receiving units 80, 82 may also be employed to determine an object's density, $D_{194}$, from knowing the object's mass and volume.

The difference in volume between the scans shown in FIGS. 35B and 35C is the volume of the removed object 194, $V_{194}$. This volume is compared with recorded data regarding the object that is identified by the identifying indicia as provided by the perception system 200 or the recorded data. If the volume is confirmed within a tolerance, then the object continues to be processed in accordance with a manifest or a shipping label. If not, however, the object may be directed to a holding location (e.g., a box that is assigned as a holding location), where it may remain until the discrepancy is resolved. As discussed above with reference again to FIG. 5, objects are dropped into the carriage 58 and delivered to any of the carriages 62 by moving the carriage 58 along the X-Y movable stage 60 and then tipping the carriage 58 to drop the object into the carriage 58.

Figure 35D:
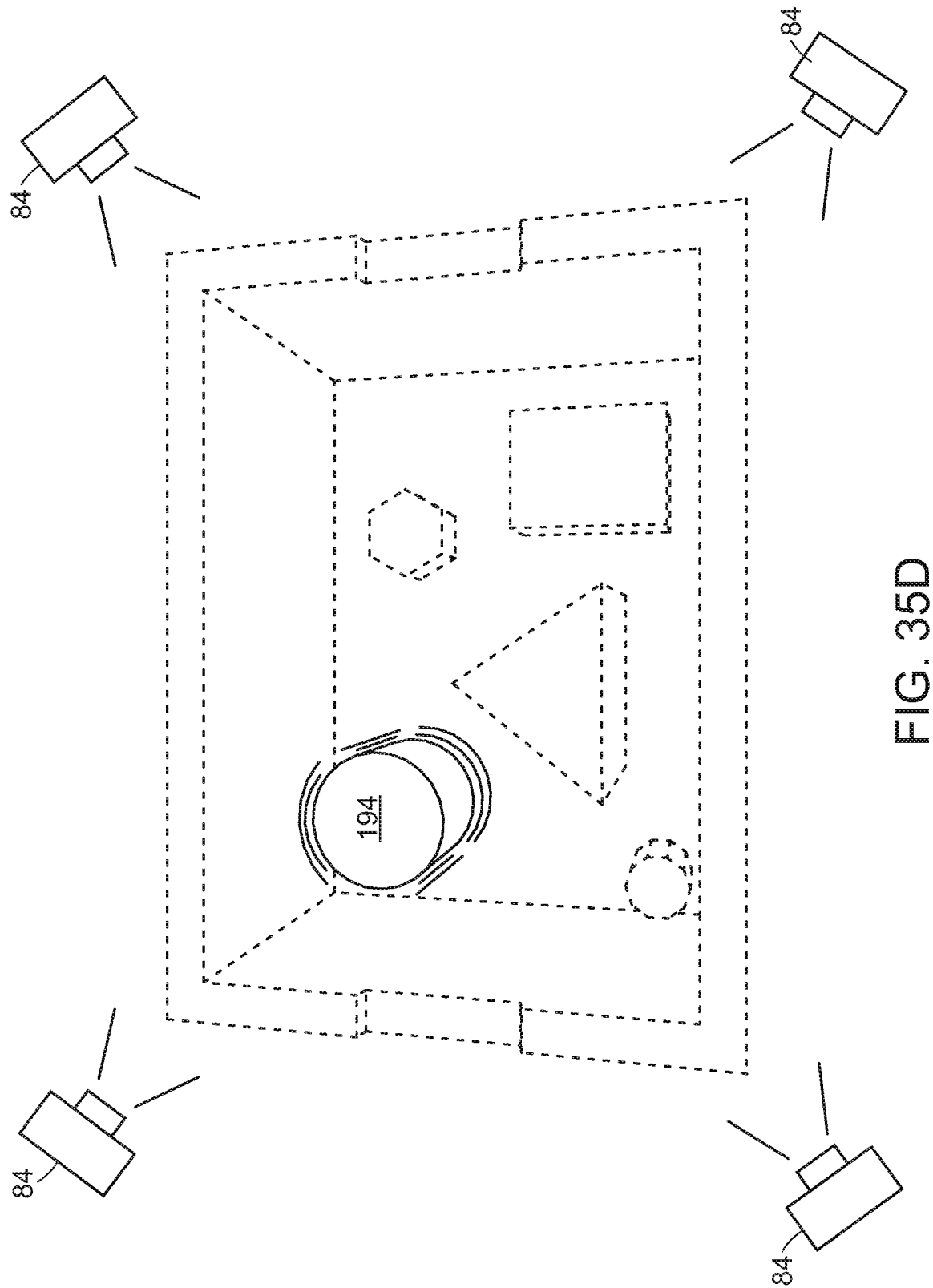

In accordance with further embodiments and with reference to FIG. 35D, the system may additionally employ the edge detection sensors 84 that are employed (again together with the processing system 42), to detect edges of any objects in a bin, for example using image any of intensity data, shadow detection, or echo detection etc. This information can be used to determine or verify any of the object's identity, location, orientation, size, shape and/or contours. For example, edge detection can be done either before or after volumetric scanning, and thereafter volumes can be calculated for each identified object within the bin.

Figure 36:
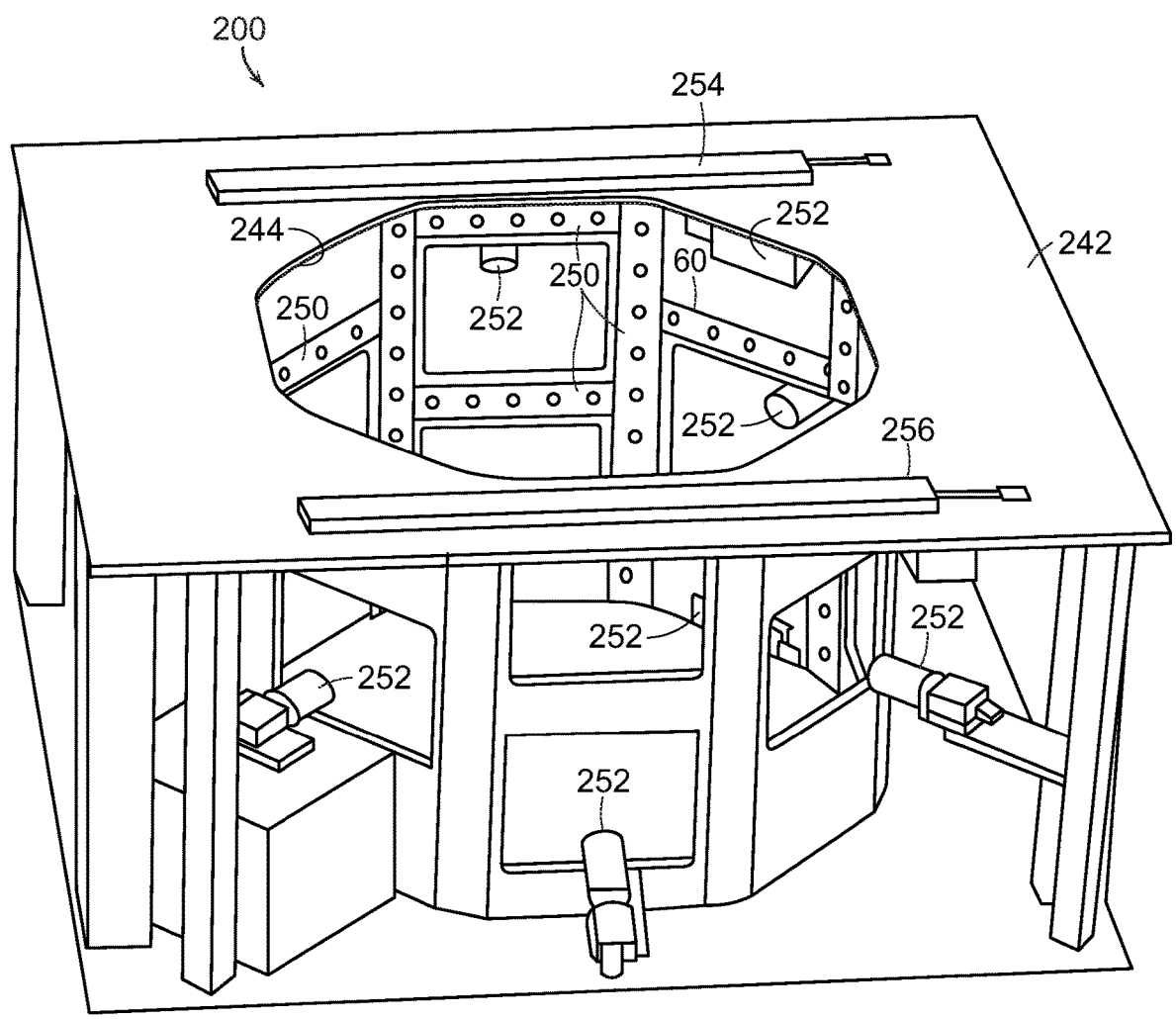
FIG. 36 shows an illustrative diagrammatic front view of a drop scanner for use in accordance with embodiment of the present invention.
Figure 37:
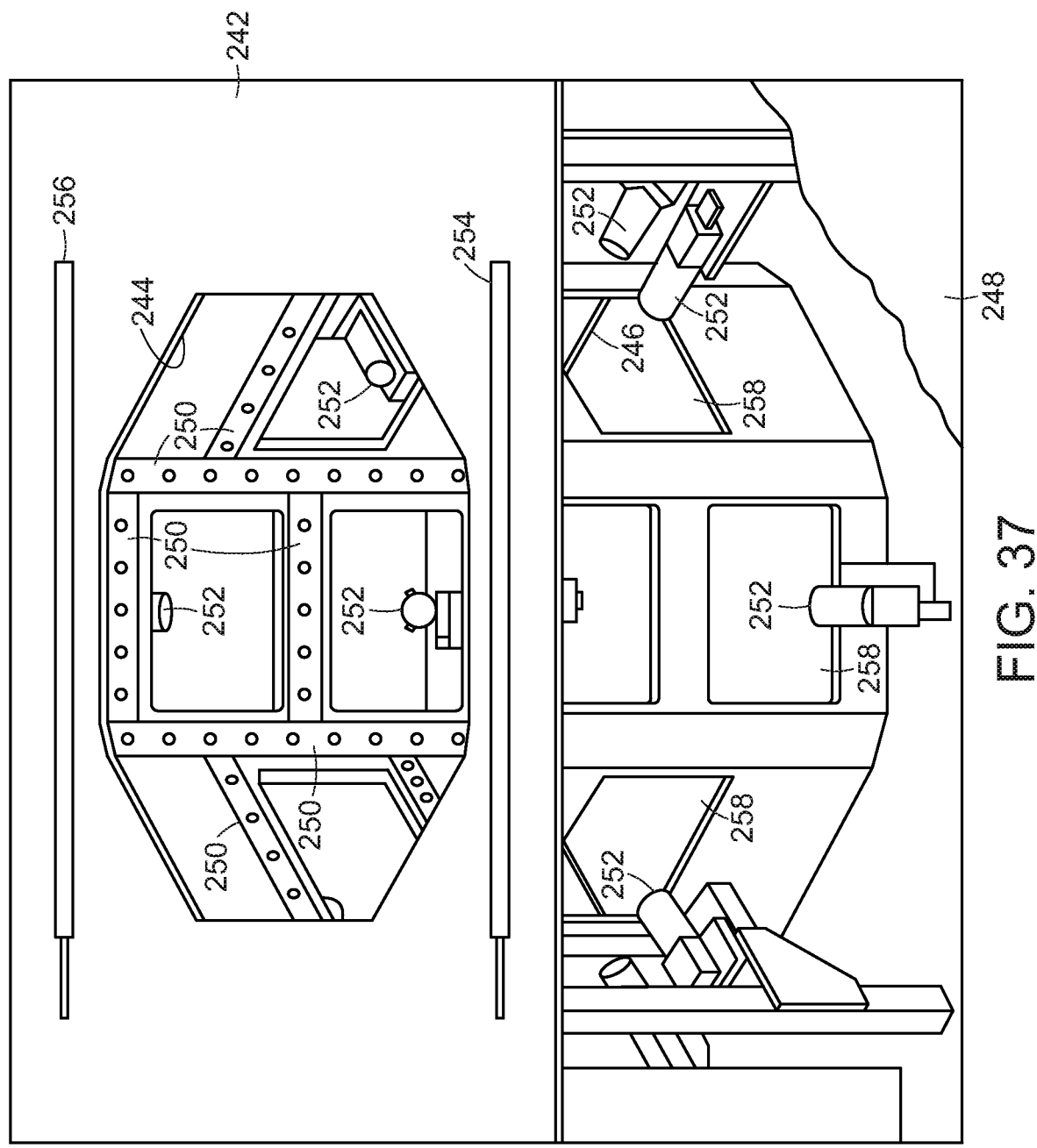
FIG. 37 shows an illustrative diagrammatic rear view of the drop scanner of FIG. 36.

FIGS. 36 and 37 show the drop perception system 200 in more detail. In particular, the drop perception system 200 includes a structure 242 having a top opening 244 and a bottom opening 246, and may be covered by an enclosing material 248, e.g., a colored covering such as orange plastic, to protect humans from potentially dangerously bright lights within the secondary perception system. The structure 242 includes a plurality of rows of sources (e.g., illumination sources such as LEDs) 250 as well as a plurality of image perception units (e.g., cameras) 252. The sources 250 are provided in rows, and each is directed toward the center of the opening. The perception units 252 are also generally directed toward the opening, although some are directed horizontally, while others are directed upward, and some are directed downward. The system 228 also includes an entry source (e.g., infrared source) 254 as well as an entry detector (e.g., infrared beam-break detector) 256 for detecting when an object has entered the perception system 228. The LEDs and cameras therefore encircle the inside of the structure 242, and the perception units are positioned to view the interior via windows that may include a glass or plastic covering (e.g., 258). The perception units may include cameras (e.g., 2D or 3D) or scanners (e.g., light reflectivity or radio frequency scanners), and the processing system 20 may include the associated software to process the perception data. The scanners look for a variety of codes such as indicia (e.g., barcodes, radio frequency tags, Stock Keeping Unit (SKU), Universal Product Code (UPC), Digimarc DWCode, etc.).

Figure 38:
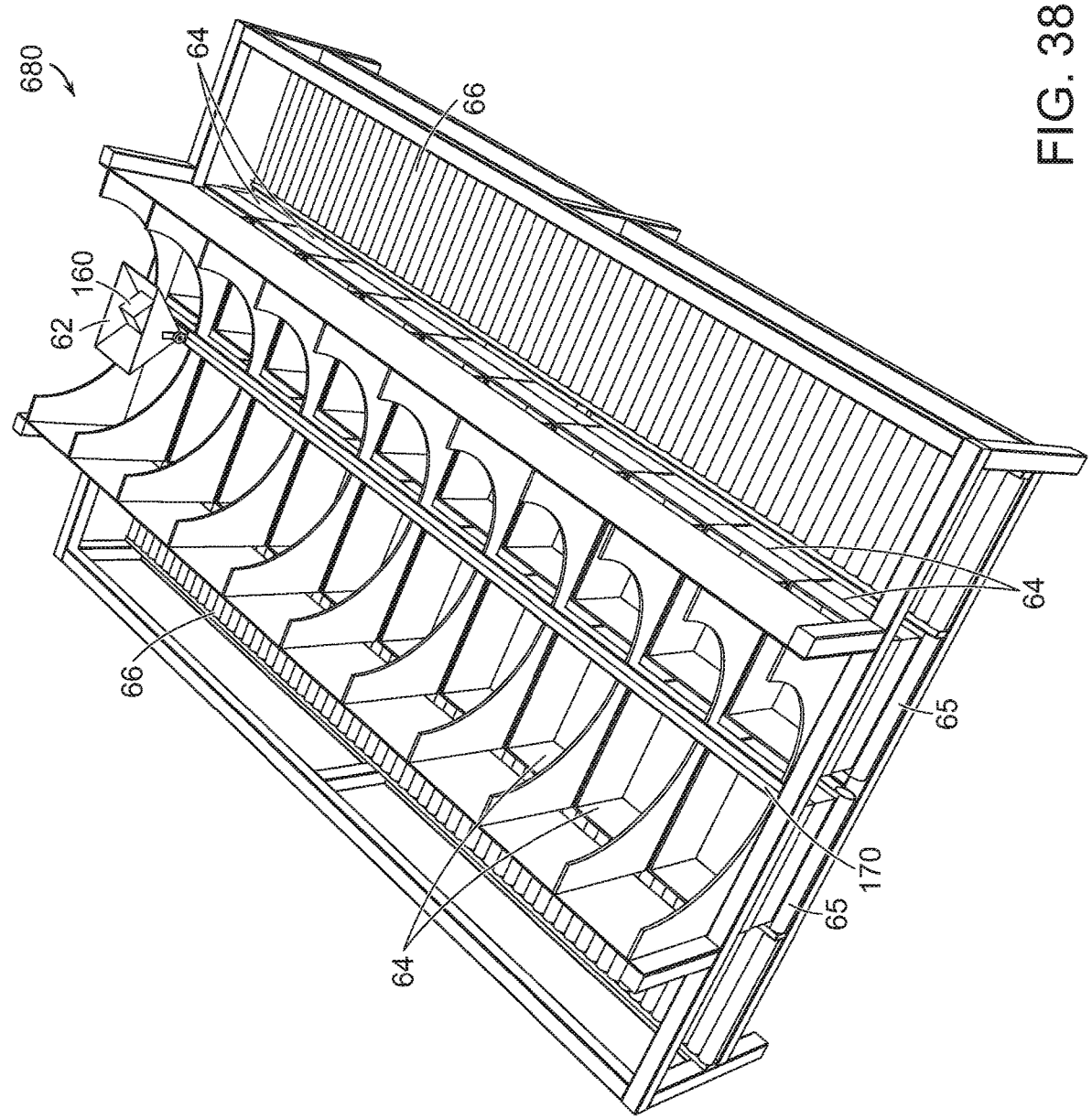
FIG. 38 shows an illustrative diagrammatic view of a portion of the distribution station of FIG. 4 in accordance with an embodiment of the present invention.
Figure 39:
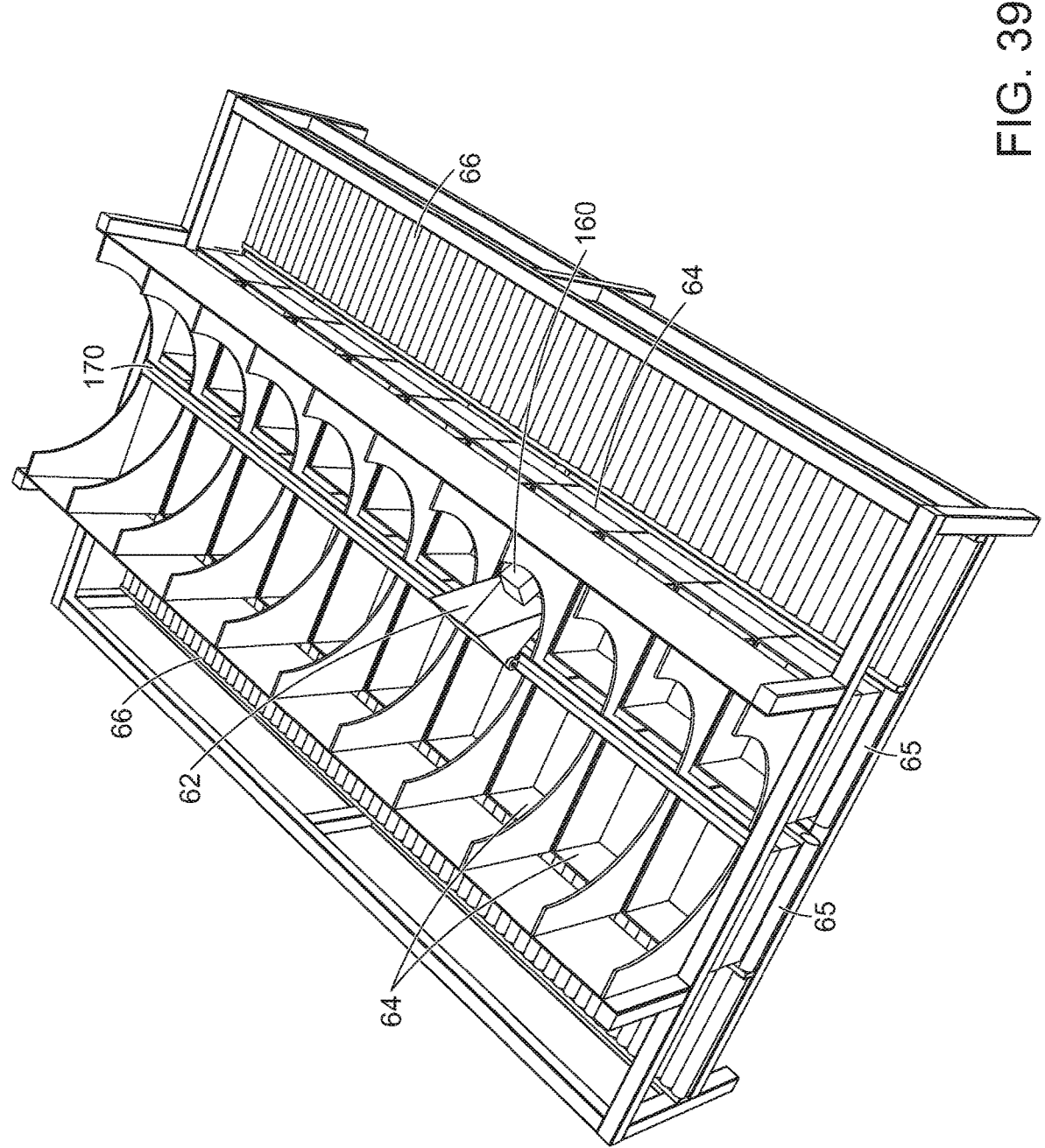
FIG. 39 shows an illustrative diagrammatic view of the portion of the distribution station shown in FIG. 38 with the carriage moved along the rail and tipping to drop an object from the carriage.
Figure 40:
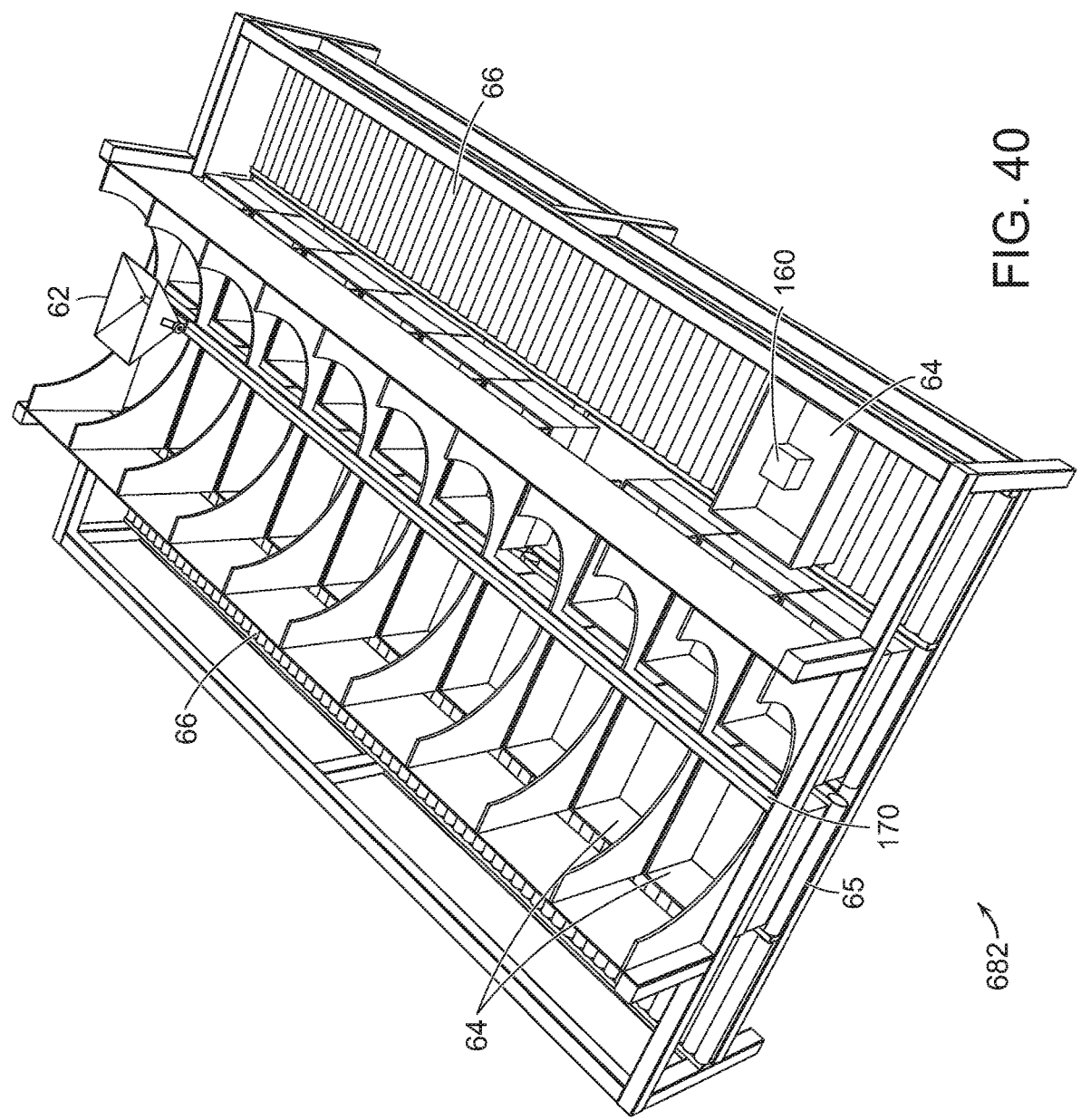
FIG. 40 shows a illustrative diagrammatic view of the portion of the distribution station shown in FIG. 38 with the output box having been moved to an output conveyor 66.

FIGS. 38-40 show a representative set of two rows of output boxes 64 adjacent output conveyors 66 of the destination station 38. In particular, each carriage 62 receives an object 160 from a first carriage 58 as discussed above and as shown in FIG. 38, and each carriage 62 is reciprocally movable between the output boxes 64. As further shown in FIG. 39, each carriage 62 moves along a track 170, and may be actuated to drop an object 160 into a desired output box 64 by tipping as shown.

The output boxes may be provided in a conveyor (e.g., rollers or belt), and may be biased (for example by gravity) to urge all destination bins toward one end 680 as shown. With reference to FIG. 40, when an output box 64 is selected for removal (e.g., because the bin is full or otherwise ready for further processing), the system will urge the completed box onto an output conveyor 66 to be brought to a further processing or shipment station. This may be done, for example, using a displacement mechanism 50 as discussed above. The conveyor 66 may be biased (e.g., by gravity or power) to cause any bin on the conveyor to be brought to an output location at a second end 682 opposite the first end 680. The destination bins may be provided as boxes or containers or any other type of device that may receive and hold an object, including the box tray assemblies.

Following displacement of the box onto the conveyor, each of the output boxes may be urged together, and the system will record the change in position of any of the boxes that moved. This way, a new empty box may be added to the end, and the system will record the correct location and identified processing particulars of each of the destination bins.

Figure 41:
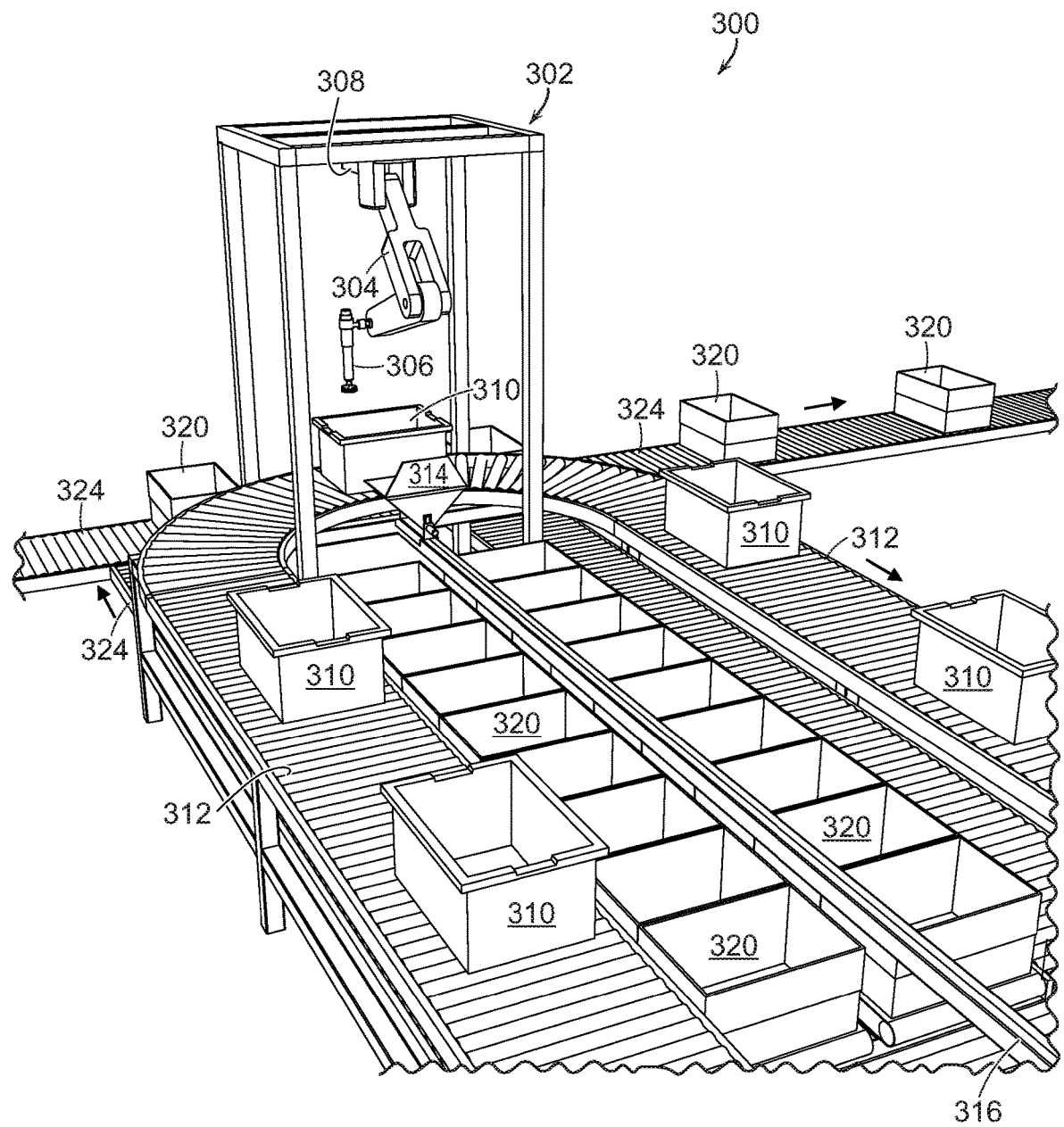
FIG. 41 shows an illustrative diagrammatic view of a processing system in accordance with a further embodiment of the present invention that includes a U-shaped conveyor and a programmable motion system.

Each of the above detection systems for detecting or estimating any of weight, size, mass, volume, density etc. may be used with a variety of object processing systems. FIG. 41, for example, shows a processing system 300 that includes a programmable motion system 302. The programmable motion system 302 includes an articulated arm 304 and an end effector 306. The system 300 may retrieve objects from bins 310 that are provided on conveyors 312, and place the retrieved objects into a reciprocating carriage 314 that travels along a rail 316 between rows of boxes 320.

Completed boxes may be urged onto output conveyors 322, which direct the completed boxes to a collected output conveyor 324.

Figure 42:
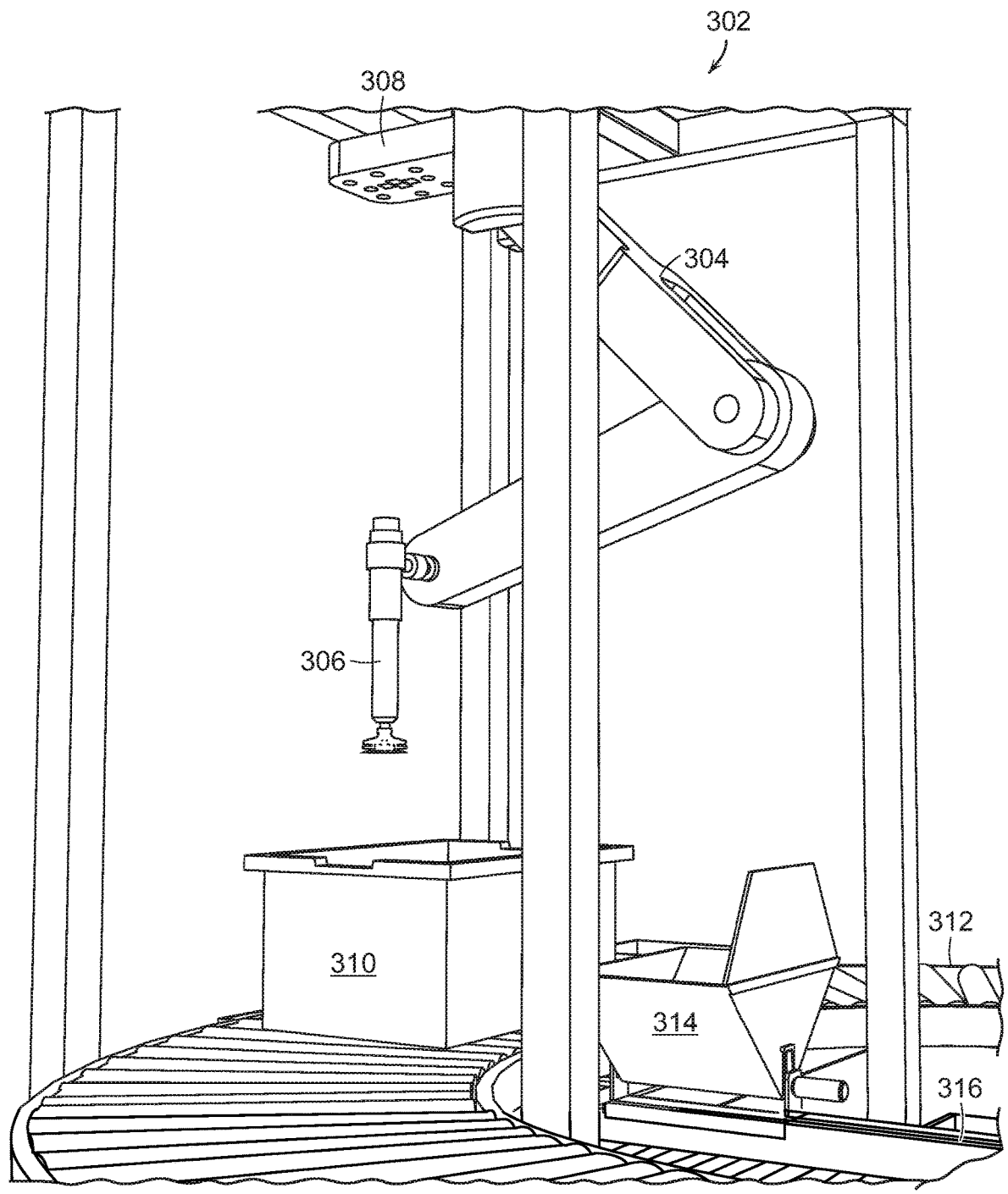
FIG. 42 shows an illustrative diagrammatic view of a portion of the processing system of FIG. 41.
Figure 43:
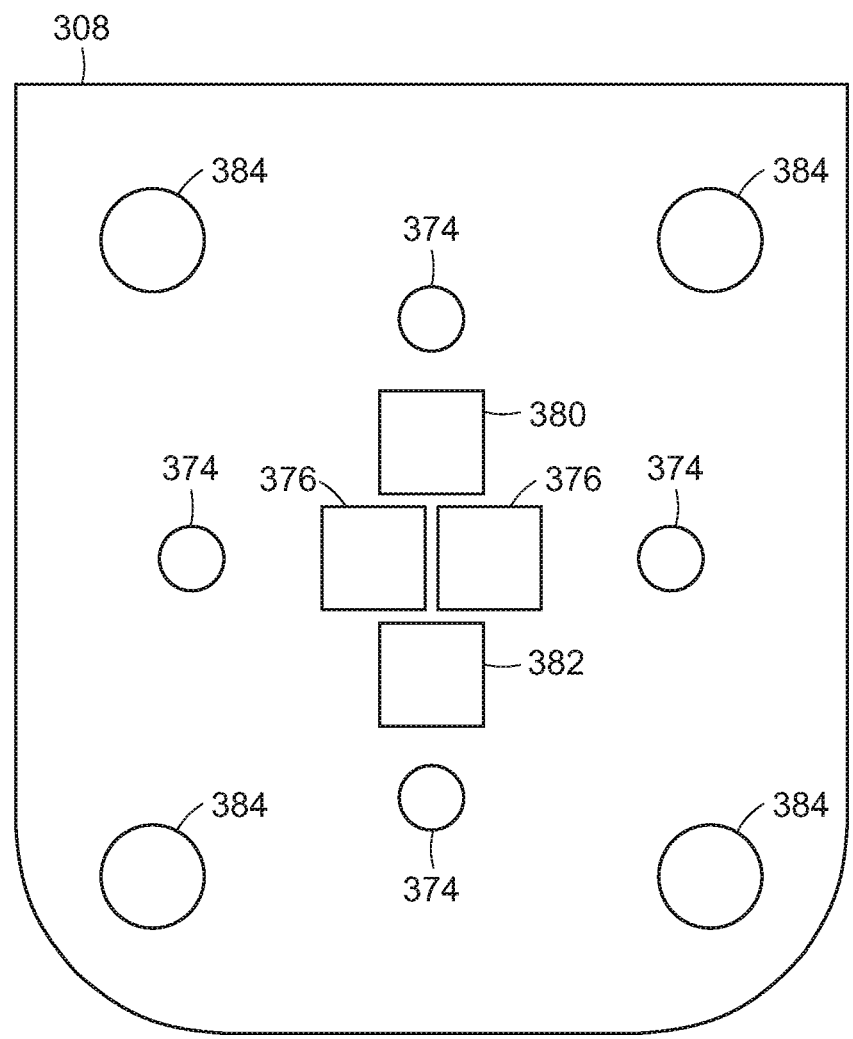
FIG. 43 shows an illustrative diagrammatic view of an underside of the perception unit of FIG. 42.

The system 302 includes a perception unit 308, and with further reference to FIGS. 42 and 43, the perception unit 308 combines the functionalities of the detection system 72 and the capture system 78 discussed above, and includes lights 374 and perception units 376, and scanning and receiving units 380, 382 as well as edge detection unit 384. Each perception unit 308 may therefore capture identifying indicia, and provide volumetric 3D scanning as discussed above.

Figure 44:
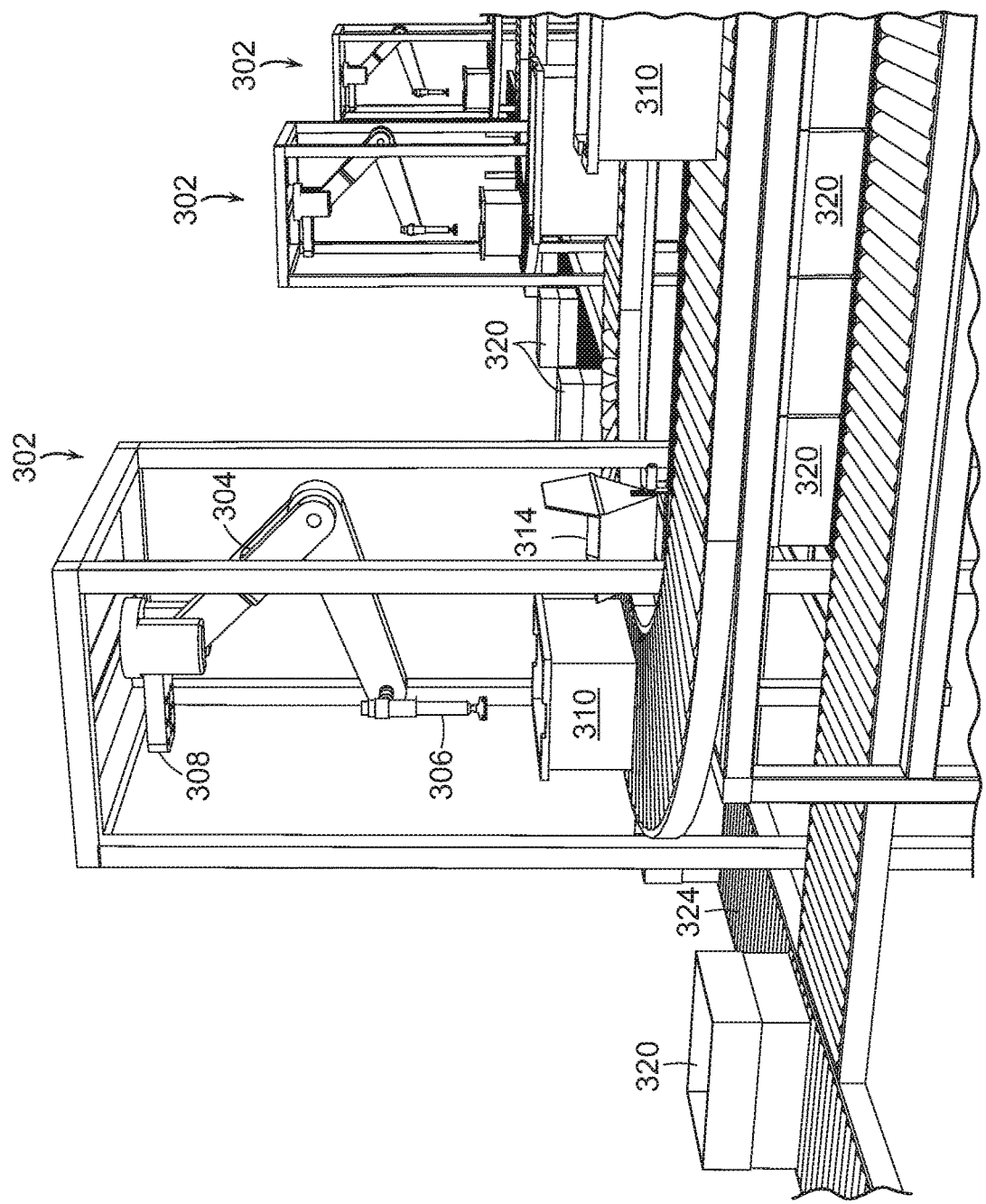
FIG. 44 shows an illustrative diagrammatic view of a system that includes a plurality of processing systems of FIG. 41.

The carriage 314 may be any of the carriages discussed above with reference to FIGS. 21-32, and may therefore determine an estimated weight or mass of an object (or more) in the carriage. The system may also check all of the detected/estimated data against a manifest or original shipping record, and process the object as discussed above, selecting the appropriate box 320 into which the deposit the object responsive to the data. As shown in FIG. 44, the system may be scaled such that multiple programmable motion systems 302 may process object into multiple carriages 314 and output boxes 320.

Figure 45:
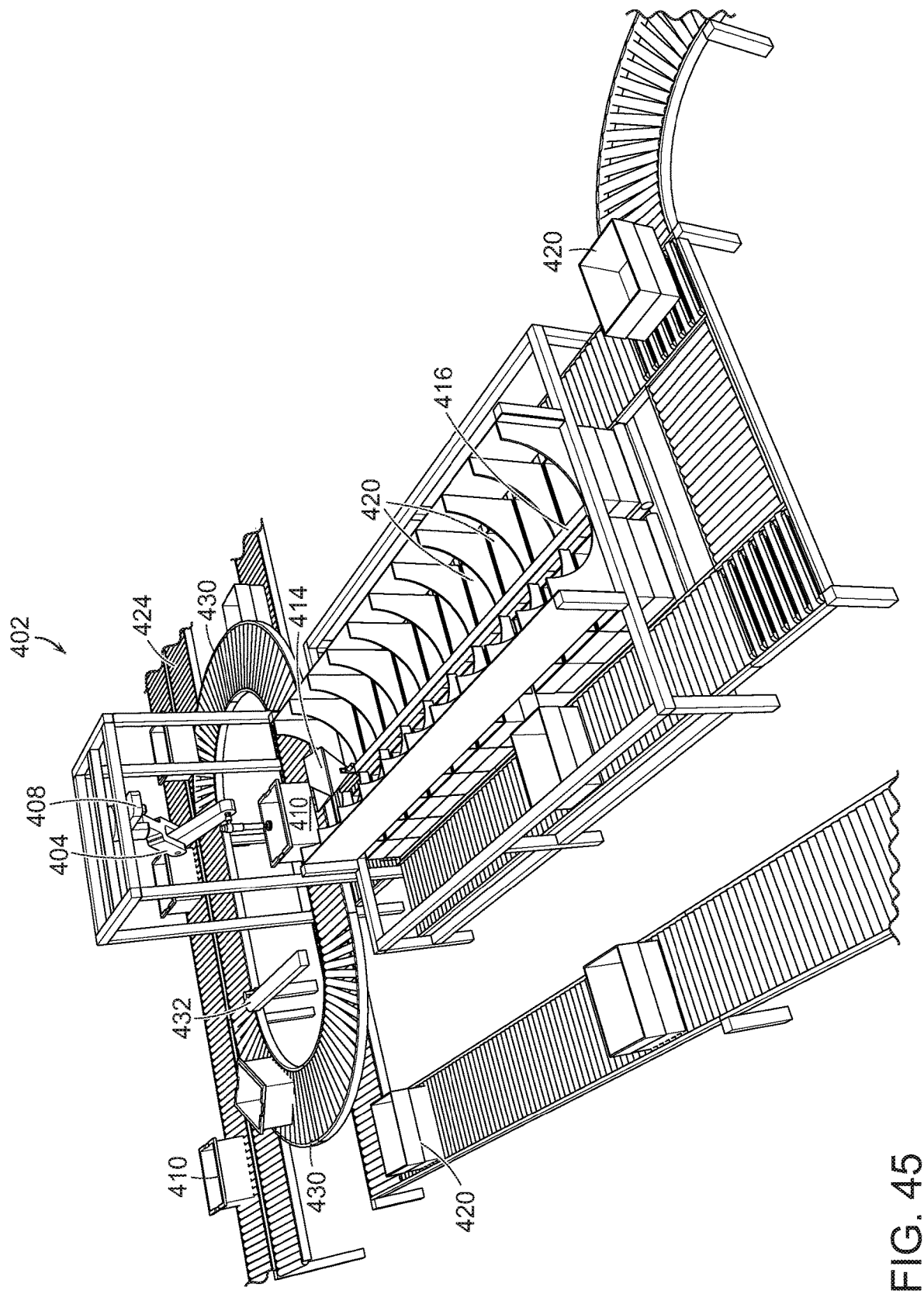
FIG. 45 shows an illustrative diagrammatic view of a processing system in accordance with a further embodiment of the invention that includes a programmable motion device between a loop input conveyor and a reciprocating shuttle system.
Figure 46:
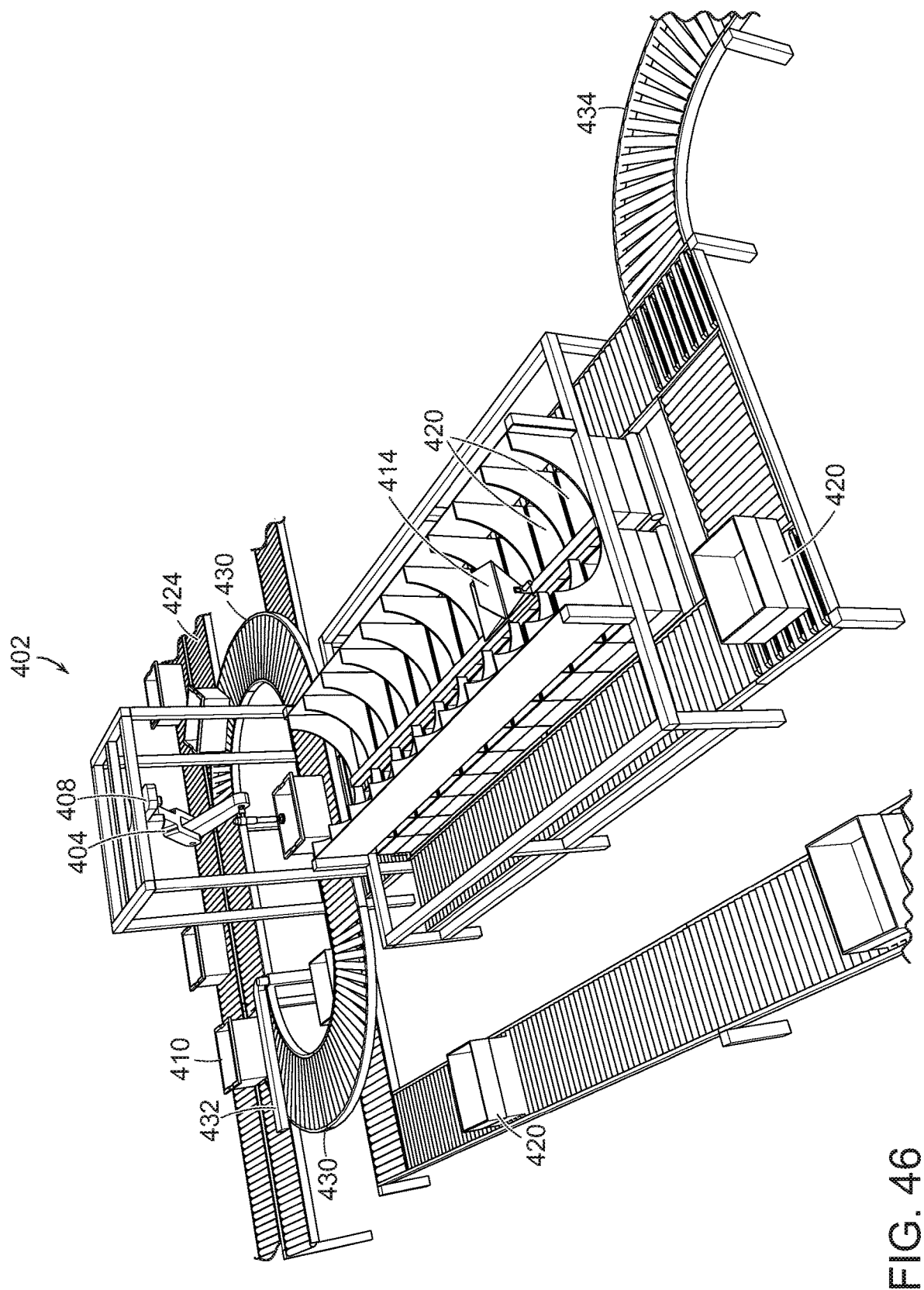
FIG. 46 shows an illustrative diagrammatic view of the processing system of FIG. 45 with the reciprocating carriage having been moved along a rail between rows of output bins.
Figure 47:
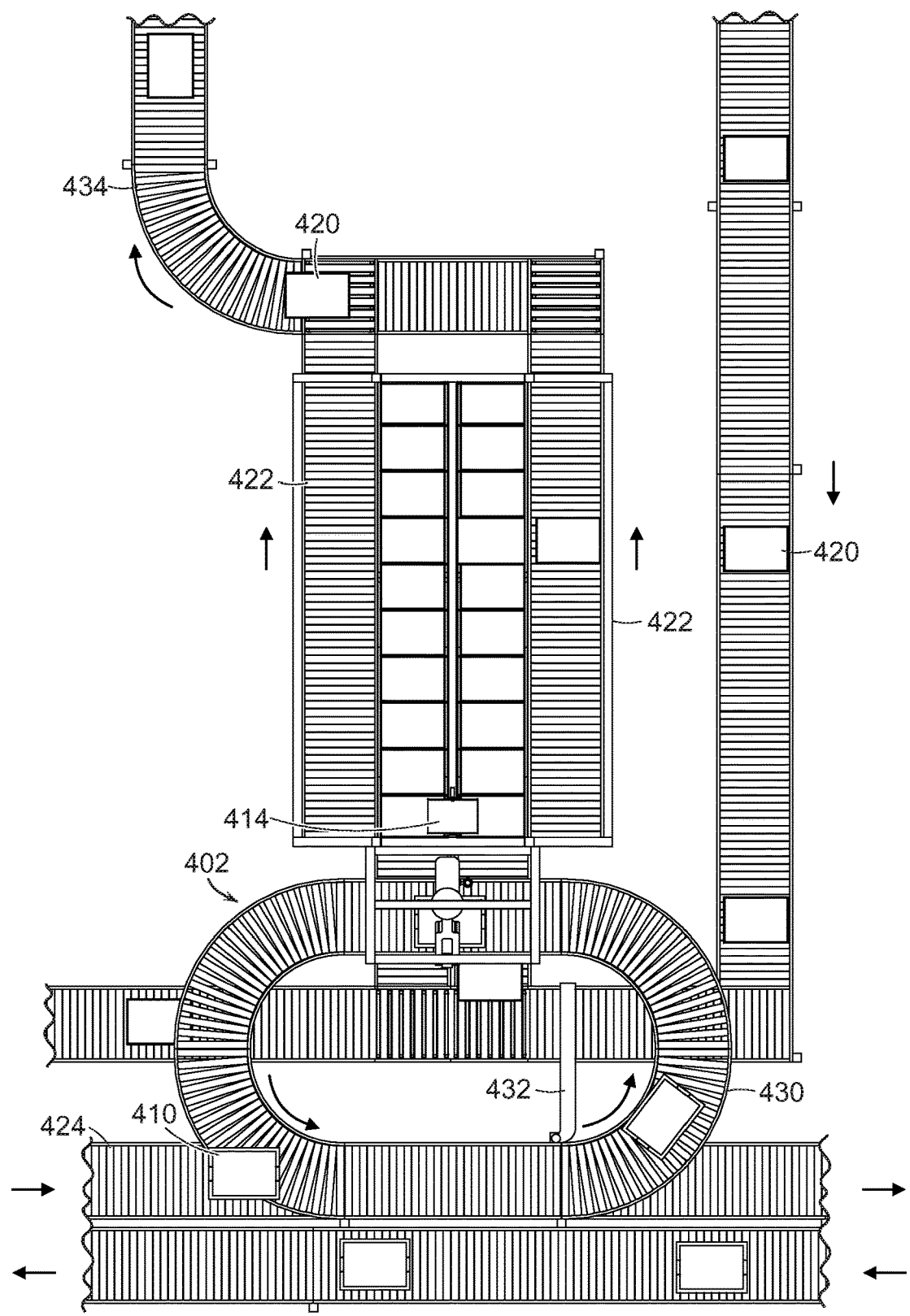
FIG. 47 shows an illustrative diagrammatic top view of the system of FIG. 45.
Figure 48:
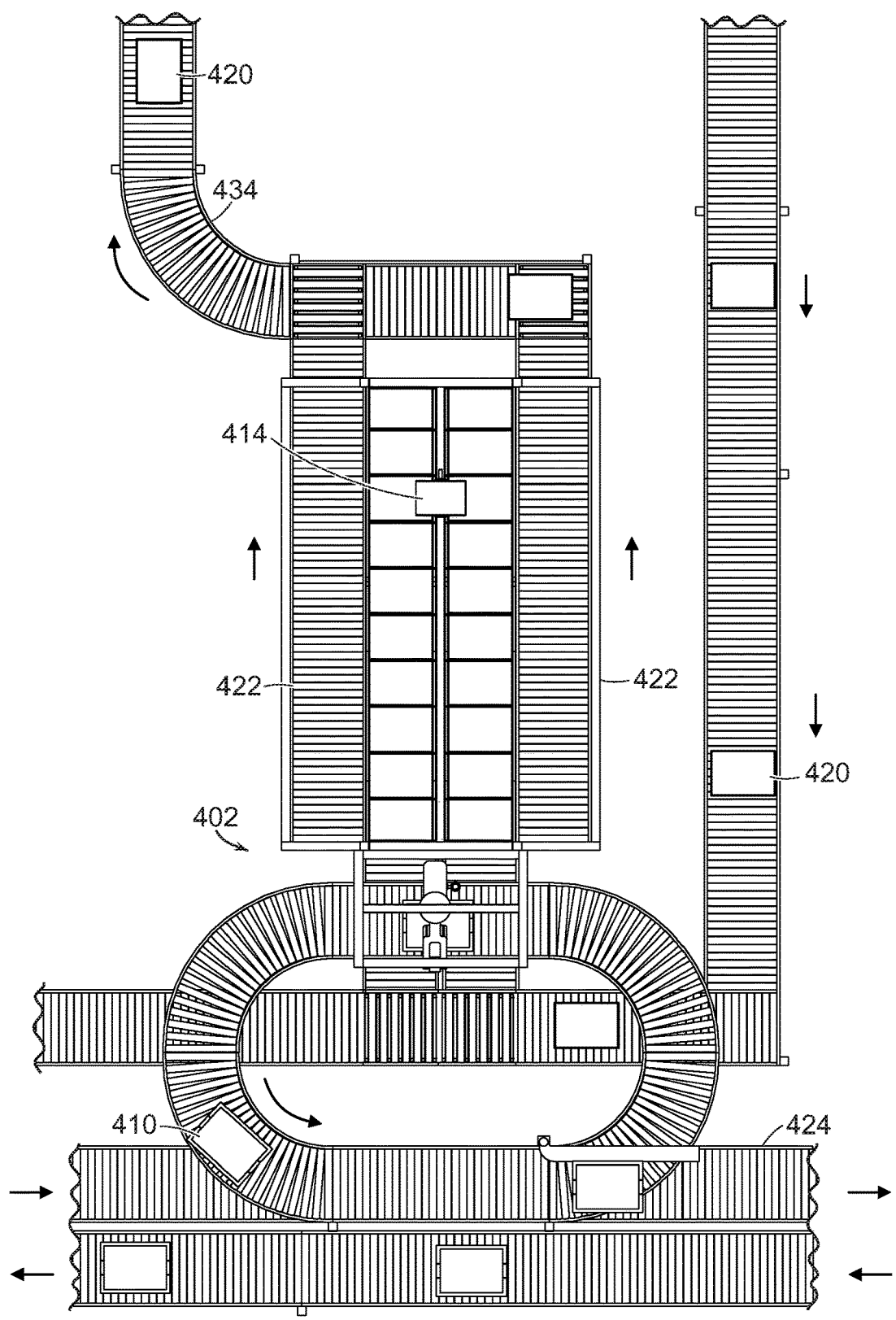
FIG. 48 shows an illustrative diagrammatic top view of the system of FIG. 48.

Further, FIG. 45 shows a processing system 400 that includes a programmable motion system 402. The programmable motion system 402 includes an articulated arm 404 and an end effector 406. FIG. 46 shows a top view of the system of FIG. 45. The system 400 may retrieve objects from bins 410 that are provided on conveyors 412, and place the retrieved objects into a reciprocating carriage 414 that travels along a rail 416 between rows of boxes 420 as shown in FIG. 47 (showing a similar view as FIG. 45) and in FIG. 48 (showing a similar top view as FIG. 46). The bins 410 may be provided by conveyors 424 and circulating conveyors 430 that provide the bins 410 using one or more diverters 432. Completed boxes may be urged onto output conveyors 422, which direct the completed boxes to a collected output conveyor 434.

The system 402 includes a perception unit 408 that is the same as the perception unit 308 that combines the functionalities of the detection system 72 and the capture system 78 discussed above, and includes lights and perception units, and scanning and receiving units as well as edge detection units. Each perception unit 408 may therefore capture identifying indicia, and provide volumetric 3D scanning as discussed above.

Figure 49:
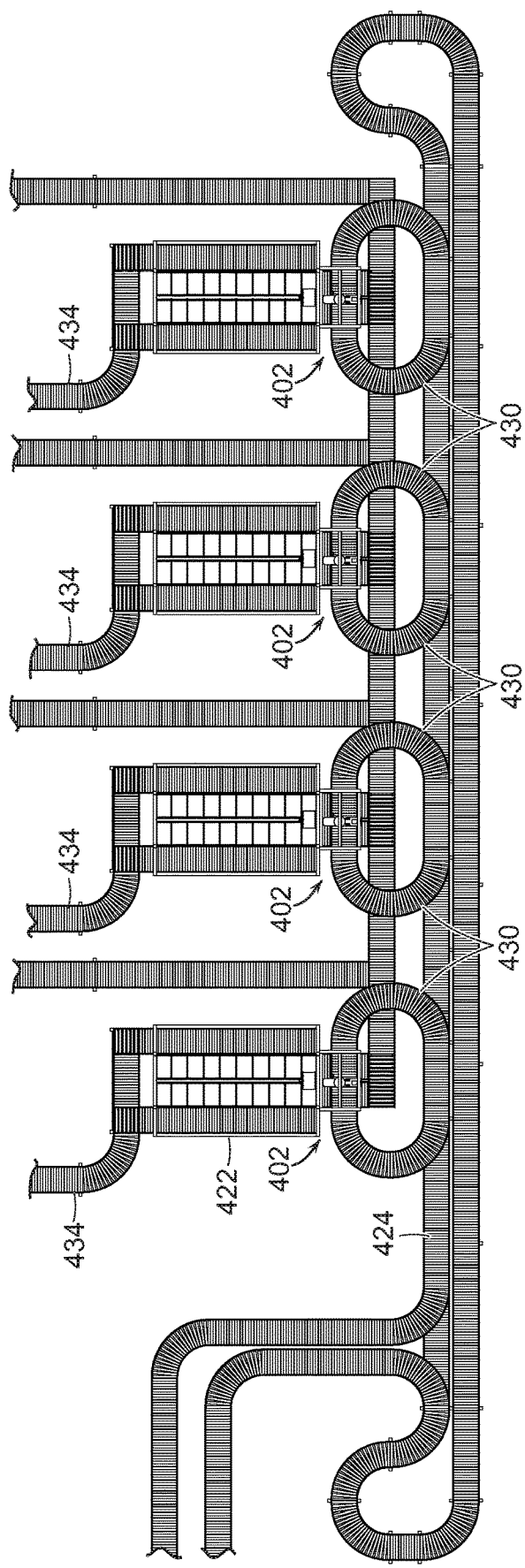
FIG. 49 shows an illustrative diagrammatic a system in accordance with a further embodiment that includes a plurality of processing stations as shown in FIG. 45.

The carriage 414 may be any of the carriages discussed above with reference to FIGS. 21-32, and may therefore determine an estimated weight or mass of an object (or more) in the carriage. The system may also check all of the detected/estimated data against a manifest or original shipping record, and process the object as discussed above, selecting the appropriate box 420 into which the deposit the object responsive to the data. As shown in FIG. 49, the system may be scaled such that multiple programmable motion systems 402 may process object into multiple carriages 414 and output boxes 420.

Those skilled in the art will appreciate that numerous modifications and variations may be made to the above disclosed embodiments without departing from the spirit and scope of the present invention.

What is claimed is:

1. A processing system for processing objects, said processing system comprising:
   a plurality of receiving stations for receiving a plurality of objects, each object being associated with prerecorded data;
   a plurality of processing stations, each of which is in communication with at least one of the plurality of receiving stations, wherein each processing station includes:
      perception means for perceiving data regarding an identity of an object; and
      capture means for capturing characteristic data regarding the object to provide captured data;
   comparison means for comparing the captured data with the prerecorded data to provide comparison data; and
   a plurality of distribution stations, each of which is in communication with at least one of the plurality of processing stations for receiving objects from the at least one processing station responsive to the comparison data,
   wherein the capture means included in the at least one processing station comprises a weight detection system, the weight detection system comprising a plurality of load cells mounted on a reciprocating carriage to detect the weight of the object provided therein for transport to one of the plurality of distribution stations, wherein the reciprocating carriage is adapted to selectively discharge the object to the one or any of the plurality of distribution stations.

2. The processing system as claimed in claim 1, wherein said prerecorded data is provided by a sender of the object.

3. The processing system as claimed in claim 1, wherein said prerecorded data is provided by a distribution system manifest.

4. The processing system as claimed in claim 1, wherein said captured data further includes data regarding any of size, volume, density, and shape.

5. The processing system as claimed in claim 1, wherein said capture means further includes a volumetric scanner.

6. The processing system as claimed in claim 1, wherein said capture means further includes an edge detection system.

7. A method of processing objects, said method comprising:
   receiving a plurality of objects at a processing station, each object being associated with prerecorded characteristic data;
   perceiving data regarding an identity of an object among the plurality of objects at the processing station;
   obtaining the prerecorded characteristic data associated with the identity of the object;
   capturing characteristic data regarding the object received at the processing station;
   comparing the captured characteristic data with the prerecorded characteristic data associated with the object to provide comparison data; and
   transporting the object in a reciprocating carriage from the processing station and selectively discharging the object from the reciprocating carriage to one of a distribution station and a holding station responsive to the comparison data,
   wherein capturing the characteristic data includes detecting a weight of the object using a plurality of load cells provided on the reciprocating carriage.

8. The method as claimed in claim 7, wherein said prerecorded characteristic data is provided by a sender of the object.

9. The method as claimed in claim 7, wherein said prerecorded characteristic data is provided by a distribution system manifest.

10. The method as claimed in claim 7, wherein capturing characteristic data further includes capturing data regarding any of size, volume, density, and shape.

11. The method as claimed in claim 7, wherein capturing characteristic data further includes capturing data regarding a volume of the object using a volumetric scanner.

12. The method as claimed in claim 7, wherein capturing characteristic data further includes capturing data regarding a shape of the object using an edge detection system.

13. An object processing verification system comprising:
   a data repository for storing information about objects including identifying information, object weight, object volume, and destination information;
   a first detection system that detects identifying information associated with the object;
   a second detection system that detects a volume associated with the object;
   a third detection system that detects a weight associated with the object; and
   a computer processing system for comparing the detected identifying information, volume and weight with the volume and weight of the identified object that is stored in the data repository,
   wherein the third detection system includes a shuttle having an object holding area to hold the object and an object base that supports the object holding area,
   wherein at least one load cell is provided on the shuttle for detecting the weight of the object held in the object holding area, and
   wherein the shuttle routes the object to an advancement destination if the detected volume and weight of the object match the stored volume and weight for the object, and to an examination destination if the detected volume and weight of the object do not match the stored volume and weight for the object within one or more defined thresholds.

14. The object processing verification of claim 13, where the computer processing system calculates the volume of the object by detecting a first volume before the object is removed from a volume detection location, detecting a second volume after the object is removed from a volume detection location, and subtracting the second volume from the first volume.

15. The object processing verification of claim 13 wherein the at least one load cell is located on the base of the shuttle.

16. The object processing verification of claim 13 wherein the object holding area is hinged about a pivot to allow the object held therein to be deposited from the shuttle into a destination area, wherein the at least one load cell is located between the pivot and the object holding area.

17. The object processing verification of claim 13 wherein the object holding area includes a weighing plate and a base plate, wherein the object is held on the base plate, and the at least one load cell is located between the weighing plate and the base plate.

18. The object processing verification system as in claim 13 wherein the first detection system detects one or more of the object's shape, a barcode, an RFID signal, and a label.

19. The object processing verification system of claim 13 wherein the data repository further stores information regarding the object's source, price, packaging, dunnage.

20. The object processing verification system of claim 19, wherein the detected volume is used to determine a packaging size for shipping the object, and an amount of dunnage to secure the object in a package of the packaging size.

21. The object processing verification system of claim 19, wherein the detected weight and volume is used to determine the accuracy of the object's price, shipping costs from a source, shipping costs to a destination, or packaging and dunnage cost.

22. The object processing verification system of claim 13, further comprising a multi-pick identification system for identifying whether a pick includes more than one object.

23. The object processing verification system as claimed in claim 22, wherein the multi-pick identification system determines whether the pick includes more than one object using vacuum sensors.

24. The object processing verification system as claimed in claim 22, wherein the multi-pick identification system determines whether the pick includes more than one object using air flow sensors.

25. The object processing verification system as claimed in claim 22, wherein the multi-pick identification system determines whether the pick includes more than one object using weight detection.

26. The object processing verification system as claimed in claim 22, wherein the multi-pick identification system determines whether the pick includes more than one object using image processing of images of the object volume.

27. The object processing verification system as claimed in claim 22, wherein the multi-pick identification system determines whether the pick includes more than one object and whether the more than one object may be processed together as a unit.

\* \* \* \* \*